July 19, 1955 W. A. MALTHANER ET AL 2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952 21 Sheets-Sheet 1

INVENTORS W. A. MALTHANER
H. E. VAUGHAN
BY J. W. Schmied
ATTORNEY

July 19, 1955 W. A. MALTHANER ET AL 2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952 21 Sheets-Sheet 2

INVENTORS W. A. MALTHANER
H. E. VAUGHAN
BY J W Schmied
ATTORNEY

INVENTORS W. A. MALTHANER
H. E. VAUGHAN
BY J. W. Schmied
ATTORNEY

July 19, 1955 W. A. MALTHANER ET AL 2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952

21 Sheets-Sheet 4

INVENTORS W. A. MALTHANER
H. E. VAUGHAN

BY J W Schmied

ATTORNEY

July 19, 1955 W. A. MALTHANER ET AL 2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952 21 Sheets-Sheet 5

INVENTORS W. A. MALTHANER
H. E. VAUGHAN
BY J W Schmied
ATTORNEY

INVENTORS W. A. MALTHANER
H. E. VAUGHAN
BY J. W. Schmied
ATTORNEY

INVENTORS W. A. MALTHANER
H. E. VAUGHAN
BY J W Schmied
ATTORNEY

July 19, 1955 W. A. MALTHANER ET AL 2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952

21 Sheets-Sheet 8

INVENTORS W. A. MALTHANER
H. E. VAUGHAN
BY J W Schmied
ATTORNEY

July 19, 1955 W. A. MALTHANER ET AL 2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952 21 Sheets-Sheet 9

INVENTORS W. A. MALTHANER
H. E. VAUGHAN

BY J. W. Schmied

ATTORNEY

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952

INVENTORS W. A. MALTHANER
H. E. VAUGHAN
BY J W Schmied
ATTORNEY

INVENTORS W. A. MALTHANER
H. E. VAUGHAN
BY J. W. Schmied
ATTORNEY

INVENTORS W. A. MALTHANER
H. E. VAUGHAN
BY J W Schmied
ATTORNEY

INVENTORS W. A. MALTHANER
H. E. VAUGHAN
BY
J W Schmied
ATTORNEY

July 19, 1955 W. A. MALTHANER ET AL 2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

Filed July 10, 1952 21 Sheets-Sheet 14

INVENTORS W. A. MALTHANER
H. E. VAUGHAN
BY
J W Schmied
ATTORNEY

INVENTORS W. A. MALTHANER
H. E. VAUGHAN
BY J. W. Schmied
ATTORNEY

INVENTORS W. A. MALTHANER
H. E. VAUGHAN
BY
ATTORNEY

INVENTORS W. A. MALTHANER
H. E. VAUGHAN
BY J. W. Schmied
ATTORNEY

INVENTORS W. A. MALTHANER
H. E. VAUGHAN
BY
J W Schmied
ATTORNEY

INVENTORS W. A. MALTHANER
H. E. VAUGHAN
BY J W Schmied
ATTORNEY

INVENTORS W. A. MALTHANER
H. E. VAUGHAN
BY
J W Schmied
ATTORNEY

INVENTORS W. A. MALTHANER
H. E. VAUGHAN
BY J. W. Schmied
ATTORNEY

United States Patent Office 2,713,613

Patented July 19, 1955

2,713,613

ARRANGEMENT FOR SUPPLYING ALTERNATING CURRENT POWER FOR ACTUATING TELEPHONE SUBSCRIBER'S STATION EQUIPMENT OVER THE SUBSCRIBER'S LOOP CIRCUIT

William A. Malthaner, New Providence, and Henry E. Vaughan, Chatham, N. J., assignors to Bell Telephone Laboratories, Incorporated, New York, N. Y., a corporation of New York Application July 10, 1952, Serial No. 298,036

10 Claims. (Cl. 179—16)

Figure 1:
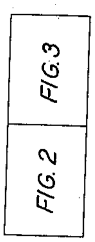

The present invention relates to an improved telephone switching system for automatically establishing telephone transmission paths between telephone subscribers' stations under control of equipment located at the subscribers' stations.

More specifically the present invention relates to improvements in automatic telephone systems of the type disclosed in our copending application Serial No. 115,961, filed September 16, 1949, now Patent No. 2,655,559, where the communication paths are established over closed loops through the subscribers' stations under control of equipment located at the subscribers' stations.

In systems of the prior art shown in the above-identified patent application it is desirable to transmit the signaling currents at high speed and without the successive acts or operations of the calling subscriber. In order to accomplish this function, automatically operating apparatus has been provided at the subscriber's station which requires electrical power for the energization and actuation thereof.

In accordance with the exemplary embodiment of this invention as well as in the arrangements shown in the prior art, alternating current power has been found the most suitable for actuating and energizing this equipment at the subscriber's station. The frequency of this power is relatively low in the order of commercial power frequencies. However, the most desirable way for supplying this power to outlying subscribers' stations is over the same conductors of the subscriber's line which are employed for transmitting both the signaling currents and supervisory currents and also the voice frequency or telephone communication currents. In the systems set forth in the above-identified patent application the low frequency power current was transmitted to the subscriber over a simplex circuit of the subscribers' lines. In other words, the low frequency power was connected at the central office between both line conductors and ground and then the power actuating equipment at the subscriber's station likewise interconnected with both line conductors and ground.

Such an arrangement operates satisfactorily for most regions in the country. However, in certain regions either direct current or alternating current or both direct-current and alternating-current earth potentials of appreciable magnitude exist. In these regions these earth potentials interfere with the satisfactory operation of the improved signaling and supervisory arrangements described in the above-identified copending application.

In accordance with the present invention, the above difficulties are overcome by transmitting all three different types of currents, namely, signaling currents, supervisory currents and low frequency power currents for actuating the subscriber's station equipment without inference one with another between the two line conductors extending to the subscriber's station, thus permitting the ground connection at the subscriber's station to be removed or eliminated and thus prevent the earth potential effects from interfering with the operation of any of this equipment.

An object of the present invention, therefore, is to provide an improved calling system in which high speed signaling systems of the type disclosed and referred to in the above-identified copending application are capable of operating in regions which experience disturbing earth potentials, by rearranging the subscriber's equipment so that no connection is required between the line conductors and ground at the subscriber's station.

Another object of the present invention is to provide telephone subscriber's station equipment which will cooperate with a high speed improved telephone switching system wherein the supervisory currents, the signaling currents and low frequency power currents are all transmitted between the subscriber's line conductors so that no ground connection is required at the subscriber's station.

Still another object of the present invention is to provide improved switching and supervisory equipment at a subscriber's station which is jointly controlled by the subscriber and from the central station solely over the two conductors of the subscriber's line without disturbances or interferences due to ground potentials existing between the subscriber's station and the central exchange.

The present invention overcomes the difficulties existing in the prior art by providing for the transmission of the generated pulses and alternating current solely over the subscriber's line conductors to the subscriber's subset. The subscriber's subset and central office apparatus are so arranged as to avoid ground connections where ground potentials might occur.

A closed metallic loop is established through the office and the connection to the subscriber's line for transmitting the low frequency alternating current to the line from the other side of the switching equipment associated with the trunk which was selected in accordance with a selected portion of the called subscriber's designation. The pulses are transmitted from the calling device at the subscriber's station, through the switching equipment and over a trunk or transmission path to additional switching centers or to additional stations of switching equipment where the pulses or portions thereof or other complete series of pulses transmitted from the subscriber's calling apparatus are employed to establish paths through the additional switching equipment. When the connection has been established to the called line, the power supply equipment is disconnected from the trunk. The subscriber's calling apparatus is disconnected from the line and his transmission apparatus connected thereto so that his station equipment will be in condition for transmission of the voice frequency currents when the called party answers, or for receiving a busy tone in case the called line is busy. At the completion of the call the circuits and apparatus are all returned to their normal or idle condition.

It is then another object of the present invention to provide an improved switching system for automatic telephony which avoids disturbances and faulty signals due to the effects of transients and ground potentials.

Another object of the present invention is to provide improved switching control circuits, methods, and apparatus for rapidly and accurately establishing closed loop communication paths between subscribers' stations.

Still another object of the present invention is to provide improved methods, apparatus, and circuits which operate rapidly to establish paths through the switching equipment at the central office so that the holding time of expensive control equipment is materially reduced, thus increasing the efficiency of the equipment and reducing the cost of establishing each connection therethrough.

Still another object of the present invention is to provide improved methods, circuits and apparatus operating at a sufficiently high speed so that the paths through the switching equipment may be established one at a time, thus eliminating the necessity of expensive and complicated busy test and connecting equipment and circuits.

Still another object of the present invention is to provide improved methods, circuits and apparatus for more accurately establishing connections through the equipment first by arranging the subscriber's calling apparatus so that the subscriber may set up the number of the called party on his calling apparatus and then check the setting of this apparatus before placing the call.

Still another object of the present invention is to provide improved methods, circuits and apparatus which permit only one of a group of idle trunks to be selected for use in a connection through the switching equipment.

Still another object of the present invention is to provide improved methods, circuits and apparatus for more accurately establishing connections through switching equipment by repeatedly transmitting the number of the called station to the central office where the received number may be checked to insure that it has been properly received. If the number is improperly received, the received or registered number will be disregarded and the next time it is transmitted from the subscriber's station it will again be registered if properly received and employed to control the establishment of the connection.

Still another object of the present invention is to provide simplified control circuits at the central office which do not need to store or retransmit the called subscriber's number. Instead the called subscriber's number is repeatedly transmitted so that one or more of the repetitions of the number may be employed to establish a connection through a given switching point. Thereafter the complete number is transmitted from the subscriber's station through the switching equipment to the next switching station. Each switching station employs some portion or portions of one or more of the repetitions of the called number for establishing a path through the respective switching stations.

Still another object of the present invention is the provision of improved methods, circuits and apparatus for supplying low frequency alternating-current power over a closed path through the subscriber's station for operating the calling device at the subscriber's station.

Still another object of the present invention is the provision of a novel automatic telephone system which maintains supervision during the calling period by means of apparatus responsive to direct-current power supplied over the subscriber's line without interference with any alternating-current apparatus.

Still another object of the present invention is a novel automatic telephone system having apparatus for connecting a source of alternating power to a subscriber's line in order to actuate a calling device located at the subscriber's station. The source of power and connecting apparatus supply the power over the transmission path through the switching apparatus after this path has been established.

Still another object of the present invention is the provision of improved methods, circuits and apparatus for causing the disconnect of the calling apparatus of the subscriber's station and connecting the telephone transmitting and receiving equipment to the subscriber's line after all of the selections have been made and a transmission path established to the called subscriber's station.

Still another object of the present invention is the provision of control circuits in automatic telephone systems which coordinate the operation of all of the various other circuits and interconnect them to cooperate with one another in the rapid and efficient use of the subscriber's time and also in the rapid and efficient use of the time of the control equipments of the central office, thus materially reducing the time required to establish a connection as well as the cost of establishing each connection through the switching equipment.

Figure 4:
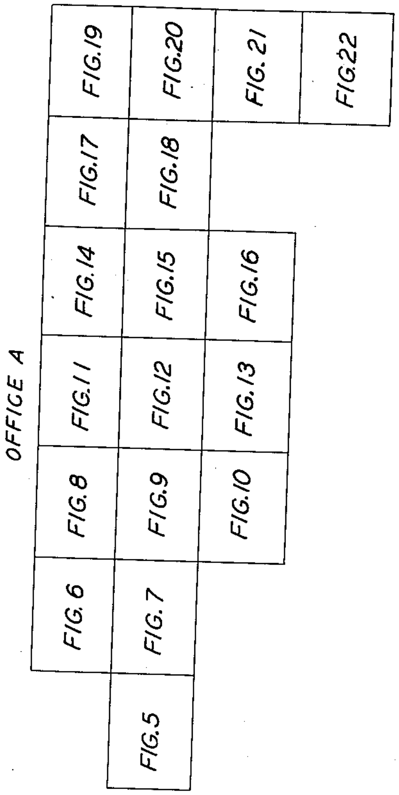
Figure 2:
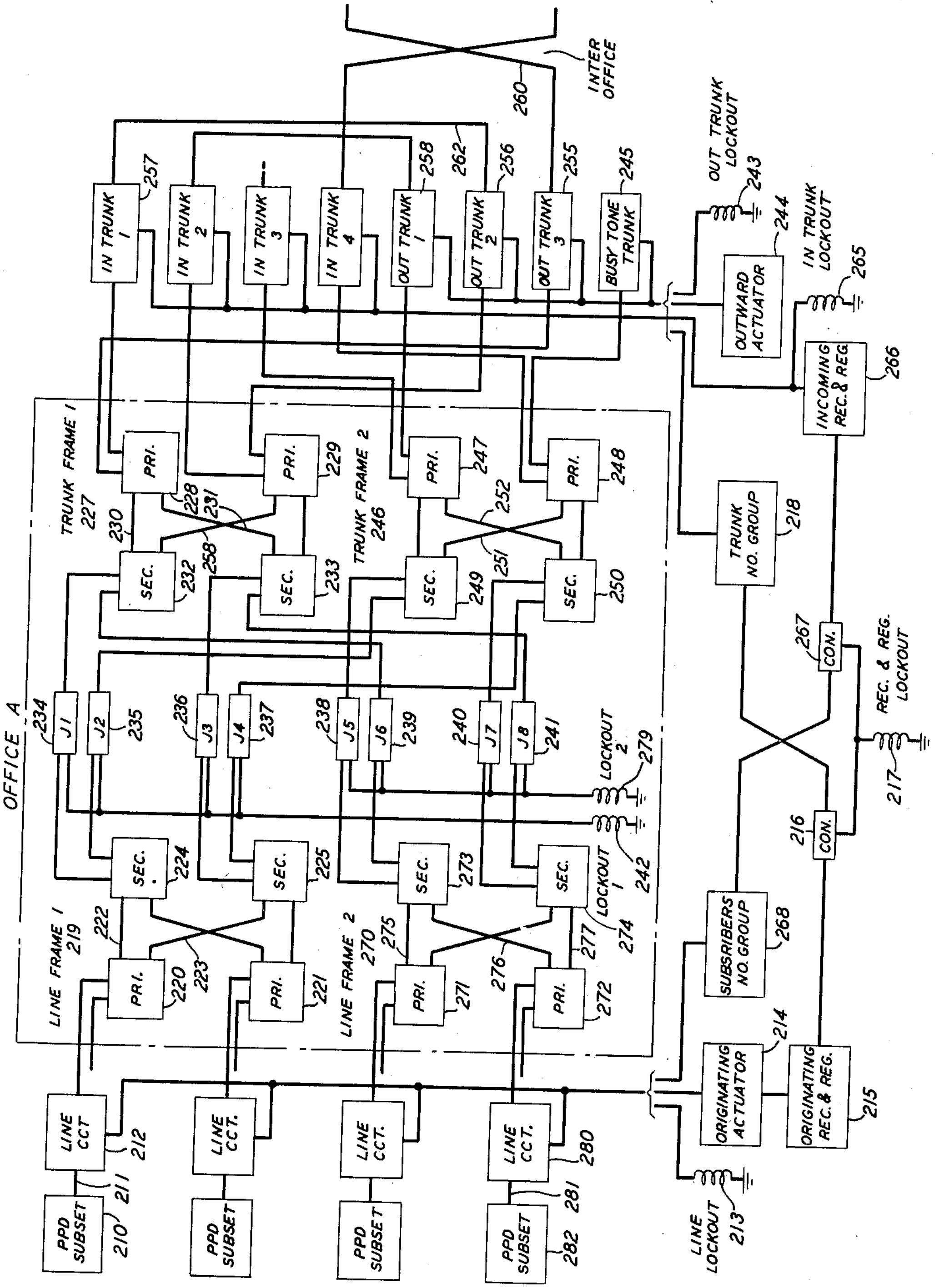
Figure 3:
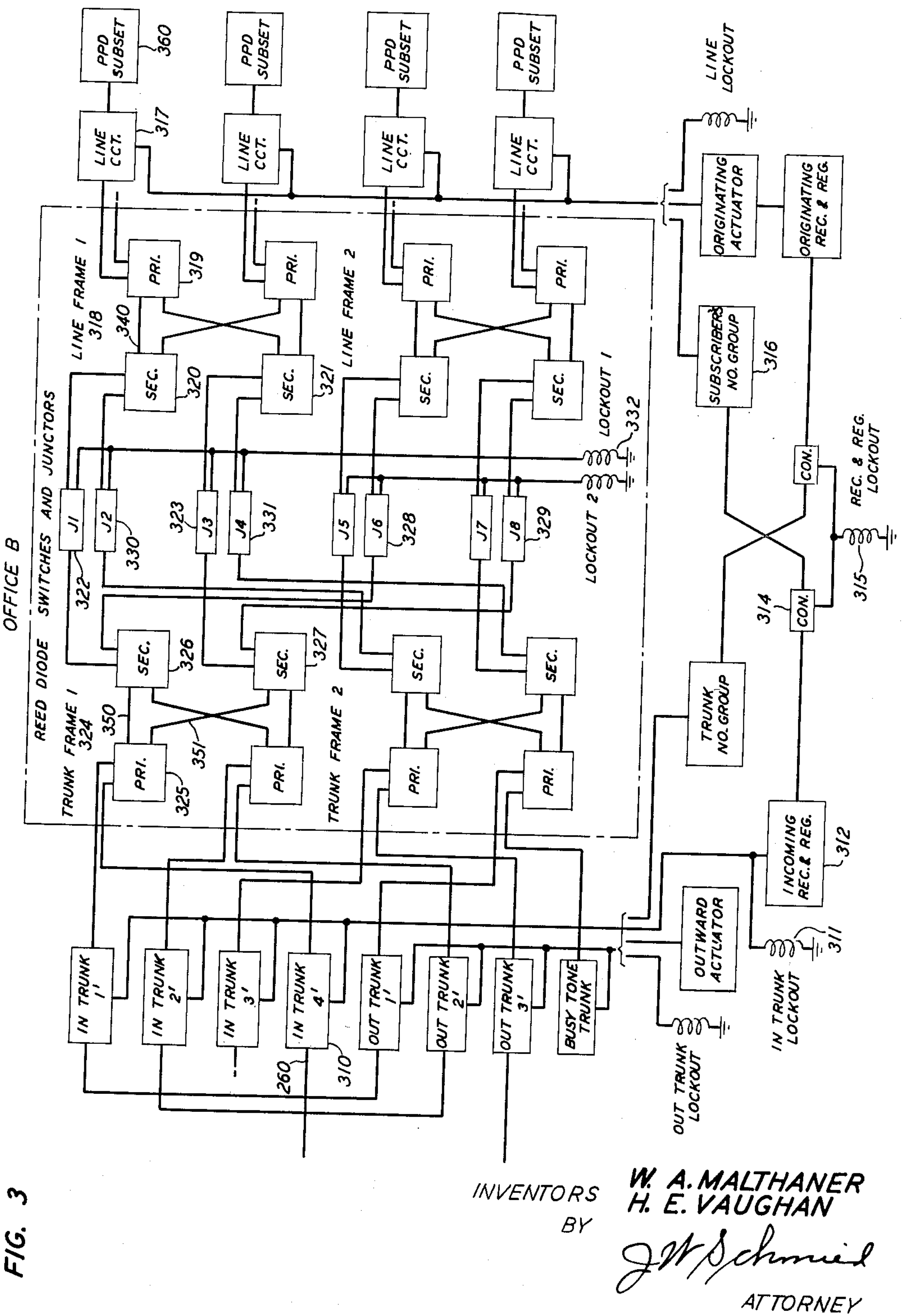

The foregoing and other objects and features of this invention may be more readily understood from the following description when read with reference to the attached drawings in which:

Fig. 1 shows the manner in which Figs. 2 and 3 are arranged adjacent each other;

Figs. 2 and 3 show in outline form of the representative circuits at two switching centers and the manner in which these circuits cooperate to provide transmission paths from any calling subscriber to any called subscriber; and Fig. 4 shows the manner in which Figs. 5 through 22 are arranged adjacent to one another to show details of exemplary circuits and their mode of cooperation in the improved telephone switching system embodying this invention.

Novel features of the subscriber's station and calling equipment disclosed but not claimed herein are claimed in one of the following applications for United States Letters Patent: D. P. Parkinson, Serial No. 35,930, filed June 29, 1948, which issued as United States Patent 2,597,898, on May 27, 1952; Lovell-Parkinson, Serial No. 35,926, filed June 29, 1948, which issued as United States Patent 2,587,635 on March 4, 1952; D. P. Parkinson, Serial No. 39,015, filed July 16, 1948, which issued as United States Patent 2,499,606 on March 7, 1950; application of Hill-Parkinson, Serial No. 115,016, filed on September 10, 1949, which issued as United States Patent 2,598,695 on June 3, 1952; an application of Dunlap-Malthaner, Serial No. 116,068, filed on September 10, 1949, and an application of K. S. Dunlap, Serial No. 298,166, filed on an even date herewith.

Novel features of the improved receiving and recording equipment disclosed but not claimed herein are claimed in one of the following applications: H. E. Vaughan, Serial No. 35,911, filed June 29, 1948, which issued as United States Patent 2,603,715 on July 15, 1952; Malthaner-Newby-Vaughan, Serial No. 35,924, filed June 29, 1948; Malthaner-Newby-Vaughan, Serial No. 68,234, filed December 30, 1948, which issued as United States Patent 2,615,971 on October 28, 1952.

Novel features of the switching network including idle path marking, selecting, trunk selecting, establishing the selected path, etc., disclosed but not claimed herein, are claimed in one of the following applications: Bruce-Hall, Serial No. 782,704, filed October 29, 1947, which issued as United States Patent 2,582,959 on January 22, 1952; W. A. Malthaner, Serial No. 35,925, filed June 29, 1948, which issued as United States Patent 2,620,399 on December 2, 1952; Brewer-Bruce, Serial No. 115,962, filed on September 16, 1950.

Novel features of a central office and associated equipment disclosed but not claimed herein is claimed in the application of Malthaner-Vaughan, Serial No. 115,961, filed on September 16, 1949.

The disclosures of all of the above-identified applications are hereby made a part of the present application as is fully included and set forth in full herein.

The operation of the present embodiment of the invention may best be understood by the following brief description with reference to the simplified block schematic of two central offices shown on Figs. 2 and 3, when placed adjacent to each other as indicated in Fig. 1. Fig. 2 and Fig. 3 each shows in outline form various circuits and the manner in which they cooperate in a central office of the type embodied in the invention.

As shown in Figs. 2 and 3 each office is provided with a switching network usually located on a plurality of supporting frames. Two line frames and two trunk frames are shown which are arranged to handle calls within each office and between offices to and from subscribers' lines in each office via trunk circuits. Four incoming and three outgoing trunks and a busy-tone trunk are shown for each office. While only a few subscriber stations, lines, trunks, frames, and other circuits and apparatus are shown, it is to be understood that any suitable number of the different circuits and apparatus may be provided. Any additional circuits will be substantially the same as those shown and operate and cooperate with each other and the other circuits and equipment in a manner similar to the operation and cooperation of the circuits shown and described herein.

Each subscriber station comprises apparatus for producing an audible ringing signal at the station in response to power transmitted from the central office; switchhook apparatus for indicating to the central office that the telephone set is on or off of its cradle; apparatus for generating dialing signals in response to power transmitted from the central office; talking apparatus; and apparatus for switching under control of the central office from said signaling apparatus to said talking apparatus. A suitable form of subscribers' station equipment which will cooperate satisfactorily with the exemplary embodiment set forth herein is of the type disclosed in the copending application of K. S. Dunlap, Serial No. 298,166, filed on July 10, 1952. Novel features of this subscriber station equipment shown or described but not claimed herein are claimed in the above-identified applications or in applications referred to therein.

Common control apparatus is provided at each central office for establishing talking paths through the switching network on a one-at-a-time basis, either in response to dialing signals received from a subscriber station associated with the same central office, or in response to dialing signals transmitted from a subscriber's station associated with another central office.

Although Figs. 2 and 3 actually show only sufficient switching circuits and apparatus at each central office for only eight subscriber stations and eight trunk circuits, it is not intended to indicate the necessary or desirable size of such a central office. The individual switches, the number of switches per switching frame and the number of such switching frames provided can be expanded in an obvious manner together with suitably provided common control circuits of the type disclosed to furnish satisfactory service to the number of subscribers indicated by the calling habits of the subscribers and the operating times of the apparatus. The particular types of apparatus intended for the physical embodiment of the invention have sufficiently fast operating characteristics to provide for satisfactory service on this one-at-a-time basis to a group of subscribers of the size now commonly associated together in one existing central office.

The central office shown in Fig. 2 comprises four subscribers' stations, such as 210, equipped with preset repetitive dialing means; line conductors, such as 211, extending between the subscriber's station and individual central office line circuits, such as 212; outgoing trunk circuits, such as 255; incoming trunk circuits, such as 257; and a switching network comprising line frames, such as 219, and trunk frames, such as 227, by means of which desired connections may be established between any of said subscriber stations and any of said out-trunks, or between any of said in-trunks and any of said subscriber stations.

Associated with the office are common control circuits, shown in Fig. 2 below the switching network, comprising an originating actuator 214 for transmission of power to a subscriber's station for causing thereat the generation of dialing signals designating a called destination; an originating receiver and register circuit 215 for receiving such dialing signals from a calling subscriber's station and registering the information as to the desired destination; a connector circuit 216; and a trunk number group circuit 218 for identifying the location of desired out-trunks on the switching network, performing an idle-busy-vacant test on such designated trunks and for establishing, in part, a connection through the switching network from the calling subscriber to one of said designated out-trunks. The common control equipment also includes an outward actuator 244 for supplying signal generating power to a calling subscriber station from an out-trunk circuit and back through the switching network after a connection between the subscriber station and a designated out-trunk has been established. The dialing or calling signals representing the desired called destination are again generated at the subscriber's station and transmitted through the switching network and the out-trunk for use in establishing subsequent connections towards the called destination.

For the establishment of a terminating connection between an in-trunk and a called subscriber station, the common control equipment also includes an incoming receiver and register 266. The register 266 receives the dialing signals designating the called subscriber's station after transmission from a calling subscriber's subset through one or more switching systems, through an out-trunk circuit, an interconnecting trunk, an in-trunk circuit, a connector circuit 267, and a subscriber's number group circuit 268. The subscriber's number group 268 identifies the location of the called subscriber station on the switching network, makes an idle-busy-vacant test of the called station and partially controls the establishment of a connection between the incoming trunk circuit and the called subscriber station.

Outgoing connections from an out-trunk of this office may terminate in an in-trunk of the same office for establishing a connection to a called subscriber in the same office. The connection, 262, for example, from out-trunk 256 terminates to in-trunk 257 in Fig. 2. A connection from an out-trunk may terminate in an in-trunk in another office for the establishment of a connection to a designated called station in said other office as, for example, the connection 260 shown between out-trunk 255 of the office in Fig. 2 and in-trunk 310 of the office in Fig. 3.

A more detailed description with reference to Figs. 2 and 3 will now be made of the establishment of a connection between a subscriber in office A of Fig. 2 and a designated called subscriber in office B of Fig. 3. Assume, for example, that the subscriber provided with subset 210 desires to make a call to the subscriber provided with subset 360. He first presets the call signal generating apparatus in subset 210 in accordance with the numbers or symbols representing the designation of the called subscriber's subset 360 by means of finger wheels or other manually settable digit selectors provided on the subset. One such finger wheel for each symbol or number that may be required to designate a called station is provided, as set forth in the above-identified application of K. S. Dunlap. With the complete desired number preset, the subscriber of subset 210 then removes the telephone set from its cradle or switchhook thereby completing a direct-current circuit over conductors 211 for the operation of a relay in line circuit 212, associated with his station. The operation of the line relay causes the operation of another relay in line circuit 212 for connecting an originating actuator 214 and receiver 215 to the line 211 and for removing said original direct-current line relay from the conductors 211. The operation of the relay which connects the calling line to the originating actuator 214 and receiver 215 is made in conjunction with a cold cathode gas tube as is hereinafter described in detail in reference to Figs. 5 to 22. The gas tube is connected in lock-out with other similar gas tubes in other line circuits as indicated by lock-out element 213 so that, in the event two or more subscribers simultaneously remove their telephone sets from the cradle or switchhook, only one of such subscribers will be immediately connected to the originating actuator 214. Any other calling stations will be temporarily held with only their direct-current line relays operated awaiting access to the originating actuator 214 and receiver 215 until the first selected subscriber has been served. The types of gas tube lock-out circuits employed in the present embodiment of the invention and the operation of these lock-outs are set forth more fully in the United States Patent 2,350,888, granted to N. I. Hall on June 6, 1944, and the disclosures of said patent are hereby made a part of the present disclosures as if set forth herein in full. The cold cathode gas tubes have two or more electrodes enclosed in a gas-tight envelope containing gas or vapor at a reduced pressure. The gas will usually be argon or neon or mixtures of these gases but may also include other inert gases or other gases or vapors such as mercury, etc., or mixtures of such gases and vapors. Though cold cathode tubes have been employed in the exemplary embodiment described herein, it is to be understood that hot tubes may be employed equally well when desired.

Assume that subscriber's subset 210 has been connected via line circuit 212 to the originating actuator 214, for the establishment of a call. Forty-five-cycle alternating-current power is transmitted from the actuator 214 to the calling subscriber's subset 210 causing signal generating apparatus in the subset 210 to generate calling or dialing signals representing the called subscriber's subset 360. These dialing signals are generated at the rate of ninety digits per second, that is, one symbol or number for each half cycle of the 45-cycle power transmitted from actuator 214. A complete called designation might consist, for example, of three symbols or numbers designating the called subscriber's central office, four digits designating the called subscriber's line number in its office and an additional symbol designating the party letter of the called subscriber associated with said called line. Under the control of the actuator 214 these eight symbols or numbers designating the complete called number are generated repetitively. Each complete number cycle is separated from adjacent repetitions by a time interval equal to two digits so that a complete transmission of the called subset 360 is made every one-ninth of a second after the originating actuator has been connected to the calling subscriber station 210. During the intervals in which an actuator 214 is supplying alternating-current power to the calling subscriber's subset 210, the connection between the calling line circuit and the central office switching and control equipment is held under control of a direct-current path. If the calling subscriber returns his telephone set to its cradle or switchhook during such an interval, the interruption of this flow of power current through the subset 210 will result in the release of the connections thus far established for the call and the return to normal of all the associated circuits.

Associated with originating actuator 214 is the originating receiver and register circuit 215. The originating receiver 215 examines the dialing signals generated in the calling subscriber's subset 210 and transmitted to the receiver 215 through the line circuit 212 and originating actuator 214. The receiver 215 detects the occurrence of the silent or blank interval between repetitions of the called station 360 as an indication of the beginning of such a designation. Having detected this interval, it then proceeds to decode and register the numbers or symbols represented by the subsequent dialing signals. Suitable receiver and register circuits employed at this point in the present embodiment of the invention may be of the type disclosed in the applications of W. A. Malthaner et al., Serial No. 68,234, filed on December 30, 1948, which issued as United States Patent 2,615,971 on October 28, 1952 or of the type disclosed in W. A. Malthaner et al., Serial No. 35,924, filed on June 29, 1948, the disclosures of said applications are being hereby made a part of the present disclosures as if set forth fully herein.

The originating receiver 215 is arranged to decode and register only those symbols or numbers which designate the called central office. In the example mentioned above, the central office designation is commonly made by three symbols or numbers which ordinarily will be arranged to occur at the beginning of each complete number transmission from subset 210. When receiver 215 has registered the symbols or numbers designating the called central office, it connects itself through connector circuit 216 to the trunk number group 218 for locating an idle trunk to the designated office of Fig. 3. Lock-out is required between connector 216 and other similar connectors, such as 267, by the one-at-a-time operation of the switching network and is accomplished by means of the lock-out element 217. The method of testing for idle paths through the switching network and the selection of such an idle path for use in a connection, as set forth hereinafter for the present embodiment of the invention, requires testing and selection on a one-at-a-time basis. The testing and selection of paths through the switching network may be performed by receiver 215 with number group 218 or by receiver 266 with number group 268, or in a large office a plurality of receivers similar to 215 may be provided, each with access to number group 218 and a plurality of receivers similar to 266 may be provided each with access to number group 268 with each receiver serving either a group of line circuits or a group of incoming trunk circuits. Lock-out arrangement between the number group connectors is required so that only one connection between any number group circuit and a receiver exists at any one time to insure tests and selections on the switching network on a one-at-a-time basis. The speed of operation, however, of the present embodiment of the invention, is such that this one-at-a-time operation does not constitute a practical restriction on the general use of the system.

By means of cold cathode gas tubes included in the trunk number group 218, an idle-busy-vacant test is made of the trunks in the designated trunk group. If there are one or more trunks idle in the designated trunk group, a relay in the receiver 215 applies a voltage to a control lead associated with the trunk group. The voltage applied to the lead energizes lock-out means in the trunk circuits of the group whereby voltage is applied to the control lead appearance associated with one of the idle trunks in the group at the trunk side of the switching network of the central office. If any of the out-trunks in the designated trunk group is in use in the path of a previously established connection, the voltage is not connected to such out-trunk leads but is connected only to the switching network appearance of one of the idle trunks in the group. Assume, for example, that the called office designated by the numbers preset on calling subscriber's subset 210, and registered in receiver 215, designates the subscriber 360 in office B. By way of example, one circuit is shown at Figs. 2 and 3 for the establishment of a connection for a call originating in office A, and terminating in office B. This is shown by the circuit comprising out-trunk 255, interoffice conductors 260 and in-trunk circuit 310. With out-trunk 255 idle a voltage is connected from receiver 215 through the trunk number group 218 and trunk 255 to the appearance of its control lead at the left vertical of primary trunk switch 228 on trunk frame 227 of the switching network of office A. At the same time, voltage is connected from originating receiver and register 215 through actuator 214 to the calling line circuit 212 and then to the appearance of the control lead of this calling line on the right vertical of primary line switch 220 on line frame 219 of the switching network.

The switching network consists of line frames 219 and trunk frames 227 which have primary and secondary switches or switching arrays of contacts. Each primary line and trunk switch or switching array has a number of vertical input columns across the switch to which are connected line or trunk circuits respectively and a number of horizontal output rows across the switch. Each of these rows and columns consists of three conductors, two for the usual talking path and the third for a control lead. At the intersection of each row and column, hereinafter called a cross-point, is a relay consisting of an operating coil and three sets of make contacts. Two of these contact sets when closed connect the talking conductors associated with the particular input column to the talking conductors associated with the particular output row. A cold cathode gas diode in series with the winding of the relay is connected between the control lead of the vertical input column and the control lead of the horizontal output row. The third contact set of the cross-point relay, when operated, short-circuits its associated gas diode. The use of these cross-point gas diodes in the control leads facilitates the identification and selection of idle paths through the switching network, as described hereinafter. Short-circuiting a diode at operated cross-points facilitates the holding of an established connection through the network and the maintenance of a busy indication along the established connection during the path selection processes of subsequent calls. Each secondary switch or switching array is connected to form a similar rectangular array of cross-points except that the horizontal rows are used as input terminals and the vertical columns as switch outlets. The term "switch" as used herein refers to such arrays of relays and contacts.

Each line frame and trunk frame has a number of such primary and secondary switches arranged so as to provide one talking path from each primary switch to each secondary switch. Specifically for example, in Fig. 2 the line frame 219 associated with calling subscriber's station 210 may comprise any suitable number of primary switches, as 220 and 221. Each switch, such as 220 and 221, has a plurality of input columns two of which are represented in Fig. 2. Each column is connected to a particular subscriber station and each switch has a plurality, usually ten, horizontal output rows, two of which, i. e., the first and last, are represented in Fig. 2. Line frame 219 also has a plurality of secondary switches, two of which, 224 and 225, are represented in the drawing each having horizontal inlets and a plurality of vertical outlets. The interconnecting conductors between primary and secondary switches, hereinafter called links, are connected to the inlets of the secondary switches. For example, the top outlet of switch 220 is connected via path 222 to the top inlet of switch 224 and the lower outlet of 220 is connected via path 223 to the top inlet of switch 225. The lower primary switch 221 has its outlets similarly connected to lower inlets of the secondary switches, the top outlet of switch 221 is connected to the lower inlet of switch 224 and the lower outlet of switch 221 is connected to the lower inlet of switch 225. Intermediate switches will usually have their intermediate and first and last levels connected in a similar manner. Two such line frames 219 and 270 in office A and 318 and line frame 2 in office B are shown in each office for disclosing the operations of the system which relate to cooperation and differentiation between frames.

The line frames can be readily expanded in an obvious manner so as to provide switches and frames of any desirable size. Any desirable number of such frames may be provided having any desirable number of input line circuits and a number of primary-secondary link paths and secondary outlets consistent with the operating times of the system and the calling habits of the subscribers. For example, line frames might be provided with seventy inlets and ten outlets per primary switch and ten primary switches per line frame and with ten secondary switches per line frame, each having ten inlets and ten outlets. Thus such a frame would have 700 incoming lines and 100 secondary output paths.

Proceeding from the trunk output side of the switching network backwards through the office, a similar frame arrangement is disclosed. Trunk frame 227, for example, consists of a plurality of primary switches, such as 228 and 229, having vertical multiples to each of which a trunk circuit is attached, such as trunks 255 and 257 connected to switch 228, and horizontal multiples each of which is connected to the horizontal input multiple of a secondary switch. One path or link from each primary switch to each secondary switch is provided, as shown by the indicated paths 230 and 231 between primary switch 228 and secondary switches 232 and 233.

The trunk frames 227, 246, etc. can be readily expanded in an obvious manner so as to provide switches and frames of any desirable size. Any desirable number of such frames can be provided having a number of trunk connections consistent with the operating times of the system and the amount of traffic to be handled and having a similarly consistent number of primary-secondary link paths and secondary outlets. For example, trunk frames might be provided comprising ten primary and ten secondary switches, each switch having ten inlets and ten outlets. In this case the frame would provide connections between 100 trunk terminals and 100 secondary switch terminals.

Connections are made between the secondary line frame switches 224, 225, 273, 274, etc. and the secondary trunk frame switches 232, 233, 249, 250, etc. to provide talking paths between each line frame and each trunk frame. These connections comprise a direct metallic connection for the two talking conductors of each path. The control lead from each secondary line switch outlet is, however, connected to an individual control circuit, hereafter called a junctor, to which is also connected the control lead from the secondary trunk switch outlet associated with the same talking path. Thus for example junctor 234 is associated with the path between the left vertical of line secondary switch 224 and the right vertical of trunk frame secondary switch 232.

In the particular exemplary call being described, it has been determined that out-trunk 255 is available for service and that it is desired to connect the calling subscriber station 210 or line to this trunk. Voltage is applied on the switch control lead associated with this calling line at the right vertical inlet of primary switch 220 on line frame 219. This voltage fires gas diodes between this primary switch vertical line input and the control lead of each idle horizontal outlet of the primary switch 220. Assuming, in this case, that line frame 219 is completely idle, a gas diode between the aforementioned primary switch control lead inlet and the control lead outlet to each secondary switch fires thereby altering the voltage condition on the control leads associated with primary-secondary link paths 222 and 223. This altered link control lead voltage, in turn, fires the gas diodes in the secondary switches 224 and 225 between the link control leads 222 and 223 to which primary gas tubes have been fired and each idle secondary line switch output path. Thus in the case of a completely idle frame, gas tubes are fired in the primary and secondary switch control lead along the idle path from the input terminal associated with line circuit 212, line link path 222, to junctor 234, and along similar individual idle paths from the said line circuit to junctors 235, 236, 237, etc. In a similar manner, the voltage applied to the control lead of the right primary vertical of idle trunk switch 228 associated with desired out-trunk 255 fires gas diodes of the trunk frame primary and secondary switches and thereby establishes a connection through such fired diodes between said primary vertical lead, trunk link path 230 to junctor 234. Other similar connections are made from the same trunk vertical control leads along similar individual paths to junctors 236, 239 and 241 and also other similar individual paths not shown in detail. If any of the link or junctor sections of any of the above-described paths through the switching network is in use as part of a previously established connection, the voltage, established by virtue of the holding condition on the control lead of such busy sections, as hereinafter described, is such that the gas diodes will not fire between said busy sections and the adjacent sections to which voltage marks have been extended. Of the various idle line frame and trunk frame paths marked by ionized gas diodes, as described above, only the paths with which junctors 234 and 236 are associated form possible complete paths between the calling line circuit 212 and the desired trunk 255. The other junctor circuits which have been marked from the line side, for example, 235, terminate at trunk frames other than trunk frame 227 on which the desired trunk appears, and other junctors which have been marked from the trunk side, for example, 239, go to line frames other than line frame 219 on which the calling line appears. Junctor circuits 234 and 236, by means of the combination of altered voltages on the two control leads connected to each said junctor, each recognize that they are associated with a possible complete desired path through the switching network and start to function to complete this path. A cold cathode gas tube in each of these junctors is connected in a lock-out circuit associated with the line frame, as indicated by lock-out element 242, so that only one of said junctors will succeed in fully operating. Assume for example, that in this case junctor 234 is operative and that junctor 236 is locked out. A relay in operative junctor 234 completes a circuit through the gas diodes and cross-point relay coils associated with the control lead path from the calling line to this junctor. The completed path allows sufficient current to flow therethrough to operate the cross-point relays. A similar current flow circuit is completed in the control lead path from junctor 234 through the primary and secondary cross-point relays and diodes of trunk frame 227 to out-trunk 255 for operating the cross-point relays associated with this path. The operation of these four cross-point relays completes a talking connection between said calling subscriber station 210 and out-trunk 255. The relay in line circuit 212, associated with the control lead and operating in series with the switching frame cross-point relays, disconnects the originating actuator 214, and originating receiver 215 from the talking conductors and control lead of said line. As the originating receiver 215 restores to normal it releases connector 216 and trunk number group 218 which in turn removes the voltage applied to the control lead of out-trunk 255. Completion of the talking path from the calling subscriber's station 210 to out-trunk 255 operates a relay in the out-trunk circuit which places a holding condition on the control lead through the switching networks associated with this path. In addition, the out-trunk 225 connects outward actuator 244, which is common to a plurality of out-trunks, to the talking conductors of the path by means of a relay and gas tube in the out-trunk 225. The gas tube, as indicated by common element 243, is in a lock-out arrangement with similar gas tubes in other out-trunks in the same actuator group so that, in the event of simultaneous attempt to connect to the actuator 244, one out-trunk will connect to the actuator and the other out-trunks will be locked out. Other outward actuators, not shown may simultaneously be connected to other out-trunks which are in different actuator groups. The actuator 244 supplies 45-cycle power through the out-trunk 255 and over the talking connection through the line and trunk switches to the calling subscriber's subset 210. The subset 210, in response to the 45-cycle input, continues to generate repetitively the complete cycle of dialing signals representing the called destination. During the intervals in which the actuator 244 is supplying alternating-current power to the calling suscriber's subset 210, the connection between the calling line circuit 212 and the central office switching and control equipment is held under control of a direct-current path. If the calling subscriber returns his telephone set to its cradle or switchook during such an interval, the interruption of this flow of current through the subset 210 will result in the release of the connections thus far established for the call, returning to normal all the associated circuits.

Out-trunk circuit 255 also completes a direct-current circuit over interoffice loop 260 for the operation of a relay in in-trunk circuit 310 at the designated terminating office. The relay in circuit 310 causes the connection of incoming receiver and register circuit 312 to trunk 310. The connection is established, as indicated by common element 311, in lock-out with other in-trunk circuits, which may simultaneously be attempting to connect to receiver 312. Incoming receiver 312, when connected to in-trunk 310, receives over the established connection to the calling subscriber's subset 210 the dialing signals representing the complete called station designation. The receiver 312 detects the blank interval occurring between repetitions of the complete called number as an indication of the start of a complete transmission of such number. The receiver 312 thereafter recognizes the occurrence of the symbols or numbers representing the desired office without decoding or registering this office code. It then registers the succeeding digit signals designating the called subscriber's line number and party letter. The receiver and register circuit 312 employed in the present embodiment of the invention may be of the type disclosed in either of the applications of W. A. Malthaner et al., Serial No. 68,234, filed on December 30, 1948, which issued as United States Patent 2,615,971 on October 28, 1952, and W. A. Malthaner et al., Serial No. 35,924, filed on June 29, 1948. The disclosures of said applications are hereby made a part of the present disclosures as is set forth fully herein.

When the complete number designating the desired called subscriber as 360 has been received by receiver 312, the receiver operates a relay in in-trunk circuit 310 reversing the direction of direct-current flow over interoffice loop 260 and thereby causing the operation of a polarized relay in out-trunk 255. The operation of the relay in out-trunk 255 causes the release of outward actuator 244 from the trunk circuit, and in addition, alters the circuit condition on the loop extending between out-trunk 255 and the calling subscriber's subset 210 tripping a latch mechanism in the calling subset 210 to remove the signal generating apparatus from the talking conductors and connect the talking apparatus. A holding condition is thereafter established on the established connection through the switching network under control of a relay in the trunk circuit 255 which is operated by direct current flowing in the talking conductors and through the subset 210.

When the complete called line designation has been received by incoming receiver 312, it connects itself to subscriber's number group 316 through connector circuit 314 in lock-out as indicated by element 315. Receiver 312 thus acquires for its use the test and control leads from the various subscribers' lines of office B. Lock-out is required between connector 314 and other similar connectors, such as 367, by the one-at-a-time operation of the switching network. The speed of operation of the present embodiment of the invention, however, is such that this one-at-a-time operation does not constitute a practical restriction on the general use of the system.

Over a combination of the test leads associated with the designated called line number, the incoming receiver 312 applies voltages to fire a gas tube in the particular called line circuit 317. By the operation and non-operation of relays, in the line test leads in the receiver 312 associated with the various discharge paths of the line gas tube, the receiver 312 makes an idle-busy-vacant test of the line 317. If line circuit 317 is idle, one of these relays operates and the receiver 312 supplies voltage for the further operation of the line circuit gas tube. The line circuit gas tube, in turn, places a voltage on the control lead to the primary line switch 319 of the line circuit 317. At the same time the operation of a relay in the register circuit 312 also connects a voltage to the incoming trunk 310 which is to be connected to the designated line circuit 317. These voltages applied to the designated in-trunk 310 and called line appearances at the switching network start the sequence of operations whereby idle paths between trunk 310 and said line 317 are located. One of the idle paths is used in establishing the desired connection. In addition to applying these switching network control voltages when a called line is found to be idle, the receiver 312 also operates a relay in the in-trunk circuit 310 which connects ringing power to the talking conductors at the called subscriber's subset 360 and ringing tone to the talking conductors extending to the calling subscriber's subset 210.

The voltage from the register 312 to the in-trunk 310 is connected, in turn, to the control lead at the primary trunk switch 325 on which the in-trunk 310 appears. The voltage applied to the primary trunk switch control lead fires gas diodes in the primary 325 and secondary 326 of the trunk frame 324. The junctor circuits 322 and 330 provide individual circuits indicating all the idle paths between this trunk appearance and the junctor circuits in a manner similar to that described for the trunk frame of office A on the originating half of the call. Similarly, the voltage applied to the control lead of the primary line switch 319 fires gas diodes in the primary 319 and secondary 320 of the line frame 318 indicating all the idle paths between said line circuit and various junctor circuits. Assuming as above that the desired called subscribed station is 360; voltage is applied to the control lead of line circuit 317 and in turn to the left vertical of primary switch 319 on line frame 318. Gas diodes in primary switches 319 and secondary switches 320 and 321 become ionized to indicate that idle paths via links 340, 341, etc., exist between the line and junctors 322, 323, 330 and 331 provided they are not in use as part of a previously established connection. As the in-trunk for use on this call was assumed to be 310, a voltage mark is applied to the left vertical of primary switch 325 of trunk frame 324, firing gas diodes in primary switch 325 and secondary switches 326 and 327 indicating idle paths via links 350, 351, etc., between in-trunk 310 and junctors 322, 328, 323 and 329 provided they are not in use as part of a previously established connection. Other similar marking paths not shown in detail through the network to other junctors are also thus established. If any of the link or junctor sections of any of the above-described paths are in use as part of a previously established connection, the gas diodes will not fire between the busy sections and the adjacent sections to which voltage marks have been extended.

Of this group of junctors to which voltage marks extend, only junctors 322 and 323 are marked from both the line and trunk sides of the switching network. Junctors 322 and 323 are thus the only ones actually shown in the drawing which are associated with possible complete paths between the in-trunk 310 and the designated called line circuit 317. In recognition of this condition, a cold cathode gas tube in each of said junctors 322, 323, starts to operate in order to complete the connection. Since the junctor gas tubes are connected in a lock-out circuit, as indicated by lock-out element 332, only one of the gas tubes will operate completely. Assume for example, that the gas tube in junctor 322 operates thereby selecting this junctor for use and thereby locking out junctor 323. A relay in junctor 322 completes a current path through the gas diodes and the cross-point relays in switches 325 and 326 of the trunk frame 324 and switches 319 and 320 of the line frame 318. The operation of these cross-point relays completes a talking path from the in-trunk 310 via links 350 and 340 to the desired subscriber's station 360. Operation of a relay in line circuit 317 in series with the control lead removes from the line talking conductors the line circuit apparatus which would be used in originating a call from said called line. Simultaneously the operation of a relay in incoming trunk circuit 310 in series with the control lead results in the disconnection of incoming receiver 312 from the trunk 310 and placing of a holding condition on the control lead associated with this path. Incoming receiver 312, in now restoring to normal, releases connector 314 and number group 316.

With a complete path established from the calling subscriber's subset 210 to the called subscriber's subset 360, the calling subscriber is informed of the establishment of the path by the ringing tone connected to the calling subset 210 by the in-trunk circuit 310. The called subscriber is summoned to his subset 360 by the operation of the ringing apparatus therein by the ringing power connected to the subset 360 by the in-trunk 310.

When the called subscriber answers the call by removing his receiver from its switchhook or cradle, a direct-current path is completed through the subset 310 for operating a relay in the in-trunk 310. The operation of the relay, removes the ringing power and ringing tone from the talking conductors and completes the circuit between the talking conductors to the calling subscriber and the talking conductors to the called subscriber. The in-trunk 310 also establishes a current flow condition in the talking conductor loop from the trunk 310 to the called subscriber's subset 210 whereby a latch mechanism in said called subset 210 is tripped removing the signal generating apparatus from the talking conductors, connecting the talking apparatus to the talking conductors and establishing an additional holding condition on the switch network connections under control of the direct current flowing through the called subset 360. The two subscribers may now engage in conversation.

When the calling and called subscribers replace their telephone sets on the switchhook or cradle at the end of the conversation, a relay in the out-trunk 255 and a relay in the in-trunk 310 release, removing the holding condition from the control lead to the path established through their respective switching networks, releasing the paths and returning to normal the central office circuits associated with this conversational connection.

The foregoing description of a call from a subscriber in one office to a subscriber in a second office assumed that the designated called subscriber's line was idle. However, if the called subscriber's line is busy or vacant, a connection to said designated called subscriber's line is not made, and in such a case the operation of the exemplary system set forth herein is as described hereafter.

The operations of the system from the origination of a call by the calling subscriber in the first office to the test of the called line for busy, idle or vacant condition by the receiver 312 in the second or called office are, of course, the same whether the called line is idle, busy or vacant.

When the complete called line designation has been registered in incoming receiver 312, the receiver 312 operates a relay in in-trunk circuit 310 reversing the direction of direct-current flow over interoffice loop 260 and thereby causing the operation of a polarized relay in out-trunk 255. The operation of the relay in out-trunk 255 causes the release of outward actuator 244 from the trunk circuit, and in addition alters the circuit condition on the loop extending between the out-trunk 255 and the calling subscriber's subset 210. The alteration of the loop circuit condition trips a latch mechanism in the calling subset 210 removing the signal generating apparatus from the talking conductors and connecting the talking apparatus of the subset 210 to the circuit. A holding condition on the established connection through the switching network is maintained thereafter under the control of a relay in the trunk circuit 255 operated by direct current flowing in the talking conductors and through the subset 210.

When the complete called line designation has been registered in incoming receiver 312, it connects itself to the subscribers' number group 316 through connector circuit 314 in lock-out, as described above for the call to an idle line. Over a combination of leads associated with the designated called line circuit, the incoming receiver 312 applies voltages to fire a gas tube in that particular called line circuit and, by the operation and nonoperation of relays in said line circuit, makes an idle-busy-vacant test of the line. If the line is busy, a group of these test relays operates in combination, but if the called line is vacant, i. e. if there is no subscriber associated with the registered called line designation, none of these relays operate. In either case, busy or vacant, register 316 operates a relay in the incoming trunk 310 which connects a distinctive tone to the talking conductors extending from the trunk 310 to the interoffice conductors. In the specific embodiment of the invention as herein set forth, the same tone is used for both the busy and vacant condition. However, by providing separate busy and vacant relays in the incoming trunk 310 and separate control leads between these relays and the receiver 312, a tone distinctive of each condition may be provided.

The establishment of a busy or vacant tone condition in the incoming trunk 310 also results in the disconnection of the incoming receiver and register 312 from the trunk 310 and the restoration thereof to normal, releasing connector 314 and number group 316. Thus a busy or vacant condition at the called subscriber's line does not set up a path through the switching network between the incoming trunk 310, and the called subscriber's line.

The distinctive tone, which has been connected from the incoming trunk circuit 310 to the interoffice conductors 260, is transmitted through the path established in the originating office to the calling subscriber's subset 210. In the specific exemplary call previously used, establishment of this busy or vacant tone condition in in-trunk 310 causes the transmission of this tone over interoffice conductors 260 and through out-trunk 255, trunk switches 228 and 232, junctor 234, line switches 224 and 220 of office A, and subscriber's line circuit 212 to the calling subscriber's subset 210. This tone informs the calling subscriber that he can not be connected to the designated called line at the present time.

The calling subscriber then replaces his telephone set on its switchhook or cradle thereby opening the direct-current path between his subset 210 and out-trunk 255 releasing a relay operated in trunk 255 over this path. The relay in turn, removes the holding condition from the control lead through the switching network path of office A established for this call. Removal of the holding voltage from the control lead releases the path established through the switching network between the calling subscriber and the out-trunk 255 causing the line circuit 212 and said trunk circuit 255 to return to normal condition. The out-trunk circuit 255 in returning to normal opens the direct-current path extending over the interoffice conductors 260 between out-trunk 255 and in-trunk circuit 310 causing the release of a relay in in-trunk circuit 310 returning to normal the in-trunk circuit 310. The calling subscriber may then originate a new call to another subscriber by altering the setting of the finger wheels on his subset 210 or may make a new attempt to reach the original called subscriber at a later time when he believes the called subscriber may be available.

In the foregoing description of the operation of the present embodiment of the invention on a call from a subscriber in one office to a designated subscriber in a designated second office, the operation of the system has been described for the case in which an entire path to and including the called subscriber's line is idle and available, and for the case in which the called subscriber's line is busy or vacant. A third condition of operation is that in which the trunk or trunks from the calling subscriber's office to the called subscriber's office are busy or vacant. The operation of the invention in this condition of all designated trunks busy or vacant is as described hereafter.

The operations of the system from the origination of a call by the calling subscriber in the first office to the test of the trunks to the designated called office, including all the operations of the control circuits in the first office in receiving from the calling subscriber's subset the information designating the called office and in starting the idle-busy-vacant test of the trunks to said called office, are, of course, the same whether the trunks are idle, busy or vacant.

When the originating receiver and register 215 of the calling subscriber's own office has registered the symbols or numbers designating a second or called central office, it connects itself through connector circuit 216 in lock-out to the trunk number group 218 as previously described for a call to an idle trunk. The receiver 215 acquires for its use test and control leads from cold cathode gas tubes located in the trunk number group 218 and associated with the various trunk groups and control leads to the trunk outlets of these various trunks on the switching network. As before, the receiver 215 applies voltages to fire the gas tube associated with the designated trunk group 218 over a combination of control leads which are associated with the trunk group 218 to the designated called office and its code or called line as registered in the receiver 215. The operation or non-operation of relays in the receiver 215 in series with the leads over which the trunk group gas tube was fired indicates the condition of various discharge paths in said gas tube and thus indicates if there are idle trunks in the group 218, or if all the trunks in the group 218 are busy or that the designated trunk group 218 is vacant. If all the trunks of the group 218 being tested are busy, a group of the test relays in the receiver 215 operate in combination and if the trunk group 218 is vacant, i. e. if there is no trunk group corresponding to the registered trunk code, none of the test relays operate. In the case of either a busy or vacant indication, register 215 fires another gas tube in the trunk number group 218 associated with busy tone trunk 245, or with a group of such trunks. The operation of the busy tone trunk group gas tube places voltage on the control lead to the busy tone trunks which passes through said trunk circuits and connects to the control lead appearances of the idle trunks in the group at the primary switches of the trunk frames. At the same time, voltage is connected by the originating receiver and register 215 to the calling line circuit 212 and then to the appearance of the control lead of this calling line at the primary line switch 220 of the switch network. As described above for the case of a connection from the calling line to an idle trunk to the called office, the voltage applied to the primary trunk switch control lead fires gas diodes in the primary and secondary switches of the trunk frame to various junctor circuits thereby providing through the diodes and their associated cross-point relay windings individual circuits indicating all the idle paths between the trunk appearance or appearances and the junctor circuits. Similarly, the voltage applied to the control lead of the primary line switch fires gas diodes in the primary and secondary switches of the line frame indicating all the idle paths between the line circuit and various junctor circuits. Assume as before that the calling subscriber's station is 210 so that voltage is applied to the control lead of line circuit 212 and in turn to the right vertical of primary switch 220 on line frame 219. Gas diodes in switches 220, 224 and 225 become ionized to indicate that idle paths exist between said calling line and junctors 234, 235, 236, and 237 together with other similar idle paths not shown in detail. Since the trunk to be used for this busy or vacant condition of the designated trunks is busy tone trunk 245, a voltage is applied to the left vertical of primary switch 248 of trunk frame 246 firing gas diodes in primary switch 248 and secondary switches 249 and 250 indicating idle paths between trunk 245 and junctors 238, 235, 240 and 237 together with other similar idle paths not shown in detail. Only junctors 235 and 237 are marked from both the line and trunk sides of the switching network and are thus the only ones associated with possible complete paths between the calling subscriber 210 and the busy tone trunk 245. In recognition of this condition, a cold cathode gas tube in each of the junctors 235 and 237 starts to operate in order to complete a connection. Since the junctor gas tubes are connected in a lock-out circuit associated with the line frame 219, as indicated by lock-out element 242, only one of the gas tubes will operate completely. Assume, for example, that the gas tube in junctor 235 operates thereby selecting this junctor for use and locking out junctor 237. A relay in junctor 235 completes a current path through the gas diodes and the windings of the cross-point relays in switches 220 and 224 of the line frame and switches 248 and 249 of the trunk frame 227. The operation of these cross-point relays completes the talking conductor path from the calling line 210 to the busy tone trunk 245. A relay in line circuit 212, disconnects the originating actuator 214 and originating receiver 215 from the talking conductors and control lead of the line circuit 212. Originating receiver 215 in restoring to normal releases connector 216 and trunk number group 218 which in turn removes the voltage applied to the control lead of busy tone trunk 245. Completion of the talking conductor path from the calling subscriber's station to trunk 245 by the operation of the cross-point relays operates a relay in trunk 245 which places a holding condition on the control lead through the switching network associated with this path under control of the direct-current path through subscriber's subset 210. Completion of the talking path to trunk 245 also established a current flow condition in the talking conductor loop from the trunks through the switching network to the calling subscriber's subset 210 whereby a latch mechanism in the calling subset 210 is tripped removing the signal generating apparatus. When the signal generating apparatus is removed from the talking conductors the talking apparatus is connected in its place. In addition, busy tone trunk 245 connects a distinctive tone to the talking conductors extending to the calling subscriber subset 210 which informs the calling subscriber that he cannot be connected to the designated called office at the present time.

The calling subscriber recognizing the tone then replaces his telephone set on its switchhook or cradle thereby opening the direct-current path between his subset 210 and the busy tone trunk 245 releasing his subset and a relay operated in trunk 245 over this path. The relay in turn, removes the holding condition from the control lead through the switching network. Removal of the holding voltage for the control lead releases the path established through the switching network between the calling subscriber and the busy tone trunk 245, and causes the calling line circuit 212 and the trunk circuit 245 to return to their normal condition. The calling subscriber may then originate a new call to another subscriber by altering the setting of the finger wheels on his subset or may make a new attempt to reach the original called subscriber's office at a later time when he believes a path may be available.

The foregoing description has covered the general operation of the circuits and equipment in an exemplary embodiment of the invention for the case of a call from a subscriber in one office, such as office A in Fig. 2, to a called subscriber in a second office, such as office B in Fig. 3, including not only the successful establishment of the connection designated by the calling subscriber but also the alternate operations of the exemplary system in case said designated connection cannot be established because the called subscriber's line is busy or because all the trunks to the designated called office are busy. The operation of the exemplary embodiment of the invention will next be described for the case of a call from one subscriber in one office, such as office A of Fig. 2, to a second called subscriber in the same office as said calling subscriber.

Briefly, the operation is similar to that described for a call betwen two offices except that the designated outtrunk to which a path is established is one which is connected to an in-trunk in its own office and thus the subsequent operations for terminating the call to the designated called subscriber occur in the circuits of the originating office rather than in a second office as in the previously described case. Considering such an intraoffice call in more detail a description will now be given of the establishment of a connection between one subscriber in office A of Fig. 2 and a second designated called subscriber in the same office for the conditions in which the apparatus and circuit paths required for the connection are idle and available.

Assume, for example, that the subscriber provided with subset 210 desires to make a call to the subscriber with subset 282. The subscriber at subset 210 first presets the signal generating apparatus in accordance with the symbols representing the designation of the called subscriber's station, to which he desires to establish connection. A suitable form of subscribers' station equipment with which the exemplary embodiment set forth herein is designed to cooperate is more fully disclosed in the application of K. S. Dunlap identified above. With the complete desired number present, the subscriber removes the telephone receiver from its cradle or switchhook, completing a direct-current circuit over conductors 211 for the operation of a relay in line circuit 212. The operation of the line relay causes the operation of another relay in line circuit 212 which connects orginating actuator 214 and receiver 215 to the subset 210 and which removes the original direct-current line relay from the conductors 211. The operation of the relay for connecting the calling line to the originating actuator 214 and receiver 215 is made in conjunction with a cold cathode gas tube associated with the line circuit 212 and connected in lock-out with other similar gas tubes in other line circuits as indicated by lock-out element 213. In the event two or more subscribers simultaneously remove their telephone sets from the cradle or switchhook only one of such subscribers will be immediately connected to said originating actuator 214 and all other calling stations will be temporarily held with only their direct-current line relays operated awaiting access to the originating actuator 214 and receiver 215 until the first selected subscriber has been served. The types of gas tube lock-out circuits employed in the present embodiment of the invention and the operation of these lock-outs are set forth more fully in the United States Patent 2,350,888 granted to N. I. Hall on June 6, 1944.

Assume the subscriber subset 210 has been connected by a line circuit 212 to originating actuator 214 for the establishment of the call. Alternating current is supplied from the actuator 214 to the calling subscriber subset 210 causing signaling generating apparatus in the subset 210 to generate dialing signals representing the called subscriber station designation as preset on the finger wheels. These dialing signals are generated at the rate of 90 digits per second, that is, one symbol or number for each ½ cycle of the 45-cycle power transmitted from actuator 214. A complete designation might consist, for example, of three symbols or numbers designating the called subscriber's central office, four digits designating the called subscriber's line number in the office and an additional symbol designating the party letter of the called subscriber associated with the called line number. Under control of the actuator 214 these eight symbols or numbers designating the called subscriber are generated repetitively with each complete cycle being separated from adjacent repetitions by a time interval equal to two digits. A complete transmission of the called station designation is made every ⅙ of a second after the originating actuator 214 has been connected to said calling subscriber's subset 210. Associated with the originating actuator 214 is the originating receiver and register circuit 215. During the intervals in which an actuator 214 is supplying alternating-current power to the calling subscriber's subset 210, the connection between the calling line circuit 212 and the central office switching and control equipment is held under control of a monitoring detector in the actuator 214 in the alternating-current power path. If the calling subscriber returns his telephone set to its cradle or switchhook during such an interval, the interruption of this flow of power current through the subset 210 will result in the release of the connections thus far established for the call and the return to normal of all the associated circuits.

The originating receiver 215 examines the dialing signals generated in the calling subscriber's subset 210 and transmitted to the receiver via conductors 211 through the line circuit 212 and the originating actuator 214. The receiver 215 detects the occurrence of the blank interval between repetitions of the called station designation as an indication of the beginning of such a station designation. Having detected this interval, it then proceeds to decode and register the numbers or symbols represented by the subsequent dialing signals. The receiver and register circuit 215 employed in the present embodiment of the invention may be of the type disclosed in the application of Malthaner et al., Serial No. 68,234, filed on December 30, 1948, which issued as United States Patent 2,615,971 on October 28, 1952, or of the type disclosed in Malthaner et al., Serial No. 35,924, filed June 29, 1948.

In the present embodiment of the invention the originating receiver 215 is arranged to decode and register only those symbols or numbers which designate the called central office. Such central office designation is commonly made by three symbols or numbers which ordinarily will be arranged to occur at the beginning of each complete number transmission from a subset. When receiver 215 has registered the symbols or numbers designating the called central office, it connects itself through connector circuit 216, to the trunk number group 218 for locating an idle trunk to the designated office. Lock-out is required between connector 216 and other similar connectors, such as 267, by the one-at-a-time operation of the switching network and is achieved by means of cold cathode gas tubes included in the trunk number group 218 and the element 217. The testing and selection of paths through the switching network may be performed either by receiver 215 with number group 218 or by receiver 266 with number group 268. The lock-out arrangement between the connectors is provided to insure that only one receiver and number group makes tests and selections on the switching network at one time. The speed of operation of the present embodiment of the invention, however, is such that this one-at-a-time operation does not constitute a practical restriction on the general use of the system. An idle-busy-vacant test is made of the trunks in the designated trunk group 218 and if there is one or more trunks idle, a relay in receiver 215 applies voltage to a control lead which passes through the trunk circuits in the group 218 and connects to the control lead appearances associated with idle trunks at the trunk side of the switching network of the central office. Assume, for example, that the called office designated by the number preset on the calling subscriber's subset 210 and registered in receiver 215 designates that the desired called subscriber is also in office A. By way of example two circuits are shown in Fig. 2 for the establishment of calls originating in office A for other subscribers in the same office. One such circuit, for example, comprises out-trunk 256, conductors 262 and in-trunk circuit 257. Thus in this case, with out-trunks 256 and 258 both idle, voltage is connected from the receiver 215 through these trunks to the appearance of their control leads at the left vertical of primary trunk switch 229 of trunk frame 227 and of primary trunk switch 247 of trunk frame 246 respectively. If one of the out-trunks 256 or 258 is in use in the path of a previously established connection, voltage is connected only to the switching network appearance of the idle trunk. At about the same time, voltage is connected from the originating receiver and register 215 through actuator 214 to the calling line circuit 212 and then to the appearance of this calling line at the right vertical of primary line switch 220 of line frame 219 of the switching network.

In the particular exemplary call being described it is assumed that out-trunks 256 and 258 are found available for service and that calling subscriber station 210 desires connection to one of these trunks. Voltage is applied on the switch control lead associated with this calling line at the right vertical inlet of primary switch 220 on line frame 219. This voltage fires gas diodes between this vertical line switch input and the control lead to each idle horizontal outlet of the primary switch. Assuming in this case that line frame 219 is completely idle, gas diodes between the aforementioned primary line switch control lead input and the control lead outlet to each secondary switch fires, thereby altering the voltage condition on the control leads associated with the primary-secondary link paths 222 and 223. This altered link voltage, in turn, fires gas diodes in the secondary switches between the said link control leads, to which primary gas tubes have been fired, and each associated secondary line switch output path. Thus in the case of a completely idle line frame, gas tubes are fired in the primary and secondary switches completing a control lead path from the input terminal associated with line circuit 212 to line link path 222 to junctor 234, along similar individual idle paths from the same line circuit to junctors 235, 236 and 237, and along other similar paths not shown in detail. In a similar manner, the voltage applied to the control lead of the right primary vertical of trunk switch 229 associated with one of the desired out-trunks, 256, fires gas diodes of the primary and secondary trunk frame switches and in the case of completely idle trunk frame 227, thereby establishes a connection through the fired diodes between the primary vertical control lead, via link path 258 to junctor 234, other similar connections from the same trunk vertical along similar individual paths to junctors 239, 236 and 241 and along other similar paths not shown in detail. Similarly, the voltage applied to the other out-trunk, 258, fires gas diodes in the primary and secondary switches of its trunk frame 246 and in the case of a completely idle trunk frame 246, establishes a connection through the fired diodes between the trunk appearance on the right primary vertical of trunk switch 247 along link 252 to secondary switch 250 and to junctor 240, along other similar paths from the same said trunk vertical to junctors 238, 235 and 237, and along other similar paths not shown in detail. If any of the link or junctor sections of any of the above-described paths through the switching network is in use as part of a previous established connection, the voltage, established by virtue of the holding condition on the control lead of such busy sections, as hereinafter described, is such that the gas diodes will not fire between said busy sections and the adjacent sections to which voltage marks have been extended. Of the various idle line frame and trunk frame paths now marked by ionized gas diodes and shown in detail on the drawing, only the paths with which junctors 235, 237 are associated form possible complete paths between calling line circuit 212 and trunk 258. Junctors 234 and 236 are associated with possible complete paths between the said calling line circuit and the other available desired out-trunk 256. The other junctor circuits which had been marked from the trunk side of the switch network, for example 241, terminate at line frames other than line frame 219 on which the calling line appears. Junctor circuits 234, 235, and 237, by means of the combination of altered voltages on the two control leads connected to each said junctor, recognize that they are associated with a possible complete desired path through the switching network and start to function to complete the path. A cold cathode gas tube in each of these junctors is connected in a lock-out circuit associated with the line frame as indicated by lock-out element 242 so that only one of said junctors 234 and 235 will succeed in fully operating. Assume for example, that in this case junctor 234 operates and that the other junctors associated with this line frame are locked out. This lock-out arrangement of selecting an idle path through the switching network in this case selects not only such a path but also selects one trunk from the group of idle trunks available for use in the call. This feature of automatic selection of trunks within a trunk group is made possible by the switching network plan employed in this system if the trunks in a common group are distributed over the trunk frames of the office in such a way that only one trunk of a group appears on each trunk frame.

With junctor 234 selected for service in the call, a relay in the junctor 234 completes a circuit through the gas diodes and cross-point relay coils associated with the control lead path from the calling line to junctor 234 causing sufficient current to flow in the path to operate the cross-point relays. A similar current flow circuit is completed in the control lead path from junctor 234 through the primary and secondary cross-point relays and diodes of trunk frame 227 to out-trunk 256 for operating the cross-point relays associated with this path. The operation of these four cross-point relays completes a talking connection between said calling subscriber station 210 and out-trunk 256. A relay in line circuit 212, associated with the control lead and operating in series with the line frame cross-point relays, disconnects the originating actuator 214 and the originating receiver 215 from the talking conductors and control lead of the calling line. Originating receiver 215 in now restoring to normal releases connector 216 and trunk number group 218 which in turn removes the voltage applied to the control lead of out-trunks 256 and 258. Completion of the talking path from the calling subscriber's station 210 by the operation of the cross-point relays operates a relay in the out-trunk circuit 256 which places a holding condition on the control lead through the switching network associated with this path. In addition, the out-trunk 256 connects outward actuator 244, common to a plurality of out-trunks, to the talking conductors of the path by means of a relay and gas tube in the out-trunk 256. The gas tube, as indicated by common element 243, is in a lock-out arrangement with similar gas tubes in other out-trunks in the same actuator group 244 so that, in the event of a simultaneous attempt to connect the actuator 244 to more than one trunk, one trunk will be connected and the other trunks locked out. Other outward actuators, not shown, may simultaneously be connected to other out-trunks which are in different actuator groups. The actuator supplies 45-cycle power through the out-trunk 256 and over the connection through the line and trunk switches to the calling subscriber's subset 210. The subset 210 continues to generate repetitively the complete cycle of dialing signals representing the called destination. Out-trunk circuit 256 also completes a direct-current circuit over the local loop 262 for the operation of a relay in in-trunk 257. The operation of the relay in in-trunk 257 causes the connection of the incoming receiver and register circuit 266 to trunk 257 by the use of the cold cathode gas tube in the in-trunk circuit 257. The gas tubes are connected in lock-out with similar gas tubes in other in-trunk circuits which may simultaneously be attempting to connect to receiver 266 as indicated by common element 265. Incoming receiver 266, when connected to in-trunk 257, receives over the established connection to the calling subscriber's subset generating equipment the dialing signals representing the complete called station designation. The receiver 266 detects the blank interval occurring between repetitions of the called number as an indication of a start of a transmission of such number, recognizes the occurrence of the symbols or numbers representing the desired office without decoding or registering this office code information, and then registers the succeeding signals designating the called subscriber's line number and party letter. The receiver and register circuit 266 employed in the present embodiment of the invention may be of the type disclosed in the applications to Malthaner et al., Serial No. 68,234, filed on December 30, 1948, which issued as United States Patent 2,615,971 on October 28, 1952, and Malthaner et al., Serial No. 35,924 filed June 29, 1948.

When the complete number designating the called subscriber has been received by receiver 266, the receiver operates a relay in in-trunk 257 reversing the direction of direct-current flow over the local leads 262 and thereby causing the operation of a polarized relay in out-trunk 256. The operation of the relay in out-trunk 256 causes the release of outward actuator 244 from the trunk circuit and in addition indicates that signaling has been completed by altering the circuit conditions on the loop extending between the out-trunk 256 and the calling subscriber's subset 210. The alteration of the circuit conditions effectively trips a latch mechanism in the calling subset 210 which removes the signal generating apparatus from the talking conductors and connects the talking apparatus to the circuit. A holding condition on the established connection through the switching network is maintained thereafter under the control of a relay in the trunk circuit 256 operated by direct current flowing in the talking conductors and through the subset 210. When the particular called line designation has been received by the incoming receiver 266 it connects itself to the subscribers' number group 268 through connector circuit 267 in lock-out acquiring for its use the test and control leads from the various subscribers' lines of office A. Over a combination of these leads associated with the designated called line number, the incoming receiver 266 applies voltages to fire a gas tube in that particular called line circuit and by the operation and non-operation of relays, in the line test leads in the receiver associated with the various discharge paths of the line gas tube, makes an idle-busy-vacant test of said line. If the line is idle, one of these relays operates and the receiver 266 supplied voltage for the further operation of the line circuit gas tube which, in turn, places a voltage mark on the control lead to the primary switch appearance of the line. At the same time the operation of the relay in the register 266 also connects a voltage to the incoming trunk 257 which is to be connected to the designated line. These voltages applied to the designated in-trunk 257 and called line appearances at the switching network start the sequence of operations whereby idle paths between said trunk and said line are located. In addition to applying these switching network control voltages when the called line is found to be idle, the receiver 266 also operates a relay in the in-trunk circuit 257 which connects ringing power to the talking conductors at the called subscriber's end of the trunk and ringing tone of the talking conductors extending to the calling subscriber's subset 210.

The voltage from the register 266 to the in-trunk 257 is connected, in turn, to the control lead of the primary trunk switch 228 on which said trunk appears. The voltage thus applied to the primary trunk switch control lead fires gas diodes in the primary and secondary switches of the trunk frame 227 to various junctor circuits providing the individual circuits indicating all the idle paths between this trunk appearance and various junctor circuits in a manner similar to that described for office A on the originating part of the call. Similarly, the voltage applied to the control lead of the primary line switch appearance of the desired called line fires gas diodes in the primary and secondary switches of this line frame indicating all the idle paths between the line circuit and various junctor circuits.

It was assumed, for example, that the desired subscriber station is 282 in which case voltage is applied to the control lead of line circuit 280 and in turn to the right vertical of primary switch 272 on line frame 270. Gas diodes in primary switch 272 and secondary switches 273 and 274 become ionized to indicate that possible idle paths exist via links 276 and 277 between the called line and junctors 238 and 239, 240 and 241 provided the links or junctors are not in use as part of a previously established connection. Other similar marking paths not shown in detail are similarly established. Since the in-trunk for this call was assumed to be 257, the voltage mark is applied to the right vertical of primary switch 228 of trunk frame 227. Gas diodes in primary switch 228 and secondary switches 232 and 233 are fired indicating idle paths via links 231 and 230 to junctors 234, 236, 239 and 241 provided the links or junctors are not in use as part of a previously established connection. If any of the link or junctor sections of any of the above-described paths through the switching network is in use as part of a previous established connection, the voltage, established by virtue of the holding condition on the control lead of such busy sections as hereinafter described, is such that the gas diodes will not fire between said busy sections and the adjacent sections to which voltage marks have been extended.

Of the group of junctors to which voltage marks extend, only junctors 239 and 241 are marked from both the line and trunk sides of the switching network and are thus the only ones associated with complete paths between the in-trunk 257 and the designated called line 282. In recognition of this voltage marking condition, a cold cathode gas tube in each of said junctors 239 and 241 starts to operate in order to complete the connection. The junctor gas tubes however are connected in a lock-out circuit associated with the line frame as indicated by lock-out element 279, and only one of the gas tubes fully operated. Assume for example, that the gas tube in junctor 241 operates thereby selecting junctor 241 for use and locking out junctor 239. A relay in junctor 241 completes a current path through the gas diodes and cross-point relays in switches 233 and 228 of the trunk frame 227 and switches 274 and 272 of the line frame 270. The operation of these four cross-point relays completes a talking path from in-trunk 257 via links 231 and 277 to the desired subscriber's station 282. The operation of a relay in line circuit 280 in series with the control lead removes from the line talking conductors the line circuit apparatus used in originating a call. The operation of a relay in incoming trunk 257 in series with the control lead results in the disconnection of the incoming receiver 266 from said trunk and the placing of a holding condition under control of the direct-current flow in the interoffice conductors on the control lead associated with this talking path. The direction of direct-current flow over the talking conductors between the in-trunk and the out-trunk is returned to its original direction releasing the polar relay in the out-trunk 256. Incoming receiver 266 in now restoring to normal releases connector 267 and number group 268.

With a complete path established from calling subscriber's subset 210 to the calling subscriber, the calling subscriber is informed of the establishment of such a path by the ringing tone transmitted to calling subset 210 by the in-trunk circuit 257 and the called subscriber is summoned to his subset 282 by the operation of the ringing apparatus by the ringing power connected to subset 287 by the in-trunk 257. When the called subscriber answers the call a direct-current path is completed through subset 282 for operating a relay in the in-trunk 257 which removes the ringing power and ringing tone from the talking conductors, completes the circuit between the talking conductors to the calling subscriber and the talking conductors to the called subscriber and establishes an additional holding condition on the switch network connections under control of the direct current flowing through the called subset 282. The in-trunk 257 again reverses the direction of direct-current flow over the talking conductors to the out-trunk 256 reoperating the polar relay in the out-trunk 256 as an indication that the calling subscriber may be charged for the call. The in-trunk 257 also establishes current flow condition in the talking conductor loop from in-trunk 257 to the called subscriber's subset 282. A latch mechanism in the called subset 282 is tripped removing the signaling generating apparatus from the talking conductors and connecting the talking apparatus to said talking conductors, allowing subscribers to engage in conversation.

When the calling and called subscribers replace their telephone sets on the switchhook or cradle at the end of the conversation, a relay in out-trunk 256 and a relay in in-trunk 257 release. The release of trunks 256 and 257 removes respectively the holding conditions from the control lead to the path established through their respective sections of the switching network causing the release of the paths and the return to normal of the central office circuits associated with this conversational connection.

It is to be understood that the method of self-selection of an out-trunk within a group of out-trunks to the same destination by the operation of a path-selecting gas tube in the junctor circuits of the switching network can be applied to any such group of trunks whether such group terminates in in-trunk circuits of its own office as described in the just preceding section or whether such out-trunks terminate in a second office as described previously for a call between office A and office B. In the specific embodiment of the invention here disclosed only one trunk circuit is shown connecting from office A to office B, although additional interoffice trunk circuits could obviously be provided in which case the above-described method of self-selection within the trunk group would also be employed for this group of trunks.

The foregoing description of a call from a subscriber in office A to another called subscriber in the same office assumed that the designated called subscriber's line was idle and, therefore, described the successful establishment of a talking connection between the calling subscriber in office A and the designated idle called subscriber also in office A. However, if the called subscriber's line is busy or vacant, a connection to said designated called subscriber's line should not be made and in such a case the operation of the exemplary system is as described hereafter.

The operations of the system from the origination of a call by the calling subscriber in the office to the test of the called line for busy, idle or vacant condition by the incoming receiver 266 in the office are, of course, the same whether the called line is idle, busy or vacant. These operations include all the operations of the control circuits in the office in receiving in receiver 215 the information designating the called office and in setting up a connection through the switching network of said office to an out-trunk to the called office, and the operations of the control circuits in said called office in receiving from the calling subscriber's subset the information designating the called line number and in starting the idle-busy-vacant test of said called line.

When the complete called line designation has been received by the incoming receiver 266, it operates a relay in in-trunk circuit 257 reversing the direction of direct-current flow in the local leads 262 and thereby causing the operation of a polarized relay in out-trunk 256. The operation of the relay in out-trunk 256 causes the release of outward actuator 244 from the trunk circuit and in addition indicates that signaling has been completed by altering the circuit conditions on the loop extending between the out-trunk 256 and the calling subscriber's subset 210. The alteration trips a latch mechanism in the calling subset 210 which removes the signal generating apparatus from the talking conductors, connects the talking apparatus to the circuit, and places the holding of the established connection under the control of the direct current flowing through the calling subset 210. The incoming receiver 266 connects itself to the subscriber's number group 268 through connector circuit 267 in lock-out, as previously described for the call to an idle line, acquiring for its use test and control leads from the various subscriber's lines of office A. As described above the incoming receiver 266 applies voltages to fire a gas tube in that particular called line circuit over a combination of these leads associated with the designated called line number. By the operation and non-operation of relays in the line test leads in the receiver 266 associated with various discharge paths of the line gas tube makes an idle-busy-vacant test of the line. If the line is busy, a group of these test relays operate in combination and if the called line is vacant, i. e. if there is no subscriber associated with the registered called line designation, none of these relays operate. In either case, busy or vacant, register 266 operates a relay in the incoming trunk 257 in use on the call, which connects a distinctive tone to the talking conductors extending from trunk 257 to the local intertrunk conductors. In the specific embodiment of the invention as herein set forth, the same tone is used for both the busy and vacant condition; but by providing separate busy and vacant relays in the incoming trunk and separate control leads between these relays and the receiver, a tone distinctive of each condition may be provided.

The establishment of said busy or vacant tone condition in the incoming trunk 257 also results in the disconnection of the incoming receiver and register 266 from trunk 257 restoring the receiver 266 to normal and releasing connector 267 and number group 268. Thus in this condition of a busy or vacant condition at the called subscriber's line, no path through the switching network between the incoming trunk 257 and the called subscriber's line 280 is set up.

In the specific exemplary call previously used, establishment of this busy or vacant condition in in-trunk 257 causes the transmission of a tone over conductors 262 and through out-trunk 256, trunk switches 229 and 232, line switches 224 and 220 and subscriber's line circuit 212 to the calling subscriber's subset 210. This tone informs the calling subscriber that he cannot be connected to the designated called line at the present time.

The calling subscriber then replaces his telephone set on its switchhook or cradle thereby opening the direct-current path between his subset 210 and out-trunk 256, releasing a relay operated in trunk 256 which removes the holding condition from the control lead through the switching network path established for this call. Removal of the holding voltage from the control lead releases the path established through the switching network between the calling subscriber and the out-trunk 256 causing the line circuit 212 and the trunk circuit 256 to return to their normal condition. The out-trunk circuit 256 in returning to normal opens the direct-current path extending over the conductors 262 between out-trunk 256 and in-trunk circuit 257 thereby causing the release of a relay in in-trunk circuit 257 returning to normal the in-trunk circuit 257. The calling subscriber may then originate a new call to another subscriber by altering the setting of the finger wheels on his subset 210 or may make a new attempt to reach the original called subscriber at a later time when he believes the called subscriber may be available.

In the foregoing description of the operation of the present embodiment of the invention on a call from one subscriber in office A to a second designated subscriber in the same office, the operation of the system has been described for the case in which an entire path to and including the called subscriber's line is idle and available, and for the case in which the called subscriber's line is busy or vacant. A third condition of operation is that in which the out-trunk or trunks from the office to the in-trunk or trunks of the same office are busy or vacant. The operation of the invention in this condition of all designated trunks busy or vacant is as described hereafter.

The operations of the system from the origination of a call by the calling subscriber in the office to the test of the trunks to the designated called office, including all the operations of the control circuits in the office in receiving from the calling subscriber's subset the information designating the called office and in starting the idle-busy-vacant test of the trunks to said called office, are of course, the same whether the trunks are idle, busy or vacant.

When the originating receiver and register 215 of the calling subscriber's own office has registered the symbols or numbers designating the second or called central office, it connects itself through connector circuit 216 in lock-out to the trunk number group 218 as previously described for a call to an idle trunk. The receiver 215 thus acquires for its use test and control leads from cold cathode gas tubes located in the trunk number group 218 and associated with the various trunk groups and control leads to the trunk outlets of these various trunks on the switching network. As described above, the receiver 215 applies voltages to fire the gas tube associated with said designated trunk group 218 over a combination of these control leads which is associated with the trunk group 218 to the designated called office and its code as registered in the receiver 215. The operation or non-operation of relays in the receiver 215 in series with the leads over which the trunk group gas tube was fired indicates the condition of various discharge paths in the gas tube and thus indicates that there are idle trunks in the group 218 or that all the trunks in the group 218 are busy, or that the designated trunk group 218 is vacant. If all the trunks of the group 218 are busy, a group of the test relays in the receiver 215 operates in combination and if the trunk group 218 is vacant, i. e., if there is no trunk group corresponding to the registered trunk code, none of the test relays operate. In this case of either a busy or vacant indication, register 215 fires another gas tube in the trunk number group 218, associated with a busy tone trunk 245, or with a group of such trunks. The operation of the busy tone trunk group gas tube places voltage on the control lead to the busy tone trunk 245 which passes through the trunk circuits and connects to the control lead appearances of the idle trunks in the group 218 at the primary switches of the trunk frames. At the same time, voltage is connected by the originating receiver and register 215 to the calling line circuit 212 and then to the appearance of the control lead of this calling line at the primary line switch of the switch network. As described above for the case of a connection from the calling line to an idle trunk to the called office, the voltage applied to the primary trunk switch control lead fires gas diodes in the primary and secondary switches of the trunk frame to various junctor circuits. The firing of the tubes provides through the diodes and their associated cross-point relay windings individual circuits indicating all the idle paths between this trunk appearance and the junctor circuits. Similarly, the voltage applied to the control lead of the primary line switch appearance of the calling line fires gas diodes in the primary and secondary switches of the line frame indicating all the idle paths between the line circuit and various junctor circuits. Assume as before that the calling subscriber's station is 210, in which case voltage is applied to the control lead of line circuit 212 and in turn to the right vertical of primary switch 220 on line frame 219, and gas diodes in switches 220, 224 and 225 become ionized to indicate that idle paths exist between the calling line and junctors 234, 235, 236 and 237 as well as other similar paths not shown in detail. Since the trunk to be used for this busy or vacant condition of the designated trunks is busy tone trunk 245, a voltage is applied to the right vertical of primary switch 248 of trunk frame 246 in turn firing gas diodes in primary switch 248 and secondary switches 249 and 250 indicating idle paths between trunk 245 and junctors 238, 235, 240 and 237 as well as other similar paths not shown in detail. Of this group of junctors shown to which voltage markers extend, only junctors 235 and 237 are marked from both the line and trunk sides of the switch network and are thus the only ones shown which are associated with possible complete paths between the calling subscriber 210 and the busy tone trunk 245. In recognition of this condition, a cold cathode gas tube in each of said junctors 235 and 237 starts to operate in order to complete a connection. Since these junctor gas tubes are connected in a lock-out circuit associated with the line frame 219, as indicated by lock-out element 242, only one of the gas tubes will operate completely. Assume, for example, that the gas tube in junctor 235 operates and selects this junctor for use locking out junctor 237. A relay in junctor 235 completes a current path through the gas diodes and the windings of the cross-point relays in switches 220 and 224 of the line frame and switches 248 and 249 of the trunk frame, and the operation of these cross-point relays completes the talking conductors path from the calling line 210 to the busy tone trunk 245. A relay in line circuit 212, associated with the control lead and operating in series with the cross-point relays of the line frame, disconnects the originating actuator 214 and originating receiver 215 from the talking conductors and control lead of the line circuit 212. Originating receiver 215 in now restoring to normal releases connector 216 and trunk number group 218 which in turn removes the voltage applied to the control lead of busy tone trunk 245. Completion of the talking conductor path from the calling subscriber's station to trunk 245 by the operation of the cross-point relays operates a relay in trunk 245 which places a holding condition under control of the direct current flowing through the calling subset 210 on the control lead through the switching network associated with this path. Completion of the talking path to trunk 245 also establishes a current flow condition in the talking conductor loop from trunk 245 through the switching network to the calling subscriber's subset 210. The establishing of the current flow trips a latch mechanism in calling subset 210 which removes the signal generating apparatus and connects the talking apparatus to said talking conductors. In addition, busy tone trunk 245 connects a distinctive tone to the talking conductors extending to the calling subscriber subset 210 which informs said calling subscriber that he cannot be connected to the designated called office at the present time.

The calling subscriber recognizing the tone then replaces his telephone set on its switchhook or cradle thereby opening the direct-current path between his subset 210 and the busy tone trunk 245. The interruption of current flow releases his subset 210, and a relay operated in trunk 245 which removes the holding condition from the control lead through the switching network. Removal of the holding voltage for the control lead releases the path established through the switching network between the calling subscriber and the busy tone trunk 245, in turn, causing the calling line circuit 212 and said trunk circuit 245 to return to their normal condition. The calling subscriber may then originate a new call to another subscriber by altering the setting of the finger wheels on his subset or may make a new attempt to reach the original called subscriber's office at a later time when he believes a path may be available.

Having described the general arrangement and functioning of the invention, the operation of the present embodiment will now be described in more detail for various types of calls with reference to Figs. 5 to 22 which show the apparatus and circuits of a central office. Fig. 4 shows how the above figures should be placed in relation to one another to completely disclose the invention.

Figure 6:
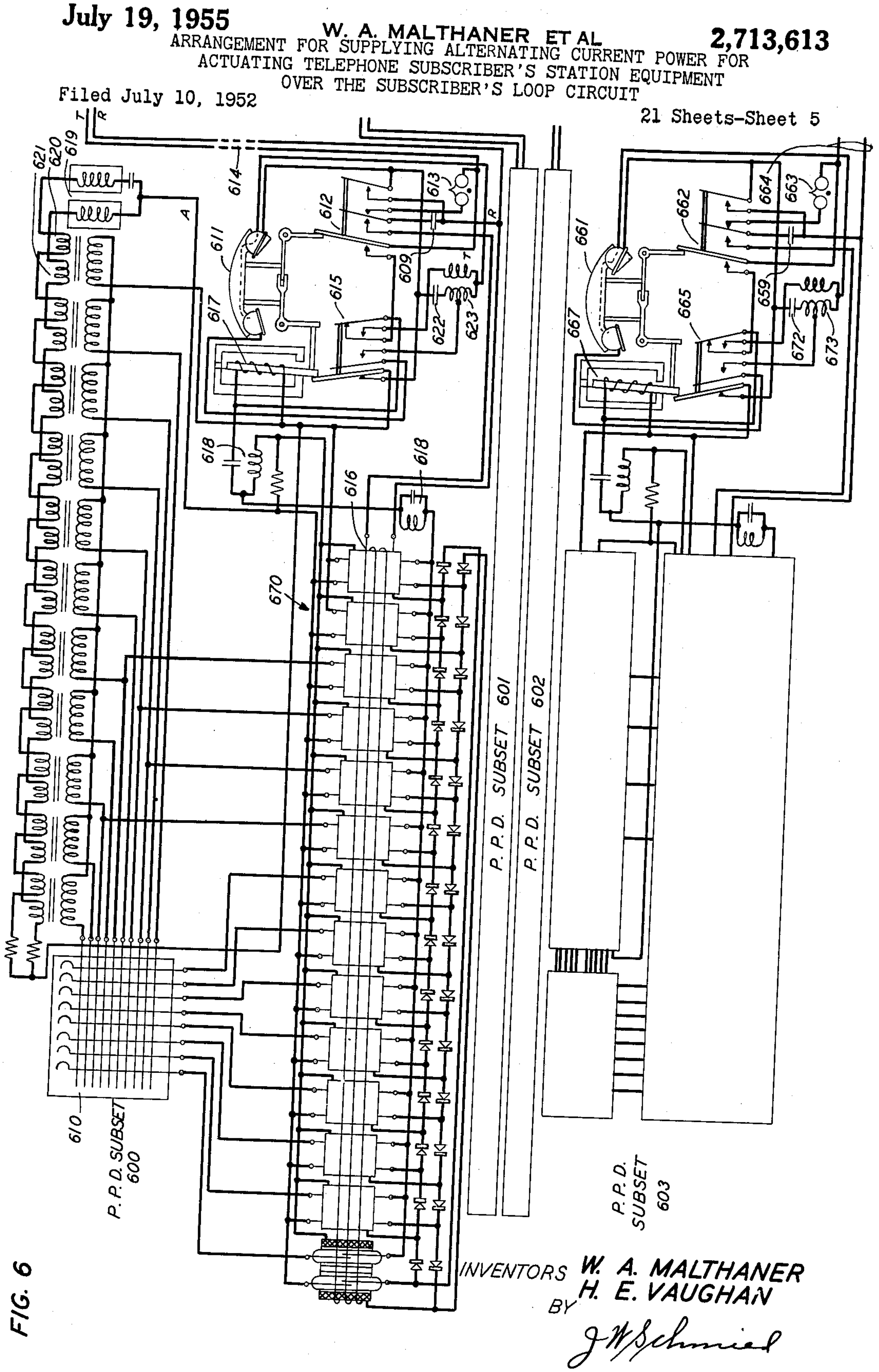

Fig. 6 shows four subscriber subsets 600, 601, 602 and 603 where subset 600 is shown in detail which may be in accordance with the disclosures in patent application of K. S. Dunlap, Serial No. 298,166, filed on same date herewith. When the subscriber of subset 600 places a call, he first sets up the desired number on the finger wheels or other manually settable selectors associated with digit selector switch 610, thereby making a connection between each vertical digit wire and the corresponding desired horizontal digital value busses.

At and before this time a charge is maintained on the ringer capacitor 609 by the negative battery in the central office. After the number is preset the subscriber lifts the handset 611 from the cradle so that switchhook contacts 612 are operated. The operation of contacts 612 close the tip and ring I and R, respectively, of the subscriber's line 614 through the switchhook contacts 615, which are maintained in the position shown in the drawing, to the signal generating apparatus of the subset. At the same time the charge on ringer capacitor 609 is transferred through a discharge path to the bias coil 616 surrounding the relays of the stepping chain 670. This discharge kick is necessary to insure that the stepper 670 starts operating in its proper mode. The discharge current from the ringing capacitor 609 positions one relay in an operated position and all the other relays of the stepping chain 670 in an unoperated position.

A direct-current path to the central office is established over the line 614 through the operated contacts 612, the mechanically held contacts 615, and the winding of the latch magnet 617.

Figure 8:
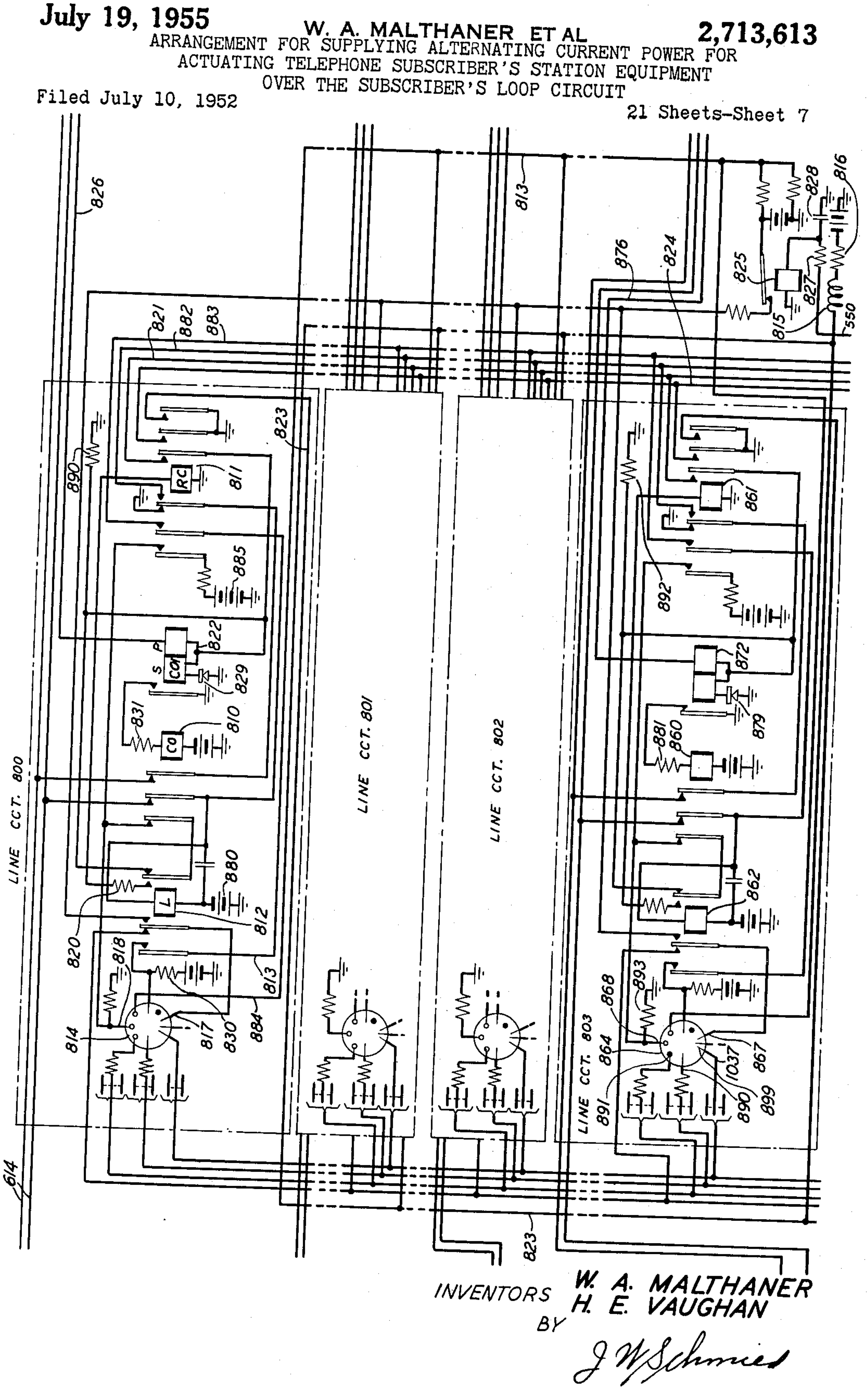

At the central office the subscriber's line is connected to a line circuit, four of which 800, 801, 802 and 803 are shown in Fig. 8. Line 614 is connected to line circuit 800 which is shown in detail. Ground is supplied to the tip of line 614 through a back contact of relay 811 and a back contact of relay 810. This ground extends through the direct-current path of line 614 and subset 600, as described above, back over the ring lead, through back contacts on relay 810 and the winding of relay 812 to negative battery 880. A continuous circuit is thus effected by the lifting of the subscriber's receiver and current flows in the winding of relay 812 causing its operation. When the relay 812 operates a high positive potential which is common to all line circuits, is applied through line 813 to the anode of the right control gap of cold cathode gas tube 814. The cathode of this control gap is connected through line 884 in common with all other line circuits to inductor 815 in series with resistor 816 and thence to negative battery. If no other line tubes are fired, there exists no potential drop across the common inductor 815 and resistor 816 and the voltage difference between anode and cathode of the control gap of tube 814 causes a breakdown of the gap. The discharge transfers to the gap from the main anode 817, which is energized by the operation of relay 812, to the control cathode of the tube and then to the gap from the main anode 817 to the main cathode 818 of tube 814. The cathode 818 is connected through a back contact of relay 810, a series make contact of relay 812, a resistor 820 to the winding of relay 811 to ground. Thus when ionization is transferred across the main gap of tube 814, the relay 811 is energized.

If the line relay of some other line circuit or of several line circuits, similar to relay 812 in line circuit 800, operated at the same time as relay 812, the lock-out elements 815—816 common to the start cathodes of the gas tubes of all line circuits would insure that only one of the tubes could remain fired on its secondary anode-start cathode gap. Which tube reaches this condition is a matter of chance since it is a function of start gap breakdown voltage, transfer voltage and transfer current, all of which vary from tube to tube and are somewhat dependent on the past history of the tube.

When several of the tubes start to fire on their start gaps, current flows in the lock-out impedance 815—816 producing a voltage drop thereacross so that the voltage across the start gap of all tubes is reduced and usually only one tube will be fired. If more than one tube is fired, only one will transfer to the secondary anode-start cathode gap due to differences in the various tubes. The transfer produces an increased current in the common impedance 815—816 causing a voltage drop capable of preventing any other tube from firing. This means of producing lock-out between line tubes has been disclosed in United States Patent 2,350,888 granted to N. I. Hall on June 6, 1944

When conduction in tube 814 occurs from main anode 817 to main cathode 818, current flows in the winding of relay 811 causing it to operate. Operation of relay 811 causes the tip and ring of the line to be transferred from ground and the winding of relay 812 to the leads 882 and 883 and also connects the lead common to both windings of relay 822 to line 821 leading to the trunk number group of Fig. 9, where a positive voltage mark will be applied later as is hereinafter described. The operation of relay 811 also connects ground to lead 823 which is common to all the line circuits 800 through 803, from the receiver shown in Fig. 5, to lead 824 from relay 911, and closes a circuit from positive battery 885 through contact of relay 811, to cathode 818 and through a contact of relays 810 and 812, the winding of relay 811 to ground. The current flows through relay 811 from battery 885 and locks the relay 811 closed as long as relay 810 remains unenergized and relay 812 energized. The connection of positive potential from battery 885 to cathode 818 extinguishes the tube 814 making the tube 814 appear busy to callers. Thus at this time we have tube 814 extinguished, but lock-out maintained, relays 811, 812 and 911 operated and the tip and ring of the line connected to lines 882 and 883.

The lines 882 and 883 lead to the primary 571 of transformer 513 through a capacitor 570. The lead 882 is also connected through the secondary 970 of the transformer 971 to ground. The 45-cycle alternating current flows through the transformer 971 initiated from the power amplifier 913 over lead 912. The 45-cycle current flows over a path from ground, to secondary 970, line 882, front contact of relay 811, back contact of relay 810, to the tip lead of line 614, operated contacts 612, unoperated contacts 615, filter 618, phasing network 619, primaries 620 and 621, back through unoperated contacts 615, operated contacts 612, ring lead of lines 614, back contact of relay 810, winding of relay 812, and battery 88 0to ground. Some of the 45-cycle current flows through the primary 571 of transformer 513 but is sufficiently attenuated by the band pass filter 517. The capacitor 570 blocks the direct current from the primary 571.

If the subscriber hangs up after the energization of relay 811, the path through the subset 600 is broken due to the opening of contacts 612, causing the release of relays 812, 811 and 911 and disconnecting the line circuit 800 from the actuator 900.

If the subscriber does not hang up, the 45-cycle current over the path through relay 812 continues to pass through the subset 600. At the subset the current also passes through the winding of the latch magnet 617 producing no appreciable magnetic flux in the latch due to the high impedance of the coil. In parallel with the latch winding 617 the current also passes through the stepping chain 616 and a phase shifting network 618. The power amplifier 913 has a high impedance output which tends to provide constant current to the subset 610 regardless of the length of the subscriber's line and to reduce effects of noise pick-up. The amplifier 913 may be any conventional amplifier with sufficient power output and having substantial current feedback from output to input.

Operation of the subset 610 under control of an actuator is disclosed in the aforementioned application of K. S. Dunlap. The subset 610 generates pulse position signals, one digit for each half cycle of the 45 cycles. The eight preset digits are transmitted, followed by a silent interval of two digits duration and the signaling process is repeated each one-ninth second as long as power is supplied by the power unit 913. Each digit comprises a start pulse followed after a controlled time interval by a stop pulse, the interval between the start and stop pulses determining the value of the digit. These signal pulses pass over line 614 on a loop basis, through the relays of line circuit 800 and the primary winding 571 of transformer 513, of the signal receiver of Fig. 5. This receiver may be of the type disclosed in the above-mentioned patent application of W. A. Malthaner et al., Serial No. 35,924 or the type disclosed in the above-mentioned patent application of W. A. Malthaner et al., Serial No. 68,234 which issued as United States Patent 2,615,971 on October 28, 1952, both of which are designed to cooperate with the hereinbefore-mentioned subset. In the specific embodiment shown the receivers used in the originating office are similar to the one described in the first of said aforementioned applications with a few additions which will be described in detail.

Due to the operation of relay 811, as described above, ground was applied on lead 824 to operate relay 911. The operation of relay 911 applies a ground connection to conductor 824, causing the operation of relays 510, 511 and 512 in the receiver. Operation of relay 512 applies battery 551 to lead reset "A" which in turn prepares the receiver for operation. Closure of the lower contact on relay 510 causes operation of a counting device 514 which records the number of times the receiver is used. The upper contact of relay 510 in closing completes a path from the left winding grounded secondary of repeat coil 513 to band pass filter 517 through which the signals pass. Release of relay 511, which has its contacts normally biased closed, removes a termination from secondary of repeat coil 513, and releases relay 515 and relay 516, which are normally operated and which in turn prepare the rest of the receiving circuit for operation.

The signaling pulses, as received by the receiving circuit through the path described above, first pass through filter 517 to the volume limiter 518 causing the gain of the limiter 518 to be set at the proper level as described in the above-identified application of W. A. Malthaner et al. In addition, these pulses after being repeated by the limiter circuit 517 are transmitted to the code detector 520 through amplifier 519. The detector 520 is provided with a timing circuit which recognizes the blank interval between the series of pulses representing a complete called number designation. The other circuits of the receiver are rendered ineffective and are blocked until such a blank interval is received. At this time, the code detector 520 as well as the other portions of the start circuit respond to the blank interval and cause the various other circuits of the receiver to be conditioned to thereafter receive the pulses. These circuits then respond to the succeeding pulses received from the subscriber station and cause the magnitudes represented by the various pulses to be stored on binary counters 531, 532 and 533. Any suitable number of such counters may be provided, one counter for each digit of the called subscriber's designation which is to be employed to control the switching equipment at the switching center. In this case since three digits are required to designate a desired central office, three such counters are provided to register the first three digits occurring in a train of pulses from a calling subscriber's subset.

As set forth in the above-identified application of K. S. Dunlap and the above-identified application of W. A. Malthaner et al., when pulses of short duration of the type described above are transmitted over voice frequency communication paths and through the various types of associated equipment such as repeat coils, amplifiers, condensers, filters and the like, transient currents are set up which effectively prolong the pulses as received. In addition, since the signal generating equipment at the subscriber station 600 is operated by power received over the subscriber's line 614, it is desirable to separate the power currents from the signaling currents generated by the calling equipment. Due to the above factors and also to reduce the effects of noise and extraneous currents, the band pass filter 517 is provided. This filter likewise tends to have transients set up in it due to the application of signaling pulses to it. As a result a signaling pulse which is about one-thousandth of a second in duration as transmitted is extended or lengthened to above 3½ thousandths of a second by the above-described effects. Consequently, pulses must be spaced farther apart than this time interval. This minimum time interval together with the length of the pulses and the information to be conveyed by the pulses as set forth in the above-identified applications of W. A. Malthaner et al. and K. S. Dunlap requires about 12½ milliseconds for the transmission of each digit in an exemplary system such as set forth herein.

In order to more clearly describe the operation of the system it has been assumed that each time interval assigned to a digital position has been divided into twenty-five increments each increment being slightly less than ½ millisecond. Thus, each received pulse persists for approximately seven increments not including the one in which the pulse starts or is transmitted. In order to recognize the pulses more accurately and to distinguish them from noise and also to render the system less subject to noise interference, provision has been made to block the receiving equipment for approximately seven increments of time following the reception of each pulse.

As set forth above, the pulses are received and amplified by the volume limiter circuit 518. The gain of the volume limiting amplifier 518 is automatically regulated so that the amplitude of the pulses therefrom are substantially independent of the amplitude of the pulses as received. Pulses are then further amplified by amplifier 519 and then supplied to code detector 520 and digit detector 521. As described above, the code detector 520 together with the blank interval timer 522 recognize the blank interval between each complete series of pulses representing an entire subscriber station designation. The digit detector 521 is normally inoperative but in response to the operation of the blank interval timer 522 which in turn operates the code start circuit 523, the digit detector 521 is rendered operative so that it will respond to the succeeding pulses received from the calling device of subscriber station 600. The first start pulse thereafter is received by the digit detector 521 and is employed to control the square wave generator or switching device 524 which starts the operation of a timing circuit such as multivibrator 525. The switching device 524 also causes the steering and stepping circuit 526 to condition the digit steering circuit 527 so that when pulses are applied to it, as will be described hereinafter, they will be directed to the first digit counting and storing circuit 531.

In response to the first start pulse applied to digit detector 521, disabling circuit 541 is actuated to render the digit detector 521 unresponsive to any further received currents for the interval of time required for the signal transients to decay substantially to zero. At the end of this time digit detector 521 is again rendered operative so that it will properly respond to the stop pulse. During this time the multivibrator or timing circuit 525 has been arranged to transmit or generate seven pulses which are applied to the selective switching circuit 529. The selective switching circuit 529 was set by the output of square wave generator 524 and switch controlling circuit 528 in response to the first start pulse, as described above, causing the first pulses received thereby to be transmitted to counter circuit 530. The counting circuit 530 counts seven of these pulses, or the pulses received during the time the transient of the initial or start pulses is dying out. At the end of the seventh pulse counting circuit 530 actuates switching control circuit 528 so that switch 529 is actuated to a position or condition where it causes the remaining pulses received from multivibrator 525 to be transmitted through digit steering circuit 527 instead of to counter 530. Each succeeding pulse from the source 525 is then transmitted through switch 529 and digit steering circuit 527 to binary counter circuit 531 which counts each of the succeeding pulses.

If the first digit has a magnitude of one, the timing multivibrator 525 will have time to transmit only one pulse to the counting circuit 531 before the stop pulse will be received. If the magnitude of the first digit is five, then five pulses will have been transmitted to circuit 531 before the stop pulse is received. Thus, the time of reception of a stop pulse relative to a start pulse is employed to designate the magnitudes of the digits or characters of the designation of the called station code. The reception of the stop pulse operates digit detector 521 and square wave generator 524 to stop the operation of multivibrator 525. The stop pulse also causes the digit detector 521 to be disabled by disabler 541 for seven increments of time during which the transients associated with the stop pulse can decay. The next or second start pulse will then cause the circuits to operate in a manner similar to that described above in reference to the first start pulse except that stepping circuit 526 will advance the digit steering circuit 527 and cause the succeeding pulses over and above the first seven from multivibrator 525 to be transmitted to and recorded by counter circuit 532. In a similar manner the magnitude of the third digit is recorded on digit counter 533.

Checking provisions have also been provided for checking the operation of the circuits to insure that the proper number of signal pulses have been received. As pointed out above, two pulses are required to represent each digit. Since the complete subscriber's designation may comprise eight digits then sixteen pulses should be included in each series of pulses between the blank intervals. The output of digit detector 521 is applied to a sixteen-pulse counting circuit 534. If more or less than sixteen pulses are received by counting circuit 534 between two blank intervals, the circuits are arranged to cancel all registrations and start over in response to the next series of pulses.

In order to accomplish this, the sixteen-pulse counter 534 controls the counter reader 535. If counter 534 has counted other than sixteen pulses, the counter reader 535 conditions the recycle circuit 536 so that it will repeat a pulse from the code end circuit 560, in response to the next blank interval, and cause the operation of relay 538 through cathode follower circuit 537. Relay 538, in operating, removes a short circuit from inductive networks 539 and 540 and battery supply 551 to the various counter and switching circuits. Removal of this short circuit has the effect of momentarily interrupting the battery supply or applying a negative pulse of short duration to the battery supply lead so that these circuits are all restored or set to their initial condition, after which then they may again respond to the succeeding series of pulses transmitted from the calling subset 600.

If a total of sixteen pulses, as required in the exemplary embodiment of the invention set forth herein, is received between the two blank intervals then the counter reader 535 will condition the locking circuit 542 instead of the recycle circuit 536 to repeat a pulse from the code end circuit 560 in response to the succeeding blank interval. The locking circuit 542 then functions through cathode follower 543 to operate relay 544 thus indicating that the proper number of pulses has been received.

Figure 7:
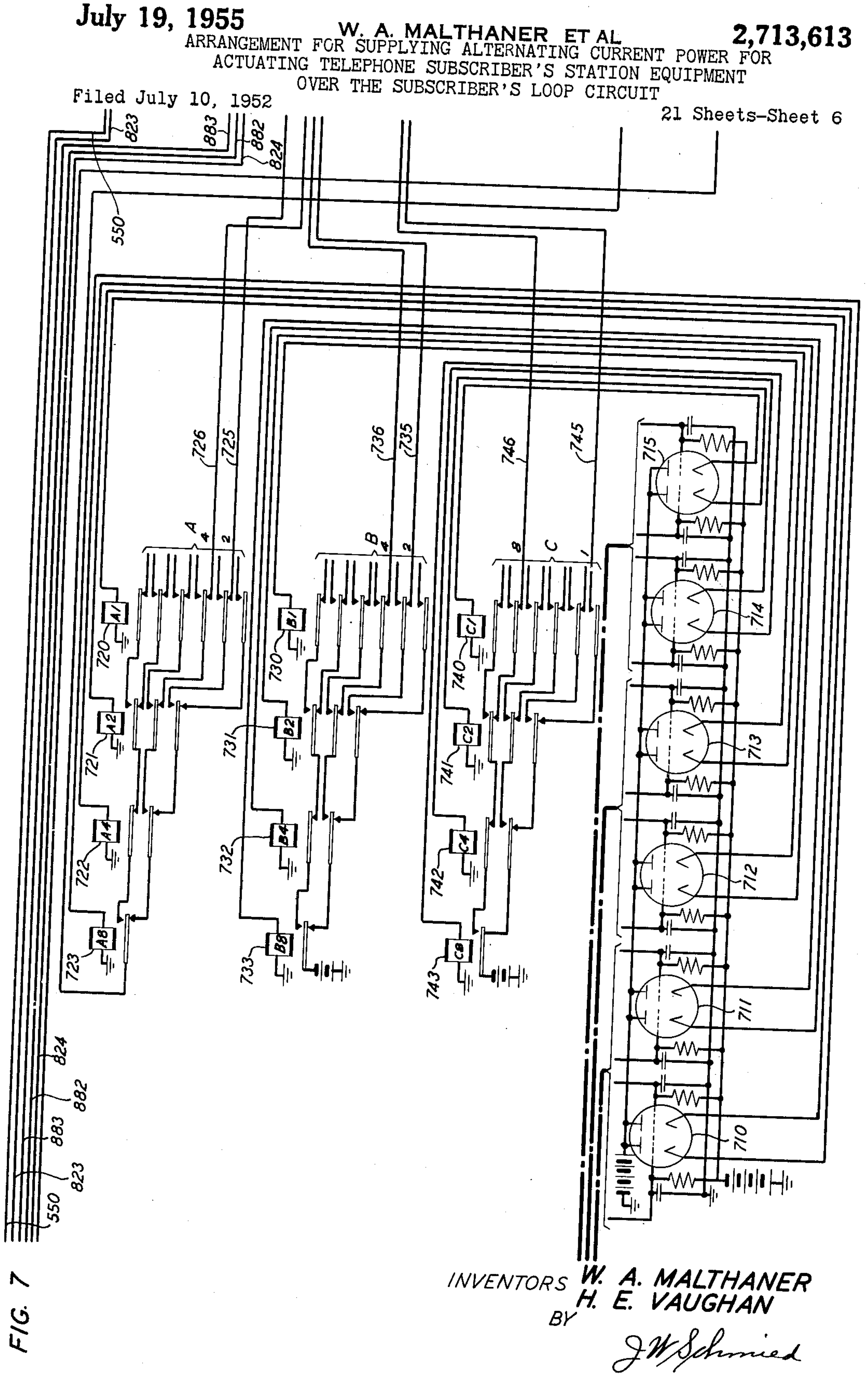

The setting of the counter tubes in each of the digit counters 531, 532 and 533 determines the bias on cathode follower tubes 710 through 715, inclusive, which are associated with the individual stages of the counters 531, 532 and 533, so that their settings are transferred to an operated combination of relays in the corresponding three sets of register relays shown in Fig. 7. The first digit is then represented in binary code form by the operated combination of relays 720 to 723, the second digit by the operated combiuation of relays 730 to 733, and the third or last digit of the office code by the operated combination of relays 740 to 743. The contact springs on each of these digit groups of relays form a translator network for converting the binary digit registration into a decimal digit registration. For example, if voltage is applied to the armature of relay 723 it will pass through various contacts of relays 720 to 723 and appear on one of the ten output leads shown associated with relay 720 bearing a decimal designation corresponding to the original decimal designation preset by the calling subscriber. In the case of the second and third digits, this decimal translation results in the operation of decimal register relays, hereinafter described, two of which for each digit are shown by way of example in detail in Fig. 9. If it is assumed, for example, that the office code designated by the calling subscriber is 421, voltage applied to the output lead 735 of the translator network for the second digit operates relay 934, and voltage applied to the translator output lead 745 for the third digit operates relay 936. This registration of the office code, designated by the calling subscriber, on the decimal relays of Fig. 9 occurs during the interval in which the remaining five digits are being transmitted to the receiver of Fig. 5 and thus this registration occurs before the operation of relay 544 described above.

Relay 544, in operating as an indication that sixteen total pulses have been received, operates relays 545 and 546. Relay 545 resets pulse counter 534 and square wave generator 524 to their initial conditions, removing a short circuit from around the impedance network 539 and thus also applying a resetting pulse or condition to the "reset B" lead. Relay 546 places a short circuit across the secondary 572 of receiver input repeating coil 513 to prevent the reception of any further signaling pulses and to prevent any alteration of the established registration by transient signals generated by subsequent switching operations in neighboring apparatus. Relay 544, in operating, also removes battery from lead 550 which releases relay 825 thereby removing the voltage applied to the main anodes of the cold cathode gas tubes in the various line circuits 800 through 803 so that any other line circuits which have originating calls awaiting on them are prevented from connecting to the receiver of Fig. 5 until this receiver has completely restored to normal as described hereinafter. In addition, relay 544 in operating connects battery to lead 549 in order to connect this receiver to the trunk number group of Fig. 9 if the switching network is not at the moment being operated upon by the incoming register and subscriber's number group circuits of Figs. 10 and 13 as described hereinafter.

Voltage is applied through a make contact relay 544 to the control anode of cold cathode gas tube 918 through voltage dividing circuit 919 and to the main anode of tube 918 through resistor 961. If no other receivers are connected to either number group, tube 918 will break down across its control gap, transfer its discharge to main anode 920—control cathode 921 gap, and then to the main anode 920—main cathode 922 gap. The control cathode is connected through a varistor 923 to a series inductive and resistive circuit 924 to ground. Varistor 923 is used to insure that the start cathode of tube 918 does not act as an anode when such a tube fires just as another such tube is being extinguished. A varistor 960 connected across lock-out element 924 is used to damp transients caused by extinguishing of such tubes. The impedance 924 is common to all connector gas tubes and provides lock-out to prevent more than one tube from being operated at a time. The operation of lock-out circuits of this type is described in greater detail in the above-mentioned Patent 2,350,888 to N. I. Hall. This lock-out feature is required because the switches are operated on a one-at-a-time basis. If the trunk number group or some other number group connected in the same lock-out circuit was in use the voltage drop across impedance 924 would prevent tube 918 from firing. When tube 918 is fired across the main gap 920—922 current flows through relays 925, 926 and 927 causing them to operate and to connect leads representing all possible A, B and C digits from the register relays to trunk number group network and trunk group gas tubes. Contact 928 on relay 927 applies ground through capacitor 931 to relay 929 which controls the initiation of the test to determine whether trunks in the trunk group called are busy, idle or vacant. The top contact of relay 927 applies a positive voltage to lead 821 which is used to mark the appearance of the calling line on the switches. The second contact from the top on relay 927 enables a path to the all-trunks-busy tube 946 if needed later, and the bottom contact of relay 927 applies main anode battery through the winding of relay 952 to the main anode of the all-trunks-busy gas tube 946.

Ground applied through contact 928 and capacitor 931 to the winding of relay 929 causes the relay 929 to be operated for a short time. Operation of relay 929 applies positive battery over lead 930, to the armature of relay 723 which passes through the contact network of the A digit translator relays to lead 726 and then through the second from the top contact of relay 925 and through resistor 932 to the control anode of cold cathode gas tube 933. At the same time relay 929 applies negative battery to the armatures of the B group relays 934, 935 and others not shown in detail and shorts the winding of relay 938, and positive battery to the C group relays 936, 937 and others not shown in detail and shunts the winding of relay 939 and resistor 941. The operation and circuits for the busy-idle-vacant test and number group are the same as disclosed in an application of Cornell-Hall-Hecht-Kolchling-Korn-Powell, Serial No. 114,392, filed September 7, 1949. With batteries applied by relay 929, as stated above, all trunk group gas tubes having the designated AB digit combination breakdown across their control gaps. Tube 933 is the only tube shown in the drawing which will do so. The one tube having the designated ABC digit combination will transfer ionization to the secondary anode-start cathode which as shown in the drawing will be the 940—943 gap of tube 933. Thus only one tube of a possible thousand is fired across the secondary anode-start cathode gap.

A short time later relay 929 releases and battery is removed from the A-group translator relays 720 to 723 causing all tubes fired on the start gap only to be extinguished. Release of relay 929 also removes batteries from the armatures of relays 934, 935, 936, 937 and the other similar register relays not shown in detail. However, the path from start cathode 943 of tube 933, through the contacts of operated relays 925 and 934 is still connected through the winding of relay 938 to negative battery and the path from the secondary anode 940 through the contacts of operated relays 926 and 936, the resistor 941, and the winding of relay 939 is still completed to positive battery.

If all trunks in the trunk group are busy, the main cathode 942 of tube 933 is grounded through contacts of relays in the out-trunk circuits of the trunk group. Under this condition, the discharge path in tube 933 remains from start cathode 943 to secondary anode 940. The current flowing in this gap also flows through the winding of relay 938 and through the closed contacts of relays 925, 926, 934 and 936 and the winding of relay 939. This current causes the operation of relays 938 and 939 which indicates that all trunks in the desired trunk group are busy. Relays 938 and 939 when operated apply a positive voltage through a closed contact on relay 926, resistor 944 to capacitor 945 and the start anode of the busy group tube 946. The combination of resistor 944 and capacitor 945 causes a delay in the rise of the voltage applied to the start anode of tube 946.

If there is no trunk or trunk group corresponding to the ABC digit code called, no such gas tube exists and neither relay 938 nor relay 939 operates. With relays 938 and 939 normal, indicating a vacant office code, a circuit is completed from positive battery through an RC delay network 947, 945 to the start anode of tube 946. The time delay is provided to allow time for possible operation of relays 938 and 939 after the release of relay 929. The start anode of tube 946 is kept disabled and capacitor 945 is held discharged during the operated interval of relay 929 by connecting ground through resistor 948 to said capacitor. Application of voltage after the above delay to the start anode of tube 946 causes breakdown of its control gap. Separate tubes for busy and vacant condition may be provided if desired.

If there are idle trunks in the group, after the trunk group tube 933 is fired on a secondary gap, the discharge in the tube will transfer from the secondary anode 940-start cathode 943 gap to the secondary anode 940-main cathode 942 gap since the main cathode 942 of tube 933 is at negative potential. Current in this path flows only through relay 939 and not through relay 938 causing the operation of relay 939 only. In this not-busy, not-vacant condition a circuit is completed from positive battery through the operated contact of relay 939, a back contact of relay 938, and the winding of relay 949 to ground causing operation of relay 949. The operation of relay 949 applies positive battery through its contact, and the lower contact of relay 926 to the windings of the relays 950 and 955 in the main anode circuits of all trunk group tubes. This voltage causes the fired trunk group tube 933 to transfer to its main anode-main cathode gap causing the operation of relay 950 which in turn applies a positive voltage to lead 951 to all trunks in the trunk group. At this time there is a positive voltage applied as a mark on lead 821 to line circuit 800 of the calling subscriber as described above and there is a similar mark on lead 951 to all trunks of the trunk group to which a connection is desired.

The voltage mark on lead 951 is applied to out-trunk circuit 2109 through a series back contact of relay 2111 to the common point of the two windings of relay 2112. The other terminal of the left winding of relay 2112 is connected by lead 2113 to the control lead of the left vertical of primary switch 1712 of trunk frame 1710 shown in Fig. 17. The voltage mark described above on lead 821 is applied through a closed contact of relay 811 to the common point of the windings of relay 822 and extended from the other end of the right winding of relay 822 through lead 826 to the control lead of the left vertical of the primary switch 1112 of line frame 1110 in Fig. 11.

Figure 11:
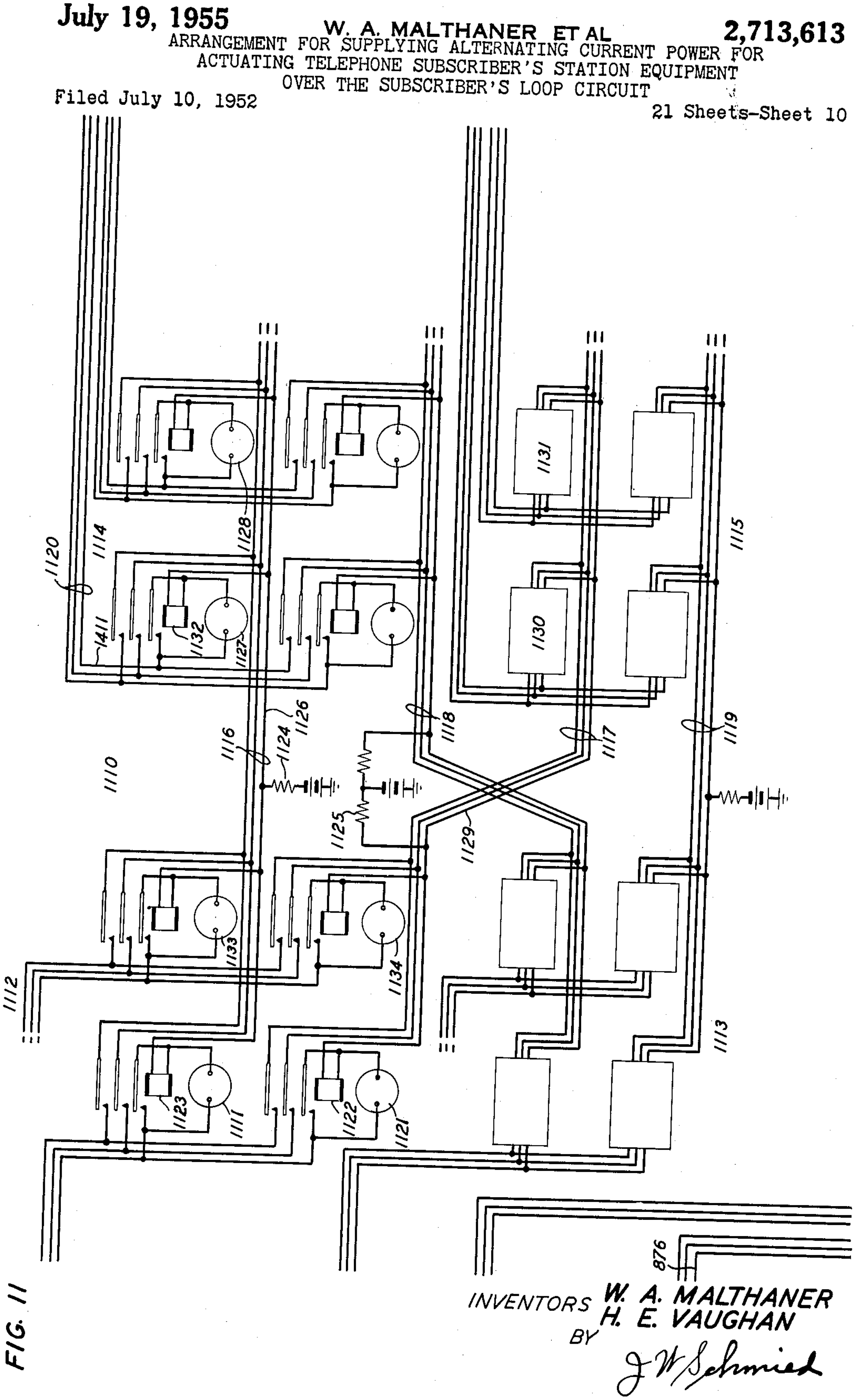
Figure 12:
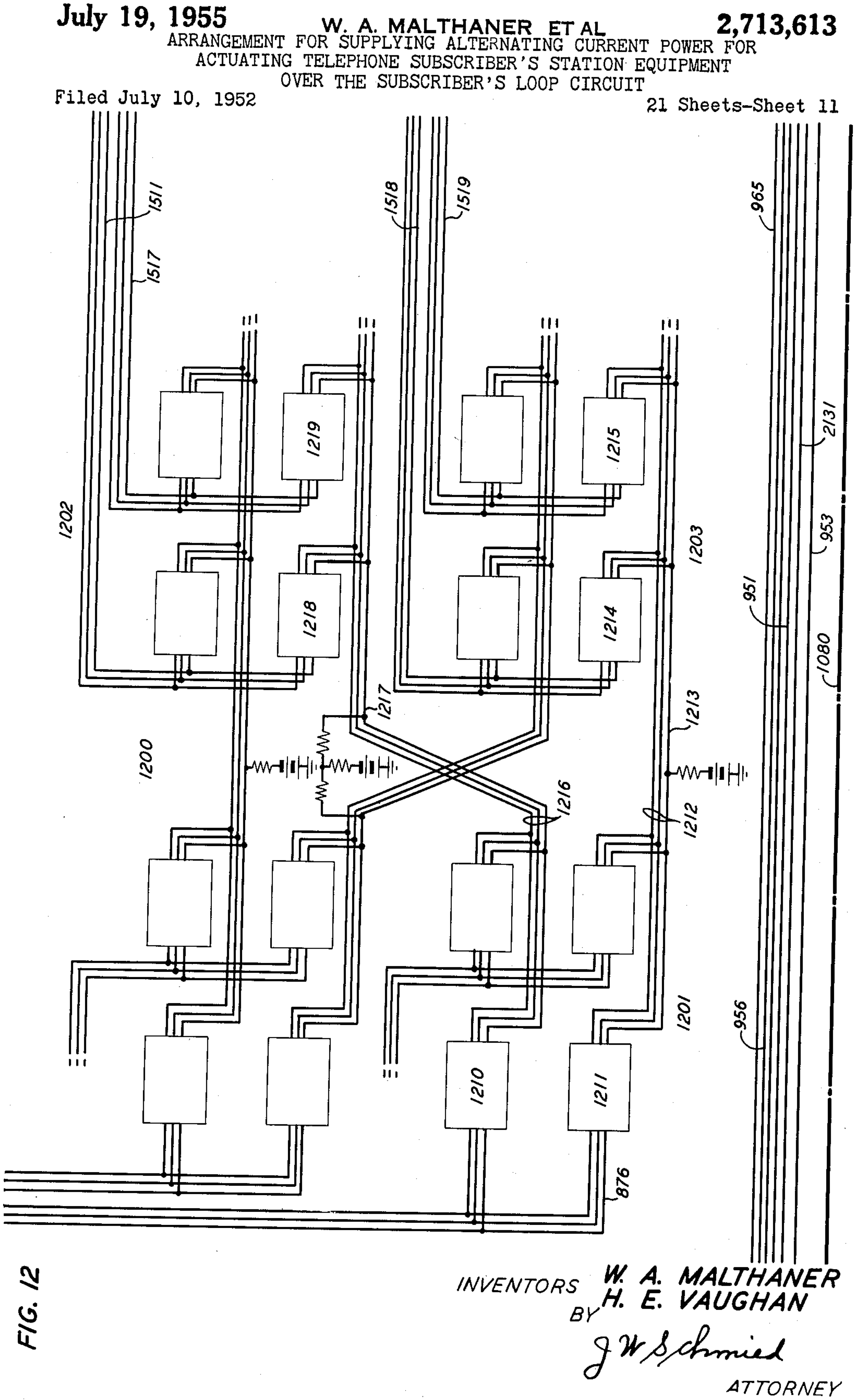
Figure 17:
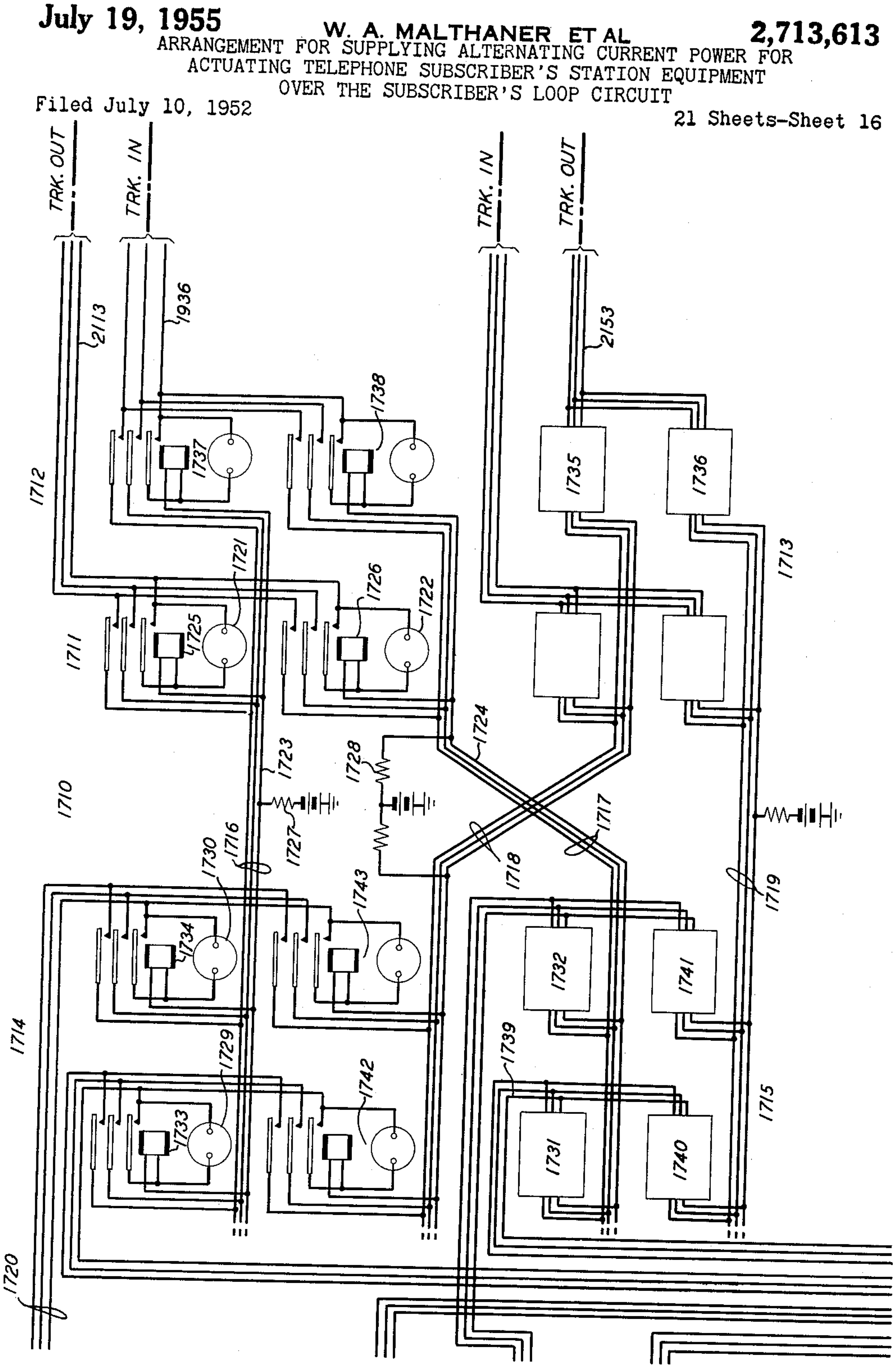
Figure 18:
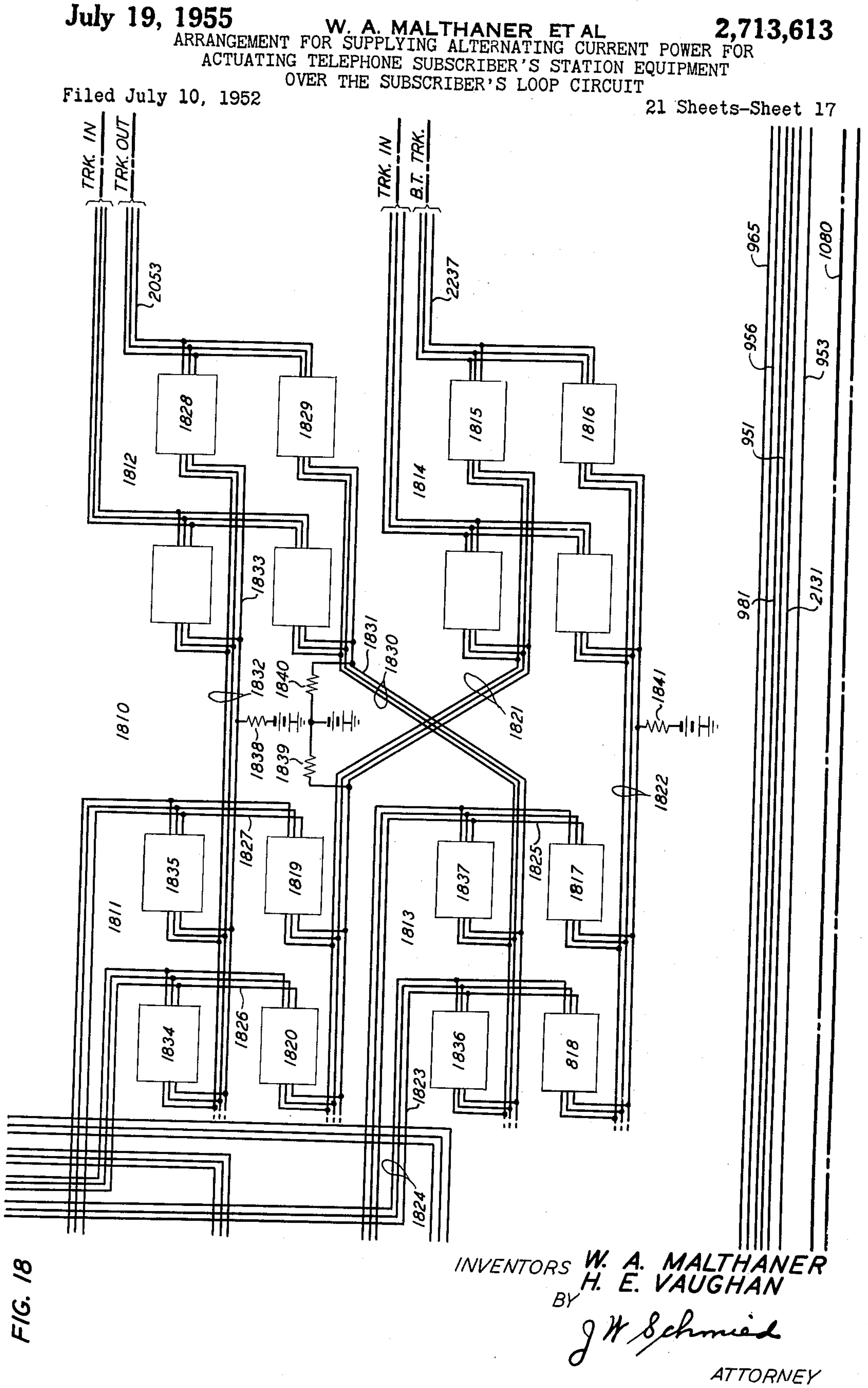
Figure 19:
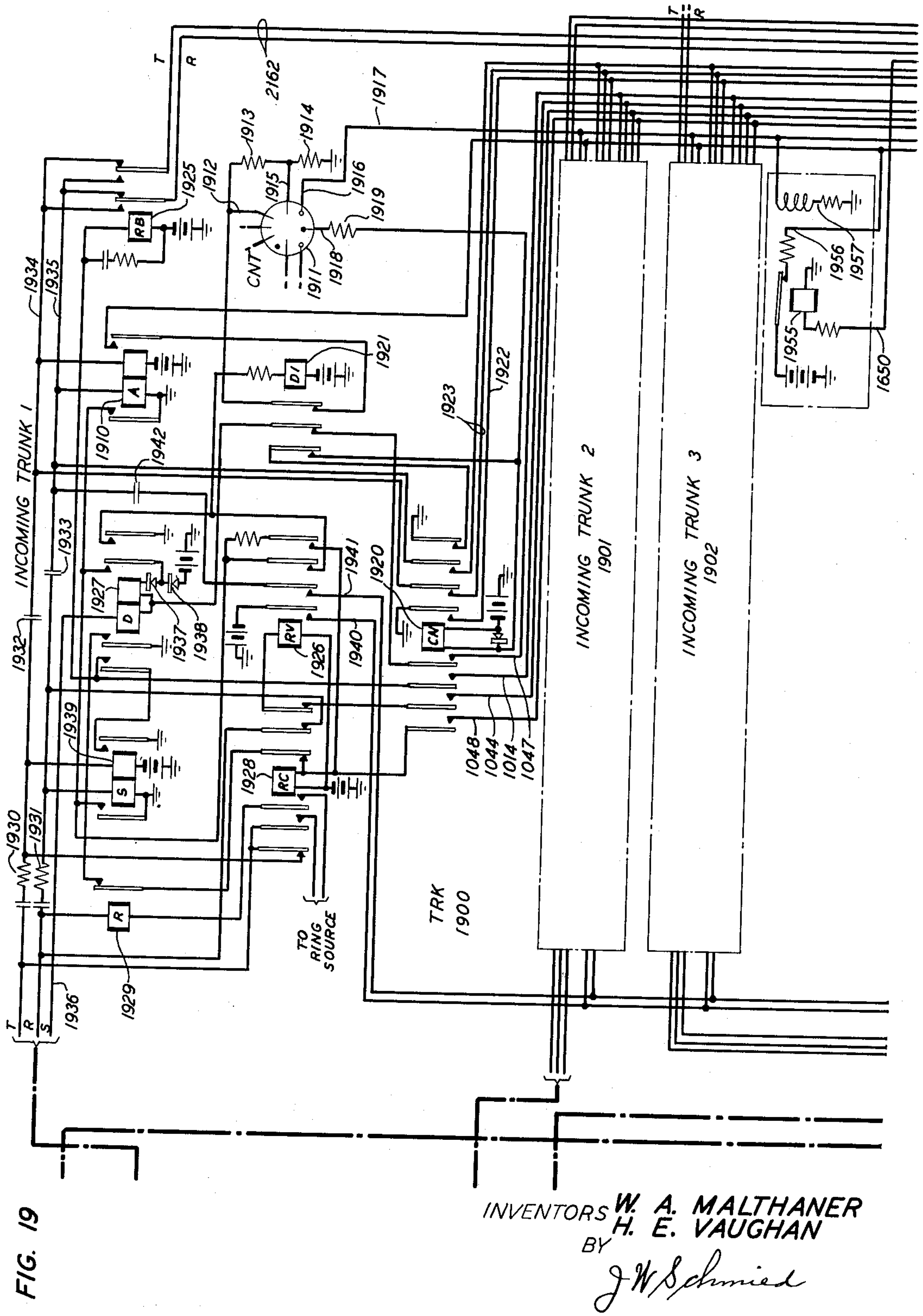

The switching network consists of line frames, two of which are shown by way of example in Figs. 11 and 12, and trunk frames, two of which are shown by way of example in Figs. 17 and 18. Each line frame and trunk frame has primary and secondary switches. Each primary line and trunk switch has a plurality of vertical input columns across the switch, which are connected to line and trunk circuits respectively, and a plurality of horizontal output rows across the switch. Each of these rows and columns have three conductors, two for the usual talking path and the third for a control lead. At the intersection of each row and column, hereinafter referred to as a cross-point, is a relay having an operating coil and three sets of make contacts. Two of these contact set, when closed, connect the talking conductors associated with the particular output row. A cold cathode gas diode is also associated with each cross-point relay and this diode in series with the winding of the relay is connected between the control lead of the vertical input column and the control lead of the horizontal output row. The third contact of the cross-point relay, when operated, short-circuits this associated gas diode. The use of these crosspoint gas diodes in the control leads facilitates the identification and selection of idle paths through the switching network as described hereinafter, and the short-circuiting of said diodes at operated cross-points facilitates the holding of an established connection through the network and the maintenance of a busy indication along the path during the path selection processes of subsequent calls.

Each secondary switch is connected to form a similar rectangular array of cross-points except that the horizontal rows are used in input terminals and the vertical columns as switch outlets. In addition, each line and trunk frame has a number of such primary and secondary switches arranged so as to provide one talking path from each primary switch to each secondary switch. In Fig. 11 of the exemplary system, line frame 1110 shows by way of example two primary switches 1112 and 1113 which are cross-connected to two secondary switches 1114 and 1115, respectively. The primary switches 1112 and 1113 have two input columns each of which is or may be connected to a subscriber line circuit, such as 800, and two horizontal output rows which are connected to the horizontal inlets of secondary switches 1114 and 1115. The interconnecting conductors between primary and secondary switches, hereinafter called links, consist of three conductors and are connected so that each primary switch on the frame is connected to each secondary switch on the frame. The upper horizontal output of switch 1112 is connected by link 1116 to the upper horizontal inlet of secondary switch 1114 and the lower horizontal outlet of switch 1112 is connected by link 1117 to the upper horizontal inlet of switch 1115. Similarly, the upper outlet of switch 1113 is connected by link 1118 to the lower inlet of switch 1114 and the lower outlet of switch 1113 is connected by link 1119 to the lower inlet of switch 1115. A second line frame 1200 is shown on Fig. 12 which can be connected to lines in the same manner as the line frame 1110. Although only two primary and two secondary switches each having two inlets and two outlets are shown on each frame it is to be understood that both the number of switches and the number of inlets and outlets per switch can be readily expanded in an obvious manner so as to provide switches and frames of any desirable size and any desirable number of such frames, having a number of input line circuits consistent with the operating times of the system and the calling habits of the subscribers and having a similarly consistent number of primary-secondary link paths and secondary outlets. For example, line frames might be provided with seventy inlets and ten outlets per primary switch and ten primary switches per line frame and with ten secondary switches per line frame, each secondary switch having ten inlets and ten outlets.

Proceeding from the trunk output side of the switching network backward through the office a similar frame arrangement is disclosed. Fig. 17 shows trunk frame 1710 comprising two primary switches 1712 and 1713, and two secondary switches 1714 and 1715. The primary and secondary switches are interconnected in the manner described above for the line frame so that primary switch 1712 is connected by link 1716 to secondary switch 1714, and by link 1717 to secondary switch 1715 and primary switch 1713 is connected by link 1718 to secondary switch 1714 and by link 1719 to secondary switch 1715. A similar trunk frame 1810 is shown in Fig. 18. The trunk frames may be expanded in a manner as described above in reference to the line frames.

Connections are made between the secondary line frame switches and the secondary trunk frame switches to provide talking paths between each line frame and each trunk frame. These connections consist of a direct connection for the two talking conductors of each such path. The third or control lead from each secondary line switch outlet is connected to an individual control circuit, hereinafter called a junctor, and the control lead from each secondary trunk switch outlet associated with the same talking path is connected to the same control circuit or junctor. A group of four junctors 1410, 1414, 1415 and 1416, one of which, 1410, is shown in detail, are shown by way of example in Fig. 14. Thus junctor 1410 is associated with the path 1120 from the left vertical of line switch 1114 by means of control lead 1411 and with the path 1720 from the right vertical of trunk switch 1714 by means of control lead 1412. When the control leads are properly marked, as is hereinafter described, junctor 1410 will cooperate with the switches, line circuit 800, out-trunk circuit 2109 and the control circuits to establish a line-to-trunk connection.

As described above under the assumed conditions, a positive voltage mark is applied to lead 826 which is connected to the left vertical of line switch 1112 and another mark is applied to lead 2113 which is connected to the left vertical of trunk switch 1712. Assuming further that the paths through the line frame 1110 and trunk frame 1710 are all idle, the positive voltage on lead 826 causes gas diodes 1111 and 1121 to break down as the other sides of the diodes are connected through large resistors 1124 and 1125 to negative battery. The current through the associated series relay windings 1122 and 1123 and the winding of relay 822 however is insufficient for the operation thereof. When tube 1111 is fired a voltage drop is produced across resistor 1124 so that the potential of lead 1126 changes from the original negative battery potential to a positive potential. The rise in voltage on lead 1126 causes diode 1127 in secondary switch 1114 to fire since the other side of diode 1127 is connected by lead 1411 through a large series resistor 1413 to negative battery 1433 in junctor 1410. When the diode 1127 is fired the potential on lead 1411 rises from the negative battery voltage to a less negative potential. In a similar manner the rise in potential of lead 1126 also causes breakdown of diode 1128 also in secondary switch 1114 the other side of which is connected via lead 1417 through a high resistance to negative battery in junctor 1414. At the same time breakdown of tube 1121 causes a rise in potential on lead 1129 which causes breakdown of the diode associated with cross-point 1130 in secondary switch 1115 and of the diode associated with cross-point 1131 in the same secondary switch. The breakdown of these diodes in secondary switch 1115 marks leads 1418 and 1419 to junctors 1415 and 1416 respectively in the manner described above for switch 1114. Thus, as a result of the mark placed on the switches through lead 826 the line circuit of the calling line, diodes 1111, 1121, 1127, 1128, and the diodes in switches 1130 and 1131 are fired and the potential on leads 1411, 1417, 1418 and 1419 has been raised from negative battery potential to a less negative value which in effect puts a voltage mark on the gas tube associated with each of the above-mentioned junctor circuits. The voltage mark on lead 1411 is applied through resistor 1423 to the screen of tube 1420 in junctor 1410. Junctors 1414, 1415, 1416 although not shown in detail are marked in a similar manner.

At trunk frame 1710 a positive potential mark on lead 2113 described above causes the breakdown of diode 1721 due to negative potential on its other side applied via resistor 1727, control lead 1723 and relay winding 1725. Diode 1722 is caused to break down at the same time due to negative potential on its other terminal applied through resistor 1728, lead 1724 and relay winding 1726. As a result of the operation of diodes 1721 and 1722, the potential rises on leads 1723 and 1724 respectively. The change in potential on lead 1723 of link 1716 causes diodes 1729 and 1730 to fire since the other terminal of diode 1730 is connected via lead 1412 and resistor 1422 to a more negative potential 1433 in junctor 1410 and the other side of diode 1729 is connected via lead 1512 in a similar manner to a more negative potential in junctor 1514. Operation of diode 1730 produces a voltage mark on the start anode of tube 1420 through resistor 1421. In a similar manner the gas tube of junctor 1514 is marked as a result of operation of diode 1729. The change in potential on lead 1724 causes operation of the gas diodes associated with cross-points 1731 and 1732 in secondary switch 1715 which results in a change in voltage on lead 1424 to junctor 1415 and lead 1739 to junctor 1516. Thus, as a result of the mark applied through the out-trunk circuit 2109 diodes 1721, 1722, 1729 and 1730 and the diodes associated with cross-points 1731 and 1732 are fired and marks are applied to the start anodes of gas tubes associated with junctors 1410, 1415, 1514, and 1516.

The junctor circuits are arranged to operate when a mark is present on both the control lead from the line frame and the control lead from the trunk frame. As described for the exemplary system, four of the junctors shown in the drawing are marked from the line side and four of the junctors shown in the drawing are marked from the trunk side but of these only two junctors, 1410 and 1415, are marked on both sides. Now consider tube 1420 of junctor 1410. Presence of the mark on the start anode of the tube through resistor 1421 causes breakdown of the start gap of the tube and presence of the mark on the screen via resistor 1423 permits the discharge to transfer to the main path, that is, from main anode to main cathode. The main anode is connected to ground through resistive-inductive circuit 1425, which is used to provide lock-out as hereinafter described. The main cathode of tube 1420 is connected through a capacitor 1426 shunted by a high resistance resistor 1427 and then through the lower winding of relay 1428 to negative battery. When the tube fires in its main gap a current pulse through capacitor 1426 causes operation of relay 1428, the contacts of which shunt capacitor 1426 with a low resistor 1429 so that the relay 1428 is held operated by direct current through the tube. Operation of relay 1428 causes battery 1433 to be applied through a small protective resistor 1430, the top closed contact of said relay and the upper winding of said relay to lead 1411, and through resistor 1431 and the bottom closed contact of said relay to the common point of the windings of relay 1432, and then through the lower winding of relay 1432 to control lead 1412.

The tubes of all the junctor circuits which are marked on both sides and thus have discharges initiated between their control gap anodes and between their control gap electrodes and voltage applied to their shield or screen members are connected in a lock-out circuit. The lock-out circuit elements comprising the common impedance network 1425 which is shown as a resistor and inductor connected in series may take any other suitable form.

In addition, the control gap cathode and the main gap cathode are connected to ground through a capacitor such as 1409 in junctor 1410. These capacitors are of such size that they maintain the respective cathodes of all of the tubes of a junctor group at substantially the same potential during the lock-out interval. As a result there is substantially no impedance individual to the main anodes or to either the control gap cathodes or the main cathodes of the tube. The only impedance in such circuits during the lock-out interval which takes place before the above-mentioned condensers receive an appreciable charge is the common lock-out impedance 1425. The discharge initiated between the control gap electrodes of all of the tubes marked as described above can therefore transfer to the main anode in only one tube. Similarly the transfer to the main cathode can occur only in one tube, because the discharge is first transferred to the path between the control gap cathode to the main anode in only one tube due to the lock-out circuits as described above and then to the main cathode which is also connected in a lock-out circuit.

If the transfer has taken place in one of the tubes, the voltage drop across the network 1425 will reduce the voltage on the other main cathodes so that discharges cannot transfer in any of the other tubes. Such lock-out circuits are described in greater detail in the above-identified patent of Hall.

Assuming for purposes of illustration that the discharge transfers in tube 1420 first to the path between the main anode and the control gap cathode and then to the path between the main anode and the main cathode but that a similar discharge is prevented from occurring in any of the other junctor tubes. Thus, by this lock-out action only one junctor will have its gas tube and relays operated so that only one path will be established through the switch network for the connection of the subscriber to a trunk circuit.

With negative battery 1433 applied through low resistance 1430, the current in control lead 1411 increases and since this current flows through diode 1127, relay winding 1132, lead 1126, relay 1123, diode 1111, lead 826, relay 822 to ground through resistor 890 and to positive battery through lead 821 and the operated contact of relay 811, relays 1132 and 1123 operate. Operation of cross-point relay 1132 shorts-out diode 1127 and operation of cross-point relay 1123 shorts-out diode 1111 thereby increasing the current in the above-described series circuit and causing the operation of relay 822 on its right winding.

Application of negative battery 1433 through low resistance 1431 to the lower winding of relay 1432 and in turn to lead 1412, diode 1730, relay 1734, lead 1723, relay 1725, diode 1721, lead 2113, etc. to positive battery causes an increase in current which operates cross-point relays 1734 and 1725 which in turn short-out diodes 1730 and 1721, respectively. The operation of the cross-point relays 1132, 1123, 1734 and 1725 completes a circuit for the operation of relay 2111 as is hereinafter described.

Shorting of the diodes causes a further increase in current such that relay 1432 operates on its lower winding and relay 2112 operates on its left winding. Operation of relay 1432 closes a holding path to low voltage negative battery 1438 through varistor 1434, through both windings of said relay to lead 1412 and a holding path from battery 1438, through varistor 1435, the upper winding of relay 1428 to lead 1411. Varistors 1434 and 1435 are so poled that negligible current flows through them until the negative battery through resistors 1430 and 1431 is removed. Operation of relay 1436 is caused by ground closed to its winding by a make contact on relay 1432 which also causes lamp 1437 to light as a visual indication of the operation or busy condition of the junctor circuit. The resistor and capacitor circuit 1439 are employed to make relay 1436 slow release. Operation of relay 1436 connects a release transient damping varistor 1440 through the upper winding of relay 1428 to lead 1411, a negative extinguishing potential 1441 through resistor 1442 to the start anode of tube 1420, and shorts-out the lower winding of relay 1428.

When relay 822 operates, it causes through resistor 831 the operation of relay 810 which in turn opens the connection from the T and R leads of the line 614 to the contacts of relay 811, and to the relay 812, and opens the main cathode lead of tube 814 which will make this line test busy for any incoming calls. Release of relay 812 releases relay 811 and opens lead 824 which permits relays 911, 510, 511, and 512 to return to normal. Release of relay 811 also opens lead 823 which permits relay 544 to release which in turn removes anode voltage from tube 918, extinguishing the tube, and releasing relays 925, 926, and 927. Release of relay 927 removes the positive voltage mark from lead 821 to all the line circuits. However, relay 822 holds operated on the circuit from ground through varistor 829, its own two windings in series, lead 826, the windings of cross-point relays 1123 and 1132, lead 1411, the upper winding of relay 1428, a closed contact of relay 1432 and varistor 1435 to negative battery 1438. At the same time that current is reduced by removal of positive marking voltage, relay 1428 which was held on its upper winding is released.

Release of relay 926 described above removes main anode battery from the windings of the relays associated with trunk group tubes of the number group and thus relay 950 releases, removing marking voltage from lead 951, which connects by the previously traced path to the common point of the windings of relay 2112 so that the current in the left winding of relay 2112, the windings of cross-point relays 1725, 1734, and junctor relay 1432 is reduced. However, the holding path from battery 1438 in junctor 1419 through varistor 1434, winding of relay 1432, windings of cross-point relays 1725 and 1734, both windings of out-trunk relay 2112 in series aiding and varistor 2114 to ground provides sufficient current to hold these relays operated.

The T and R leads of line circuit 800 are carried through the closed contacts of cross-point relays 1123 and 1132 to path 1120 and then through the closed contacts of cross-point relays 1734 and 1725 to the T and R leads of trunk circuit 2109. At this time the direct current through the subset, the line circuit and the switches to the trunk causes the operation of relay 2111 which has its right winding between the T lead and ground and its left winding between the R lead and negative battery. Operation of relay 2111 closes holding ground to varistor 2114. The varistor 2190 connected from varistor 2114 to negative battery is used to damp release transients caused by the removal of holding ground and thereby to prevent accidental refiring of diodes in the switching network. Thus, there is now a connection between line 614 and trunk 2109 through the switches, which is held under control of relay 2111 operated on the direct current flowing through the subset 600. If the subscriber should hang up and interrupt the direct-current circuit by opening switchhook contacts 612, relay 2111 would release and in turn cause all the associated circuits to return to normal. When the voltage marks are removed from leads 821 and 2113, all switch gas diodes which had broken down to indicate idle paths but which did not take part in the final connection are extinguished and the switches and junctors are ready for use on another connection. The paths through the switching network which were used are marked busy by having the potentials on the control leads altered so they will not be indicated as available when paths are tested in the process of setting up a subsequent call. The extinguishing of all diodes results in removal of voltage marks from all junctors.

The establishment of the connection described above has assumed that all possible paths were idle. When the connection is set up, the control lead 1126 between cross-point relays 1123 and 1132 for instance is negative but near ground potential. If a subscriber connected to the right vertical multiple of switch 1112 desired to make a call or some one desired to call him, diode 1133 would not break down in response to application of marking voltage to this vertical since with path 1126 busy the voltage across diode 1133 is substantially below that required for breakdown, but diode 1134 would break down since path 1117 is idle.

As described above, operation of relay 822 initiated a sequence of operations which resulted in the release of relays 510, 512, and 544 and the reoperation of relay 511. Relay 544 in releasing releases the trunk member group so that it is available for use by another receiver-register if required. Release of relay 544 also reoperates relay 825 which recloses main anode battery to the line circuits so that some other subscriber's line gas tube may fire if conditions require it to so do. Operation of relay 825 is delayed slightly by the presence of resistor 827 and capacitor 828 in its winding circuit. This is done to permit the receiver to be completely reset before another line circuit can function to connect to said receiver.

Figure 20:
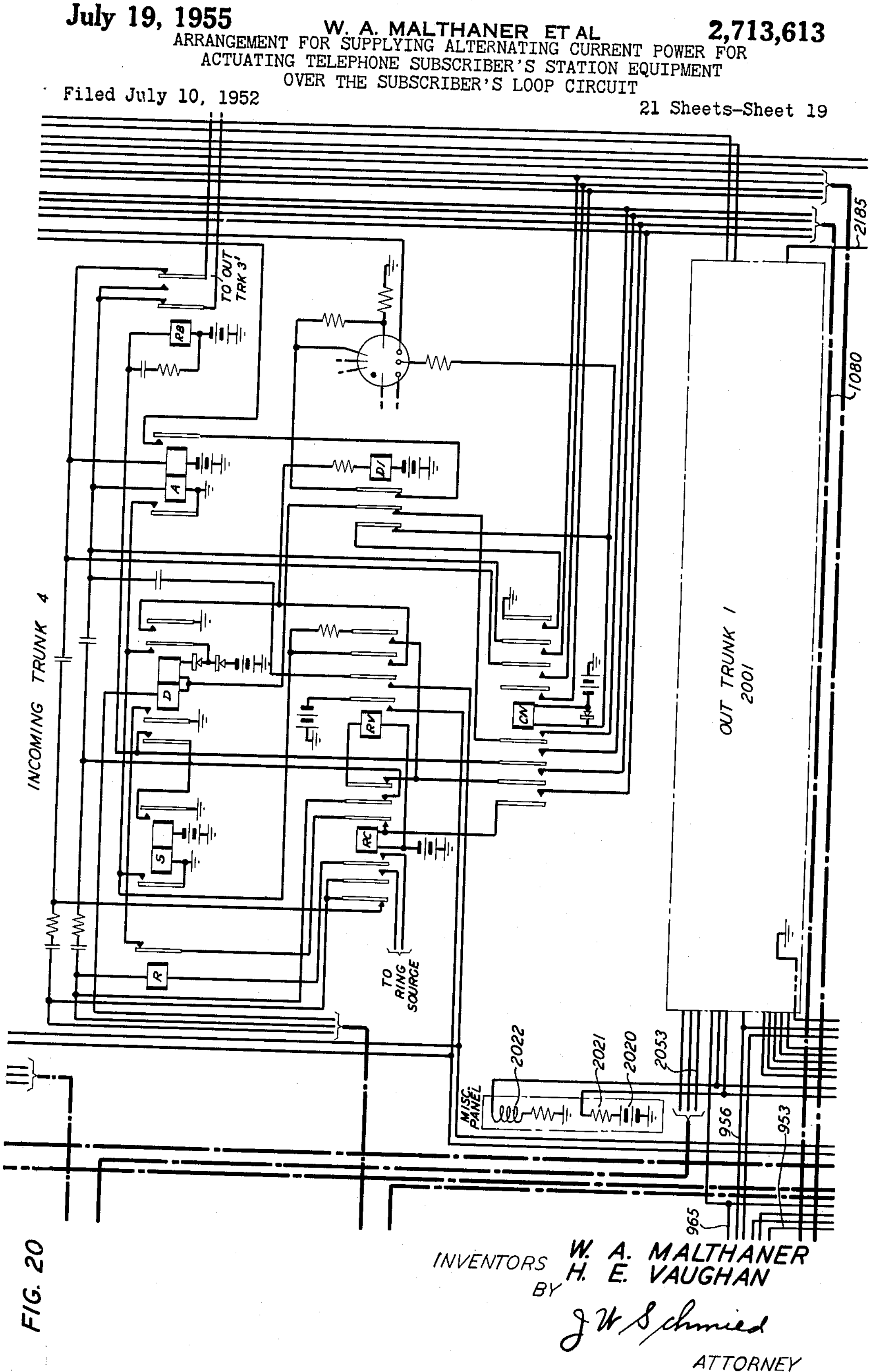
Figure 21:
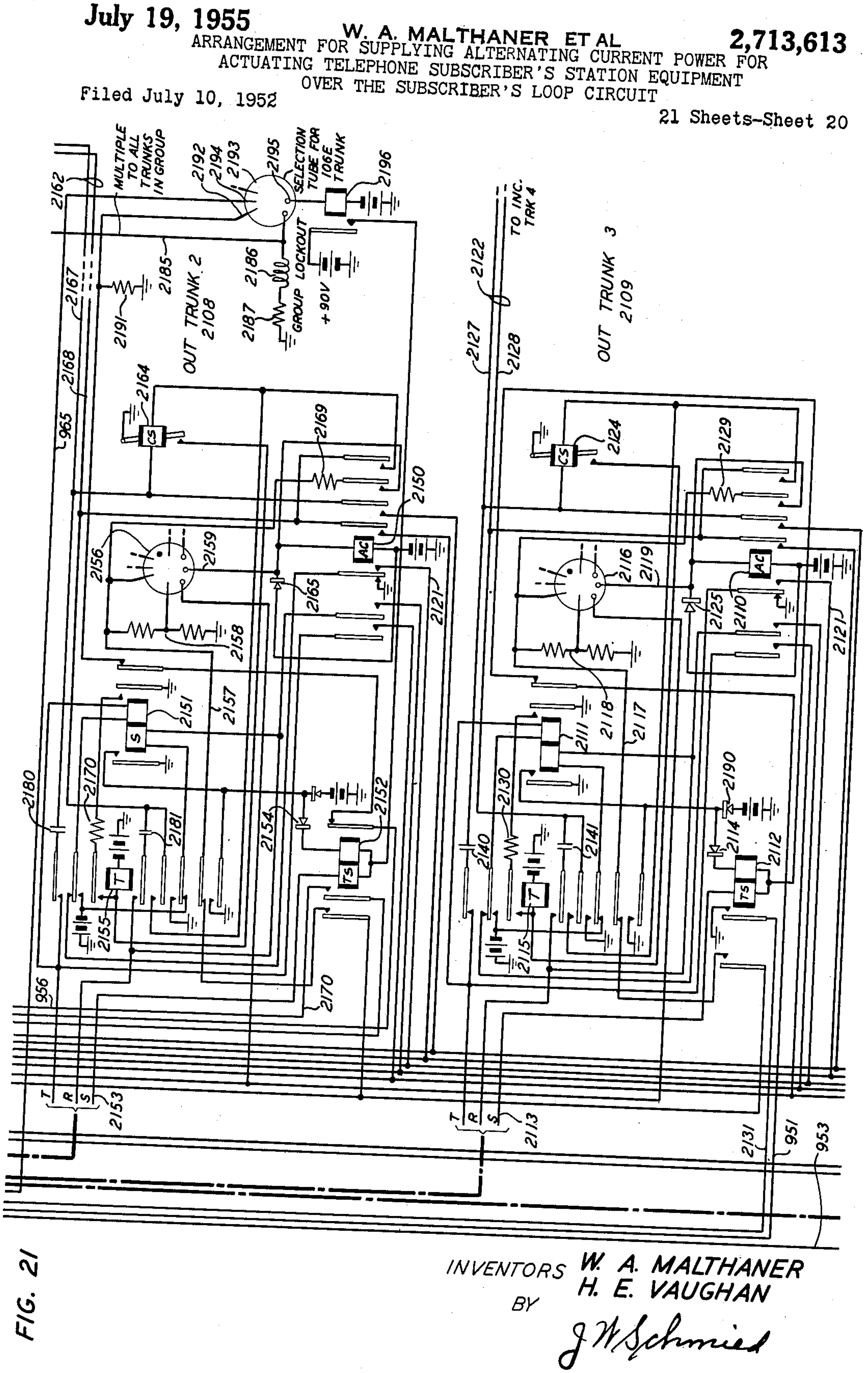
Figure 22:
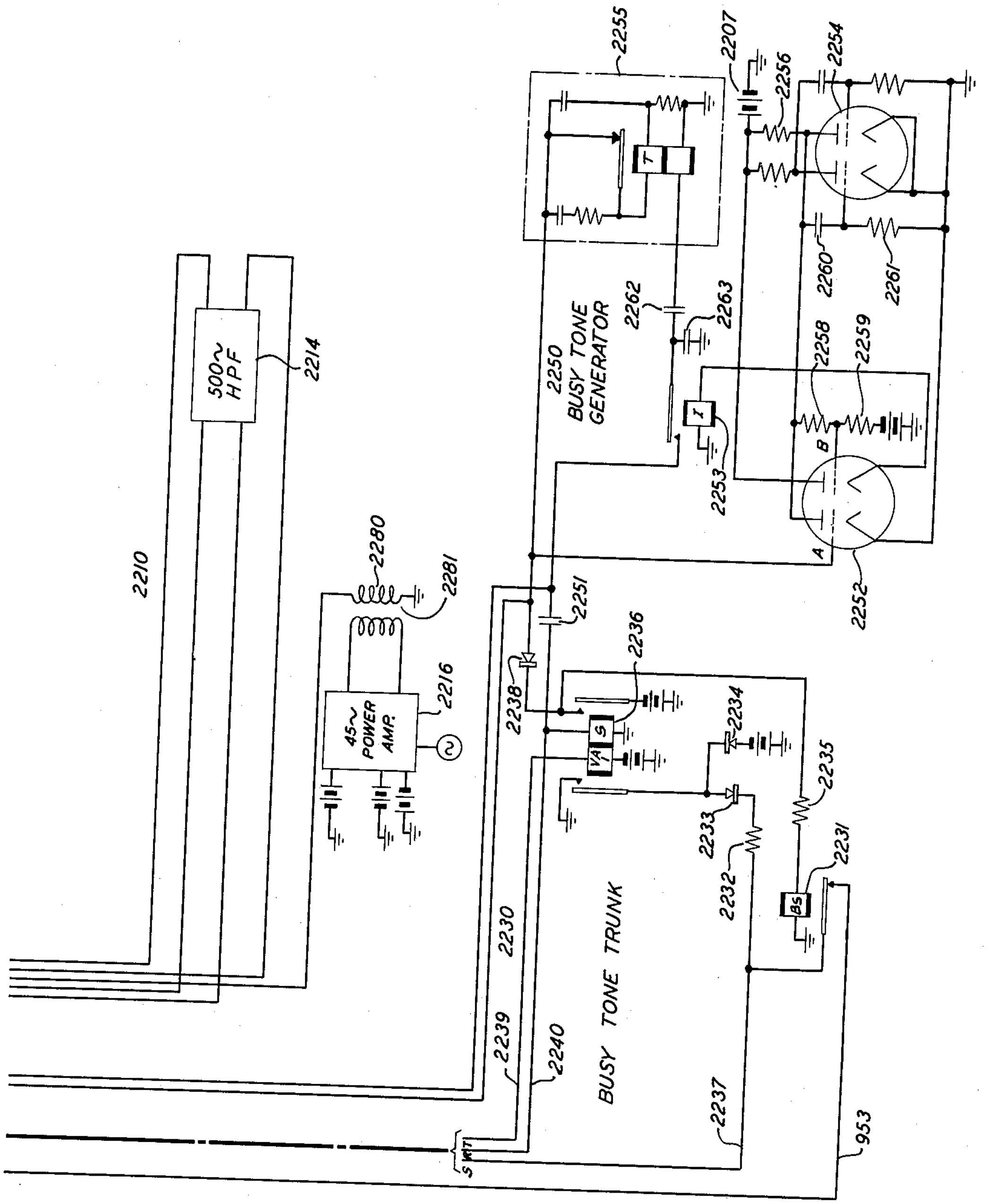

As hereinbefore described the direct-current path across the T and R leads of out-trunk 2109 causes the operation of relay 2111 on a circuit which includes battery, ground and back contacts of relay 2115. The subset 610 at this time is still in the signaling condition since the direction of direct-current flow through polarized latch magnet 617 is in the non-operate direction. Operation of relay 2112 described above closes a circuit from ground through lead 2131 to the cathode of gas tube 933 making it appear busy for any subsequent calls while the trunk is in use and closes positive battery 2020 through resistor 2021, which is shown in Fig. 20 and is common to all out-trunk circuits, through normal contacts of relay 2115 to lead 2117. Lead 2117 is connected to the voltage dividing network 2118 and to the main anode of gas tube 2116. The tap on voltage divider 2118 is connected to the start anode of tube 2116. If no other out-trunk gas tubes are fired, the voltage condition on tube 2116 will cause breakdown in the start gap and current transfer to the main gap. Impedance 2022 in Fig. 20 is common to the start cathode of all trunk tubes to provide for transfer lock-out in case of simultaneous tube operation and common resistor 2021 in the main anode provides steady state lock-out. This lock-out circuit operation is disclosed in the heretofore-mentioned Mohr and Hall patents. When tube 2116 transfers to its main gap, current in its main cathode circuit flows through the winding of relay 2110 causing its oepration thereby connecting outward actuator 2210 to the trunk. Varistor 2125 across the winding of relay 2110 does not affect this operation but is a release transient damping device used to prevent the refiring of tube 2116 when relay 2110 is released by the later operation of relay 2115.

Operation of relay 2110 extends the connection from the tip lead, right winding of relay 2111 from ground to lead 2121 which is connected to the grounded secondary 2280 of transformer 2281. Forty-five-cycle current flows from the amplifier 2216 through the transformer 2281, lead 2121, the closed contacts of relay 2110, tip lead, the established path through the switching networks to the subscriber line 614, the signal generating apparatus of subset 600 back through the line 614 and switching networks to the left winding of relay 2111 to negative battery. In response to the 45-cycle current, signals are again generated and the called number code transmitted repetitively by the subset as long as the 45-cycle current is supplied as hereinbefore described.

Although in the exemplary embodiment of the invention only one outward actuator is shown in each office, in most systems a plurality of outward actuators will be provided with each actuator accessible to an individual specific group of out-trunks through a lock-out arrangement associated with each such trunk-actuator group operating in the manner disclosed herein.

If after this time, the calling subscriber hangs up the 45-cycle current flowing over the subscriber's line and through transformer 2281 will be stopped by the opened contacts of switch-hook assembly 612 and cause the release of the connection through the switches, with actuator 2210 releasing due to the release of relay 2112.

Operation of relay 2110 also connects the winding of polar relay 2124 between leads 2127 and 2128 which extend over the interoffice trunk conductors to the incoming trunk circuit at a distanct office as office B in Fig.3, thereby providing a direct-current path to the incoming trunk circuit as a signal to the trunk that a call is being placed to it so that said trunk may connect itself to apparatus for receiving digit code signals.

Signals generated in the subset now pass on a loop basis over line 614, through the switching network and closed contacts of relay 2110 to the filter 2124, back through the closed contacts of relay 2110 to leads 2127 and 2128 which connect over the interoffice trunk conductors to the incoming trunk circuit at the distant office. This condition is maintained until the distant office has all the information it requires regarding the called subscriber's number. The subscriber of subset 600 may call a subscriber in the same central office as well as a subscriber in a distant office.

Summarizing the operation of the exemplary system shown by way of example, for a case where the called line is in the same office as subset 600, it is assumed that the first three digits of the number dialed will be CH8 or numerically 248 the office code. The final part of the number of the called station is also set by the subscriber. The handset 611 is then lifted from the cradle causing closure of switchhook contacts 612 so that a direct-current path is established through subset 600, line 614 and line circuit 800 to cause the operation of relay 812 in the manner hereinbefore described.

Operation of relay 812 causes firing of the control gap and transfer to the main gap of gas tube 814 provided no other line tubes are fired at this time. When tube 814 is operated, all other lines are locked out and relay 811 operates. Operation of relay 811 applies ground to lead 824 which operates relay 911 and operates the 45-cycle power amplifier 913. The ground applied to lead 824 by the operation of relay 811 due to the operation of relay 911 also operates relays 510 and 512 and releases relay 511 which relay in turn connect the receiver of Fig. 5 to the actuator 900 and render the receiver ready to cooperate with the subset 600 for the reception and registration of the called number described above.

Operation of relay 811 connects actuator 900 to line 614 and subset 600 so that 45-cycle current may pass over the associated closed loop to control generation of the signals in subset 600 which are returned over a loop through the aforementioned connections to the receiver.

Figure 5:
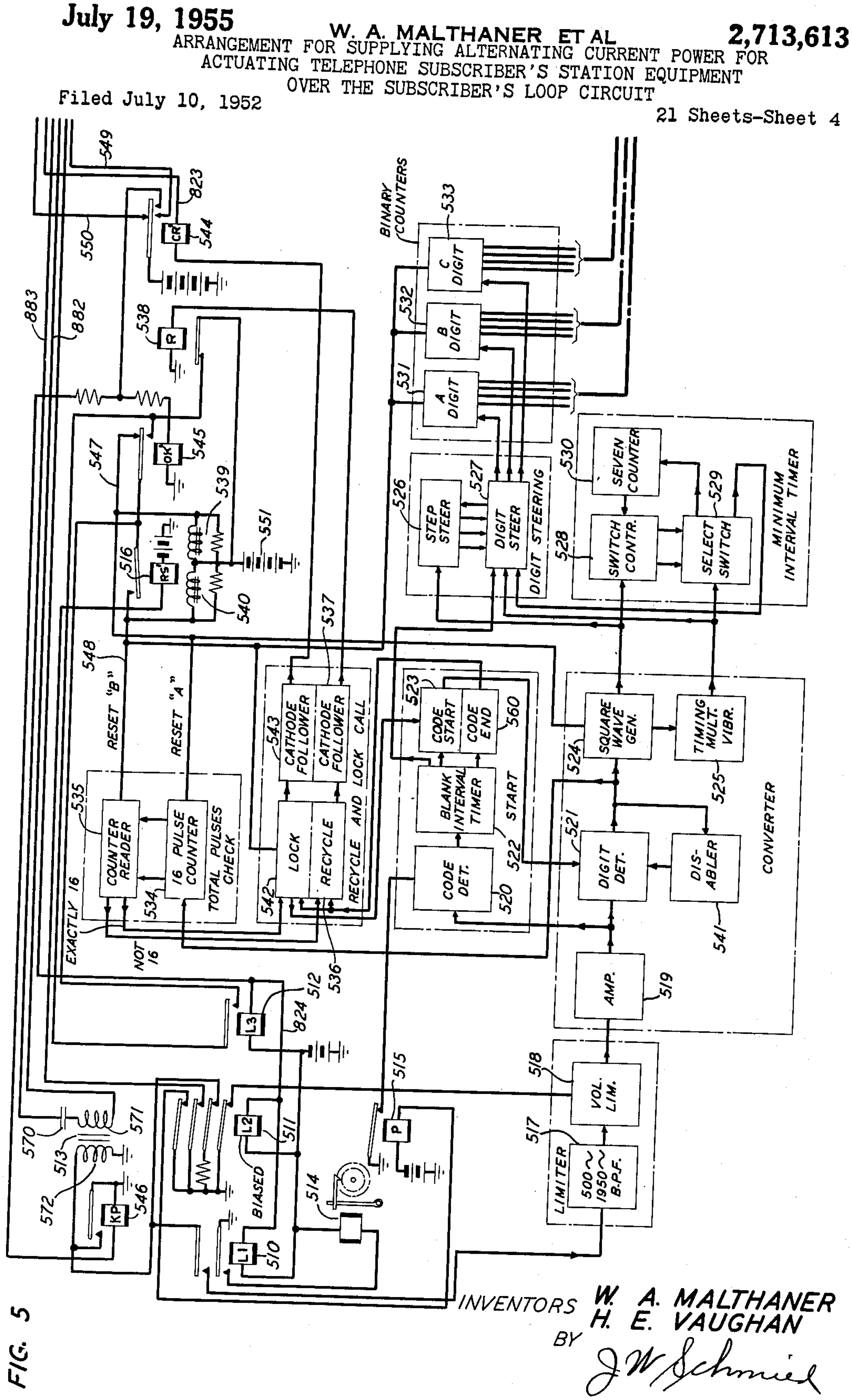

The signaling pulses as received by the receiving circuit shown in Fig. 5 first pass through filter 517 to the volume limiter 518 causing the gain of limiter 518 to be set at the proper level as described in the above-identified application of Malthaner et al. In addition, these pulses, after being repeated by the limiter circuit 518, are transmitted to the code detector 520 through amplifier 519. The detector 520 is provided with a timing circuit which recognizes the blank interval between the series of pulses representing a complete called number designation. The other circuits of the receiver are rendered ineffective and are blocked until such a blank interval is received. The code detector 520 as well as the other portions of the start circuit respond to the blank interval and cause the various other circuits of the receiver to be conditioned to thereafter receive the pulses. These circuits then respond to the succeeding pulses received from the subscriber station and cause the magnitudes represented by the various pulses to be stored on binary counters 531, 532 and 533 which counters are arranged to register the first three digits following the blank interval occurring in a train of pulses from the calling subscriber's subset 600.

As set forth above, the pulses are received and amplified by the volume limiting amplifier circuit 518. The gain of this amplifier is automatically regulated so that the amplitude of the pulses therefrom are substantially independent of the amplitude of the pulses as received. Pulses are then further amplified by amplifier 519 and then supplied to code detector 520 and digit detector 521. As described above the code detector 520 together with the blank interval timer 522 recognizes the blank intervals between each complete series of pulses representing the entire subscriber station designation. The digit detector 521 is normally rendered inoperative. However, in response to the operation of the blank interval timer which in turn operates the code start circuit 523, the digit detector 521 is rendered operative so that it will respond to the succeeding pulses received from the calling device of subscriber station 600. The first six signaling pulses received thereafter are received by the detector 521 which controls the generator or switching device 524, the multivibrator 525, the step-steering circuit 526 and the steering circuit 527 in the manner described above. The first seven timing pulses from multivibrator 525 are passed through switch 529 to the seven-counter 530 and the subsequent pulses through switch 529 to the binary counters 531, 532 and 533 which register the magnitudes of the A, B and C digits respectively of the called office code. The output of digit detector 521 is also applied to a sixteen-pulse counting circuit 534 which controls counter reader 535.

Assuming that a total of sixteen pulses, as required in the exemplary embodiment of the invention set forth herein, is received between the two blank intervals then the counter reader 535 will condition the locking circuit 542 instead of the recycle circuit 536 to repeat a pulse from the code end circuit 560 in response to the succeeding blank interval. The locking circuit 542 then functions through cathode follower 543 to operate relay 544 thus indicating that the proper number of pulses have been received. The setting of the counter tubes in each of the digit counters 531, 532 and 533 alters the bias on cathode-follower tubes 710 to 715, inclusive, which are associated with the individual stages of the counters. The settings of the counters are transferred to an operated combination of relays in the corresponding three sets of translator relays shown in Fig. 7.

The first digit is represented in binary code form by the operated combination of relays 720 to 723, the second digit by the operated combination of relays 730 to 733 and the third or last digit of the office code by the operated combination of relays 740 to 743. The contact springs on each of these digit groups of relays form a translator network for converting the binary digit registration into a decimal digit registration. This translation is accomplished, for example, by the network shown associated with relays 720 to 723 in that if voltage is applied to the armature of relay 723 it will pass through various contacts of relays 720 to 723 appearing finally on only one of the ten output leads shown associated with relay 720 and bearing a decimal designation corresponding to the original decimal designation preset by the calling subscriber. In the case of the second and third digits, this decimal translation results in the operation of decimal register relays shown in Fig. 9. Since the office code designated by the calling subscriber in the illustrative example as described above is 248, output leads 736, 746 and 725 are energized. The voltage applied to the output lead 736 of the translator network for the second digit operates relay 935 and voltage applied to the translator output lead 746 for the third digit operates relay 937. The regisration of the office code, designated by the calling subscriber, on the decimal relays of Fig. 9 occurs during the interval in which the remaining five digits are being transmitted to the receiver of Fig. 5 and thus this registration occurs before the operation of relay 544.

Relay 544, in operating, operates relays 545 and 546. Relay 545 resets the pulse counter 534 and the square wave generator 524 to their initial conditions, and relay 546 places a short circuit across the left winding of receiver input repeating coil 513 to prevent the reception of any further pulses by the receiver and also to prevent any alteration of established conditions by spurious pulses. Relay 544, in operating, also removes battery from lead 550 which releases relay 825 thereby removing the voltage applied to the main anodes of the cold cathode gas tubes in the various line circuits 800, 801, 802, etc. so that any other line circuits which have originating calls awaiting on them are prevented from connecting to the receiver of Fig. 5 until this receiver has completely restored to normal as is hereinafter described. In addition relay 544 in operating connects battery to lead 549 in order to connect this receiver to the trunk number group of Fig. 9 providing that the switching network is not at the moment being operated upon by any other combination of register and number group.

Battery on lead 549 is applied through resistor 961 to the main anode 920 of tube 918 and through the voltage divider 919 to the start anode 980. If no other similar tubes are fired, tube 918 breaks down across its start gap and transfers the breakdown to the 920—921 gap maintaining lock-out by virtue of the voltage drop across impedance 924. Breakdown is established across the main gap and current flow is initiated causing the operation of relays 925, 926 and 927. Operation of relay 927 applies a positive voltage to lead 930, which marks the calling line appearance on the switches, and operates relay 929 momentarily, which initiates the busy-idle-vacant test of the called trunk group. Relays 925 and 926 connect the A, B and C digit register leads to the trunk number group gas tubes. Operation of relay 929 causes capacitor 945 to be discharged through resistor 948, which prevents tube 946 from firing. The operation of relay 929 also causes positive battery to be applied to the armature of relay 723; causes positive battery to be applied to armatures of C digit relays; and causes negative battery to be applied to armatures of B digit relays. The battery on the armature of relay 723 passes through the back contact of armature 723, a back contact of relay 722, a front contact of relay 721, operated due to registration of 2 for the A digit, and a back contact of relay 720 to lead 725 connected through a contact of relay 925 to the start anode of cold cathode gas tube 954.

The battery from the armature of relay 723 is also connected to the start anode of other tubes having the same A digit. The path from the armature relay 723 is the same as that described above through the contacts of relay 925. Thereafter the circuit extends through an individual resistor similar to 932 to the respective start gap anodes. Inasmuch as there may be one hundred such trunks having the number 2 as the A digit, this voltage may be applied to one hundred start gap anodes. If the office is not fully equipped with one hundred such trunk groups, then the voltage is applied to a lesser number of tubes. For a purpose of illustration, however, assume that this voltage is applied to one hundred start gap anodes each associated with one of one hundred different trunk groups having 2 as the A digit.

The negative battery applied to the armatures of the B-digit relays is connected through the operated contacts of relay 929, a closed contact of relay 935, which is operated due to registration of 4 as a B digit, and a contact on relay 925 to the start cathode 959 of tube 954. This voltage is likewise applied through an individual resistor to the start gap cathode of all the tubes of the number group being designated by the number 4 as the B digit. In a three-digit number group such as set forth herein, there will therefore be a maximum of one hundred such tubes. If the entire possible maximum of one hundred trunk groups is not required, a lesser number of tubes will be utilized and the voltage will be applied to a lesser number of start gap cathodes. For the purpose of illustration, however, assume that this voltage is applied to one hundred start gap cathodes. It should be noted, however, that the voltage from the A digit relays and the voltage from the B-digit relays are simultaneously applied to only ten tubes. In other words, only ten tubes are common to both groups of one hundred tubes. Consequently, the presence of these two voltages on the start gap cathode initiates a discharge across the ten tubes having 2 for the A digit and 4 for the B digit.

The positive voltage on the armature of the C-digit relay is connected through the operated contacts of relay 929, the front contact on relay 937, which is operated for the registration of an 8 for the C digit, and through a contact on relay 926 to a main anode 958 of tube 954. This voltage is likewise applied to a maximum of one hundred tubes, that is ninety-nine tubes similar to tube 954 which one hundred tubes all have 8 as the C digit, assuming, of course, that all of said tubes are provided. It should be noted, however, that only one tube of said one hundred tubes will be common to the group of ten tubes having a discharge between its control gap cathodes and control gap anode. As a result, the discharge transfers to the path between the main anode and the control gap cathode in this one tube. As will be described hereinafter, the discharge will again transfer between the main anode and main cathode of the tube if a trunk in the associated trunk group is idle. On the other hand, if all of the trunks in the trunk group are busy, the discharge will not make the second transfer. Instead it will continue between the control gap cathode and main anode as will be described hereinafter.

After a very short time relay 929 releases since operating ground was applied through capacitor 931. Release of relay 929 removes the negative battery from the armatures of the B-digit relays and positive battery from the armatures of the C-digit relays and in so doing permits the operation of relay 939 since positive battery is now furnished to the gas tube through its winding and series resistor 941. The operation of relay 939 and non-operation of relay 938 is the result of an idle indication on the idle-busy-vacant test of the trunk group tube as described above. Operation of relay 939 with relay 938 released operates relay 949 which shorts the winding of relay 938 so that it cannot operate subsequently, applies positive battery to the lead 965 and through a contact of relay 926 and the winding of relay 955 to the main anode of tube 954. The discharge in the tube 954 transfers to the main gap and causes the operation of relay 955. The operation of relay 955 applies a positive voltage on lead 956 for marking the appearance of idle trunks in the desired trunk group on the trunk frames of the switching networks.

If the trunk group was busy when the test was made, the main cathode of tube 954 would have been at ground potential and the breakdown in the tube would have remained across the 958—595 gap causing the operation of both relays 939 and 938 with the result that tube 946 would be fired and the calling line eventually connected to a busy tone trunk as described above. This method of locating the trunk tube and making the busy-idle-vacant test is similar to that described in the above-identified application of Cornell et al.

The voltage applied to lead 956 as described above is applied in out-trunk 2108 through the series back contacts of relays 2152 and 2151 to ground through resistor 2191 and to starting anode 2192 of multielement gas tube 2193. The transfer of ionization of tube 954 described above also applies a potential to the lead 956 which is connected to the contact of relay 955 as described above. The lead 965 is connected directly to the main anode 2194 of tube 2193. The starting cathode 2195 is connected to ground through the lock-out impedances 2186 and 2187 and multipled to all the trunks in the trunk group. The tube 2193 is in lock-out with similar tubes associated with each trunk in the same trunk group. If the tube 2193 is not locked out the application of potential to starting anode 2192 initiates ionization and the application of potential to the main anode 2194 causes the subsequent transfer of the ionization across the gap from the main anode 2194 to the main cathode 2195, the transfer of ionization across the main gap causes a current flow through the winding of relay 2196. The operation of relay 2196 applies a positive 90-volt potential to the common junction of relay 2152. The connection is further extended from the left-hand winding of relay 2152 through lead 2153 to the right vertical or primary switch 1713 on trunk frame 1710 of the switching network.

The leads 965 and 956 are similarly connected to trunk 2001 and other out-trunk circuits (not shown) in the trunk group. Due however to the lock-out features of the tube 2193 with the corresponding tube of the trunks of the same trunk group, voltage is applied to the trunk side of the switching network only over the lead 2153.

The mark on lead 2153 causes firing of the diodes of cross-points 1735 and 1736 provided the associated links are idle. Firing of the diode of cross-point 1735 causes a rise in potential on the control lead of link 1718 so that the diodes of cross-points 1742 and 1743 and fired and the potential on lead 1412 to junctor 1410 and on lead 1512 to junctor 1514 is raised and the junctor gas tubes similar to tube 1420 in junctor 1410 fire on their start gaps. Firing of the diode of cross-point 1736 causes a rise in potential on the control lead of link 1719 so that diodes of cross-points 1740 and 1741 are fired and the potential on leads 1739 and 1424 is raised and the start gaps of the gas tubes in junctors 1516 and 1415, similar to tube 1420 in junctor 1410, are fired.

The marking on lead 2053 causes diodes in cross-points 1828 and 1829 to fire thereby raising the potential of leads 1833 and 1831 so that the diodes of cross-points 1834, 1835, 1836, and 1837 are fired in the manner hereinbefore described. Firing of the diode of cross-point 1834 causes the gas tube of junctor 1414 to fire on its start gap due to increased potential on lead 1826. In a similar manner firing of diodes of cross-points 1835, 1936 and 1837 cause firing of start gaps of gas tubes in junctors 1510, 1416 and 1515 respectively. Thus, in this exemplary case with two trunks in a trunk group, the trunk sides of all eight junctors have been marked, if all are idle.

Figure 9:
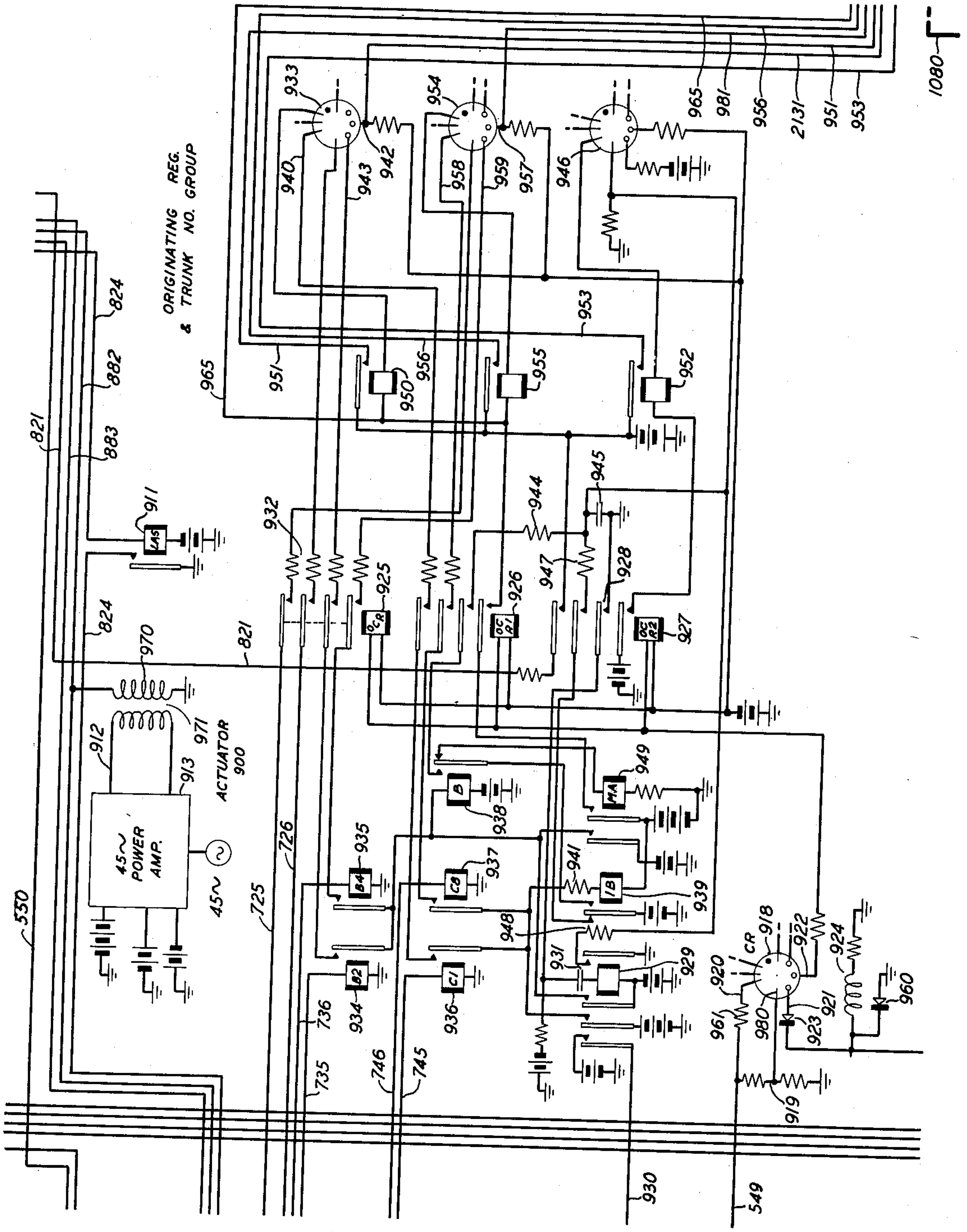
Figure 10:
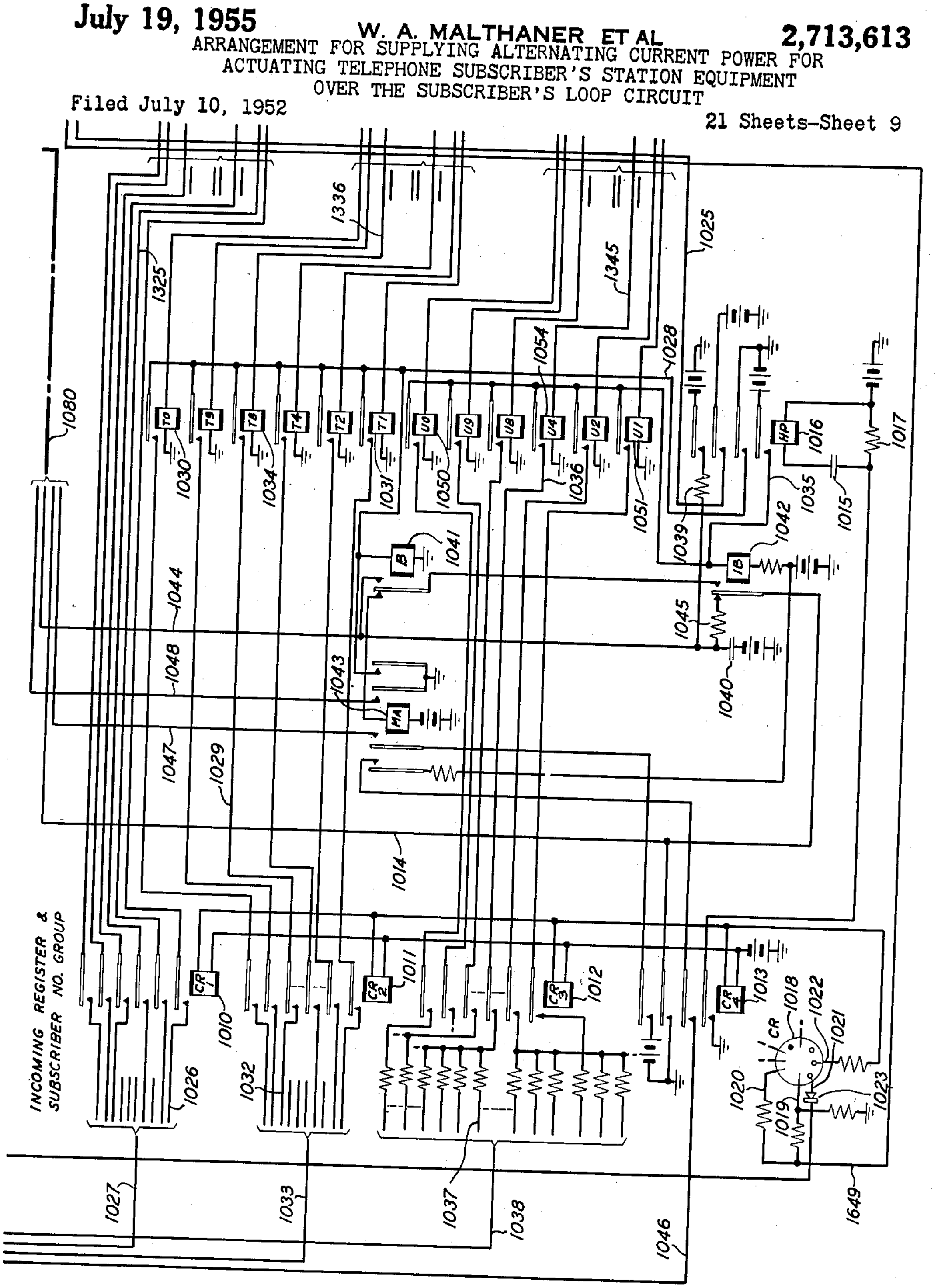

When connection of the register in Fig. 9 to the trunk number group was completed as described above, a voltage mark was applied over lead 821 through the winding of relay 822 to lead 826 which caused breakdown of idle diodes 1111 and 1121. Firing of the diodes 1111 and 1121 causes a rise in potential on control leads 1126 and 1129 provided the links are idle. Rise in potential of lead 1126 causes firing of diodes 1127 and 1128 with the result that the potential on leads 1411 and 1417 is raised. The rise in potential of leads 1411 and 1417 places a mark on the screen of tube 1420 in junctor 1410 and a mark on the screen of a similar gas tube in junctor 1414. Rise in potential of lead 1129 causes the screens of tubes in junctors 1415 and 1416 to be marked due to breakdown of diodes 1130 and 1131 respectively in the manner described above. Thus, four junctors 1410, 1414, 1415 and 1416 of the eight have their screens marked and are fired across their start gaps and two possible paths are provided from the calling line to each of the two trunks of the trunk group. Due to the presence of common impedance 1425 in the main anode circuit of the junctor tubes only one tube will transfer to its main gap. Assume that by chance tube 1420 in junction 1410 transfers. At this time the voltage drop across common impedance 1425 causes the voltage across the main gaps of all other tubes to be below the transfer value and thus all other tubes are locked out. Breakdown of the main gap of tube 1420 operates relay 1428 which applies negative battery through low valued resistors 1430 and 1431 to the marked leads to the switching network. The increase in current due to this low impedance voltage source operates cross-point relays 1132 and 1123 in line frame 1110 and operates relays associated with cross-points 1743 and 1735 in trunk frame 1710. Operation of relays 1132 and 1123 shorts their associated diodes thereby raising the current flowing through the right winding of relay 822, which operates and initiates a sequence of operations described hereinbefore which disconnect the line circuit 800 from actuator 900, from receiver of Fig. 5, from register and translator of Fig. 8, and from the trunk number group so that these circuits may serve another call when required to do so. Operation of relays in cross-points 1743 and 1735 shorts-out their associated diodes thereby raising the current flowing through the left winding of relay 2152 and the lower winding of relay 1432 causing their operation. Operation of relay 1432 operates relay 1436 and operation of relay 2152 closes part of the path which marks the trunk group tube 954 busy. If both trunks are in use, a group supplied in out-trunk 2001 is applied over lead 2170 through the closed contact of relay 2152 to the cathode 957 of tube 954. In the case of more trunks in the same group, this ground path is extended in series through contacts of relays similar to relay 2152 in out-trunk 2108 to the relay of the last trunk in the group so that the cathode 951 of the trunk group tube 954 is only grounded when all trunks in the group are busy.

After operation of relays 822 and 2152, the marks are removed, all fired diodes are extinguished and the switches are ready to handle the next call over existing idle paths and with the paths just established marked busy as hereinbefore described. Operation of cross-point relays established a direct-current path through subset 600, line 614, line circuit 800, switch cross-points 1123, 1132, 1743 and 1735 to relay 2151 which has battery and ground applied through its windings to ring and tip respectively of the out-trunk circuit. Thus, current flows in this circuit and relay 2151 is operated which furnishes through its contacts a holding ground through varistor 2154 and the windings of relay 2152 to the established switching network connection.

Operation of relay 2152 applies battery 2020 through resistor 2021 to cold cathode gas tube 2156. If no other gas tubes in this group are fired, tube 2156 will break down and transfer to its main gap in the manner described above causing the operation of relay 2150. The operation of relay 2150 splits the input and output tip and ring talking conductors of the out-trunk circuit, connects transformer 2281 through the switches, line circuit 800, and line 614, back through the subscriber's set 600, operates relay 2151, connects relay 2164 across leads 2168 and 2167 of trunk 2162, causes tube 2156 to be extinguished and provides a locking path for itself through resistor 2169. Operation of relay 2150 also connects the tip and ring leads through filter 2213. The 45-cycle current is applied to the subset 600 through the loop circuitry of the connection previously described for the generation of signals through secondary 2280 and the closed contacts of relay 2150 to the tip 2167 and ring 2168 of the trunk 2162. The connection of relay 2164 across the trunk 2162 provides a direct-current path to incoming trunk 1900 to inform said trunk that it should call for a receiver to receive, decode, and register the signals identifying the called line.

The connection of polar relay 2164 between the tip and ring talking conductors of out-trunk 2108 completes a direct-current circuit over local trunk 2162 to battery and ground through the windings of relay 1910 in in-trunk 1900 in the same office. Under this condition relay 1910 operates and the direction of direct-current flow over the intertrunk loop is such that polar relay 2164 in the out-trunk remains unoperated. Relay 1910, in operating, connects positive battery from the normally operated contacts of relay 1955 through the normally closed contacts of relay 1921 to the main anode 1912 of gas tube 1911 and closes a fraction of this same voltage through potential dividing resistors 1913 and 1914 to the start anode 1915. Start cathode 1916 of trunk gas tube 1911 is connected to ground in common with the start cathodes of similar gas tubes in other incoming trunks in the same receiver group through lock-out element 1957. Under this condition, the start gap of tube 1911 fires unless other similar gas tubes in the other trunk circuits have already operated causing a voltage drop in the lock-out element 1957. Assuming that tube 1911 fires on this start gap, the discharge will then transfer from start anode 1915 to main anode 1912. The current path between elements 1912 and 1916 of gas tube 1911, constituting another stage in the lock-out process, is described in the patent to Hall referred to above. If tube 1911 is not locked out from service, the discharge finally transfers to the main cathode 1918 at which time current flows in this main gap circuit of the tube through resistor 1919 and the winding of relay 1920 causing the operation of this relay. Relay 1920, in operating, locks to ground under control of a back contact of relay 1921 but the discharge in gas tube 1911 is continued to keep all other incoming trunks in a locked-out condition. Relay 1920, in operating, closes ground to lead 1922 which operates relays 1610 and 1612 in the terminating receiver and releases relay 1611 which is normally biased into an operated position. Relay 1920 also extends through its operated contacts the incoming tip and ring conductors on which signaling pulses are now being received from out-trunk 2108 via conductors 1923 to the input transformer or repeat coil 1613 of the terminating receiver.

The operation of relay 1610 in the terminating receiver operates counting device 1614 for supplying a record of the number of times this terminating receiver is used in the establishment of calls and completes a circuit from the right winding of repeat coil 1613 to the band pass filter 1617 of the receiver circuit. Relay 1611, in releasing, removes a resistance termination from repeat coil 1613 so that the incoming signal pulses may pass into the band pass filter. Relay 1611 also removes ground from the automatic volume control circuit 1618 so that the incoming signal pulses may cause the gain of this volume control circuit to be adjusted as described hereinafter. In addition, relay 1611 removes ground from the winding of relay 1615 permitting this relay to release and relay 1615, in releasing, enables the code detector 1620. The release of relay 1611 also releases relay 1616 to apply battery supply potentials to the various control circuits of the receiver so that they are conditioned to receive and decode the incoming signal pulses.

Figure 16:
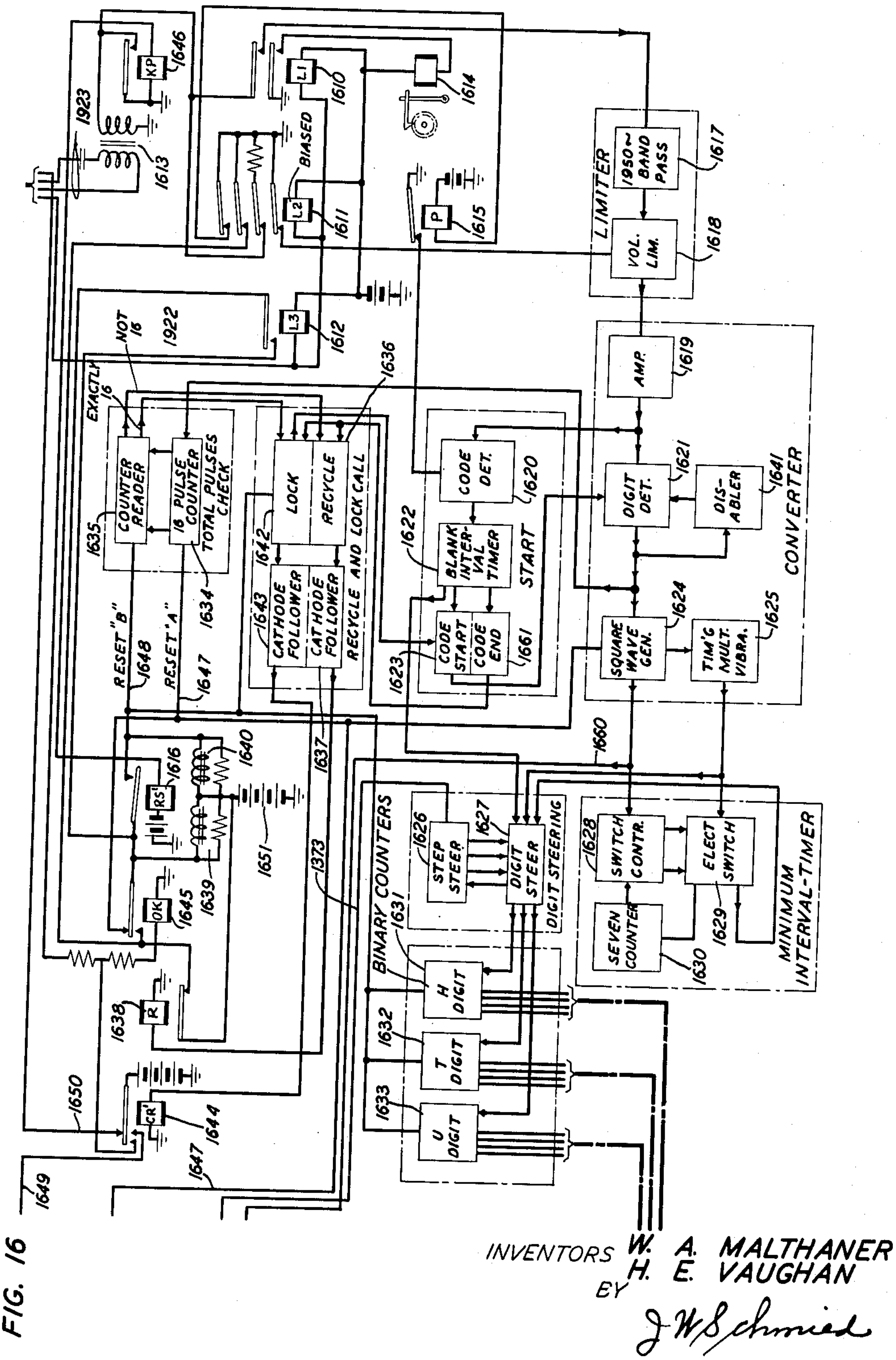

The signal pulses as received by the receiving circuit shown in Fig. 16 first pass through filter 1617 to the volume limiter 1618 causing the gain of said limiter to be set at the proper level as described in the above-identified application of Malthaner et al. In addition these pulses, after being repeated by the limiter circuit, are transmitted to the code detector 1620 through amplifier 1619 which detector is provided with a timing circuit which recognizes the blank interval between the series of pulses representing a complete called number designation in a manner similar to that described above in reference to Fig. 5. The other circuits are rendered ineffective and are blocked until such a blank interval is received. At this time the code detector 1620 as well as the other portions of the start circuit respond to the blank interval and cause the various other circuits to be conditioned to thereafter receive the pulses. These circuits then respond to the succeeding pulses received from the subscriber station and cause the magnitudes represented by the various pulses to be stored on binary counters 1631, 1632 and 1633 after absorbing the three pairs of pulses which it is not desired to register since they designate the called office.

The gain of volume limiting amplifier 1618 is automatically regulated so that the amplitude of the pulses from this amplifier are substantially independent of the amplitude of the pulses as received. Pulses are then further amplified by amplifier 1619 and then supplied to code detector 1620 and digit detector 1621. As described above the code detector 1620 together with the blank interval timer 1622 recognizes the blank intervals between each complete series of pulses representing the entire subscriber station designation. The digit detector 1621 is normally rendered inoperative. However, in response to the operation of the blank interval timer 1622 which in turn operates the code start circuit 1623, the digit detector 1621 is rendered operative so that it will respond to the succeeding pulses received from the calling device of subscriber station 600. The first start pulse thereafter is received by the digit detector 1621 and employed to control the square wave generator or switching device 1624 starting the operation of a timing circuit such as multivibrator 1623.

Since this receiver shown in Fig. 16 is required to register the digits designating the called subscriber's line number, the digits preceding this line number information, which represent the office code and were therefore used by receiving equipment in Fig. 5 as described above, must be discarded. This is accomplished by absorb office code circuit 1360. This absorbing circuit 1360 is operated by pulses transmitted from square wave generator 1624 on the first or start pulse of each digit over lead 1660 through a small coupling condenser to both grids of tube 1361. In this pulse absorbing circuit tubes 1363 and 1365 are two double stability or flip-flop circuits arranged to form a two-stage binary counter. These two counter stages jointly control tube 1368 so as to enable either the left section or the right section of tube 1361 depending upon the setting of the counter stages. In the normal condition of this absorbing circuit, counter tubes 1363 and 1365 are conducting in their right sections and cut off in the left sections.

In this normal condition voltage connected from the right plate of counter tube 1363 through resistor 1367 to the right grid of tube 1368 together with a similar voltage connected from the right plate of tube 1365 through resistor 1366 to the same grid of tube 1368 causes this right section of tube 1368 to be cut off. With the right section of tube 1368 cut off, ground is connected from the cathode of this section through resistor 1379 to the grid of the left section of tube 1368 and negative battery is connected through resistor 1380 to the same left grid. The bias thus established on the left section of tube 1368 keeps this left section also cut off. At this time ground from the right cathode of tube 1368 is connected through resistor 1371 to the right grid of tube 1361 which, together with the negative voltage supplied to this same grid through resistor 1372, keeps this right section of tube 1361 cut off. Positive voltage taken from the left plate of tube 1368 through resistor 1369 to the left grid of tube 1361 together with the negative voltage supplied to this same grid through resistor 1370 enables the left section of this tube to amplify the pulses being received over lead 1660 as described above. The negative pulses thus produced in the plate circuit of the left section of tube 1361 are connected through capacitor 1362 to the first stage of the counter 1363. Each pulse thus received by counter stage 1363 causes a reversal of the current conditions in the two halves of this stage and the negative pulses generated in the right plate of tube 1363 each time it returns to its normal conducting condition are connected through condenser 1364 to the second stage of the counter 1365 causing its operation in a similar manner. When three pulses have been transmitted to this counter circuit from lead 1660 and through the left section of tube 1361 indicating that the first three digits of the incoming signals have been received, both counter tubes will be conducting in their left sections.

The voltage thus connected to the right grid of tube 1368, through the circuit of resistors 1366 and 1367 previously described, brings the right section of tube 1368 to current saturation. With the right section of tube 1368 at saturation, the positive voltage developed in the cathode of this section and connected through resistor 1379 to the grid of the left section brings this left section into a similar condition of saturation. With both sections of tube 1368 at saturation, the potentials which this tube applies to the two sections of tube 1361 through resistors 1371 and 1369 as previously described, causes the left section of tube 1361 to be cut off and the right section to be enabled. With the right section of tube 1361 enabled, subsequent pulses from the square wave generator 1624 over lead 1660 are amplified and repeated on lead 1373 to the step-steering circuit 1626. The first pulse received by step-steering circuit 1626 over lead 1373 causes the step-steering circuit 1626 to condition the digit steering circuit 1627 so that when pulses are applied to it, as is hereinafter described, they will be directed to the first digit counting and storing circuit 1631. In response to each first or start pulse applied to the digit detector 1621 the disabling circuit 1641 is actuated which in turn renders the digit detector 1621 unresponsive to any further received currents for the interval of time required for the transients to die out. At the end of this time the digit detector 1621 is again rendered operative so that it will properly respond to the stop pulse. Meanwhile, the multivibrator or timing circuit 1625 has been arranged to transmit or generate seven pulses which are applied to the selective switching circuit 1629. The selective switching circuit 1629 was set by the output of the square wave generator 1624 and the switch controlling circuit 1628 in response to the first start pulse as described above so that the selective switching circuit 1629 causes the first pulses received thereby to be transmitted to the counter circuit 1630. The counting circuit 1630 counts seven of these pulses, that is the pulses received during the time the transient of the initial start pulses are dying out, and at the end of the seventh pulse actuates the switching control circuit 1629 so that switch 1629 is actuated to a position or condition where it causes the remaining pulses received from multivibrator 1625 to be transmitted to the digit steering circuit 1627 instead of the counter 1630.

Until the absorb office code circuit 1360 has completed its operations, steering circuit 1627 is in a non-transmitting condition. When however the right section of tube 1361 has been enabled and has transmitted a pulse to the step-steering circuit 1626 to condition in turn steering circuit 1627 to transmit pulses to counter 1631, as described above, each succeeding pulse from source 1625 over the initial seven is transmitted to the binary counter circuit 1631 which circuit counts each of the succeeding pulses from the said timing circuit. If the digit has a magnitude of one, the timing multivibrator 1625 will have time to transmit only one pulse to the counting circuit 1631 before the stop pulse is received. If the magnitude of the first digit is 5, then five pulses will be transmitted to circuit 1631 before the stop pulse is received. If the magnitude of the digit is 5, then five pulses will be transmitted to circuit 1631 before the stop pulse is received. Thus, the time of reception of the stop pulse relative to the start pulse is employed directly to designate the magnitudes of the digits or characters of the designation of the called station code.

The reception of the stop pulse operates digit detector 1621 and square wave generator 1624 to stop the operation of multivibrator 1625. The stop pulse also causes the digit detector 1621 to be disabled by disabler 1641 for seven increments of time during which the transients associated with the stop pulse can die out. The next start pulse will then cause the circuits to operate in a manner similar to that described above in reference to the preceding start pulse except that the stepping circuit 1626 will advance the digit steering circuit 1627 and cause the succeeding pulses over and above the first seven from multivibrator 1625 to be transmitted to and recorded by the counter circuit 1632. In a similar manner the magnitude of the third digit is recorded on digit counter 1633. Further counters, not shown, may be provided to record or register further digits.

Checking provisions have also been provided for checking the operation of the circuits to insure that the proper number of signal pulses have been received. As described above two pulses are required to represent each digit. Since in the exemplary embodiment set forth herein the complete subscriber's designation comprises eight digits, sixteen pulses should be included in each series of pulses between the blank intervals. The output of digit detector 1621 is applied to a sixteen-pulse counting circuit 1634. If more or less than sixteen pulses are received by counting circuit 1634 between two blank intervals, the circuits are arranged to cancel all registrations and start over in response to the next series of pulses. In order to accomplish this the sixteen-pulse counter 1634 controls the counter reader 1635. If counter 1634 has counted other than sixteen pulses, the counter reader 1635 conditions the recycle circuit 1636 so that it will repeat a pulse from the code end circuit 1661 through circuit 1636 in response to the next blank interval and cause the operation of relay 1638 through cathode-follower circuit 1637. Relay 1638, in operating, removes a short-circuit from inductive networks 1639 and 1640 and battery supply 1651 to the various counter and switching circuits so that these circuits are all restored or set to their initial condition. After this time they may again respond to the succeeding series of pulses transmitted from the calling subset 600. If a total of sixteen pulses as required in the exemplary embodiment of the invention set forth herein is received between the two blank intervals then the counter reader 1635 will condition the locking circuit 1642 instead of the recycle circuit 1636 to repeat a pulse from the code end circuit 1661 in response to the succeeding blank interval. The locking circuit 1642 then functions through cathode follower 1643 to operate relay 1644 indicating that the proper number of pulses has been received.

Figure 13:
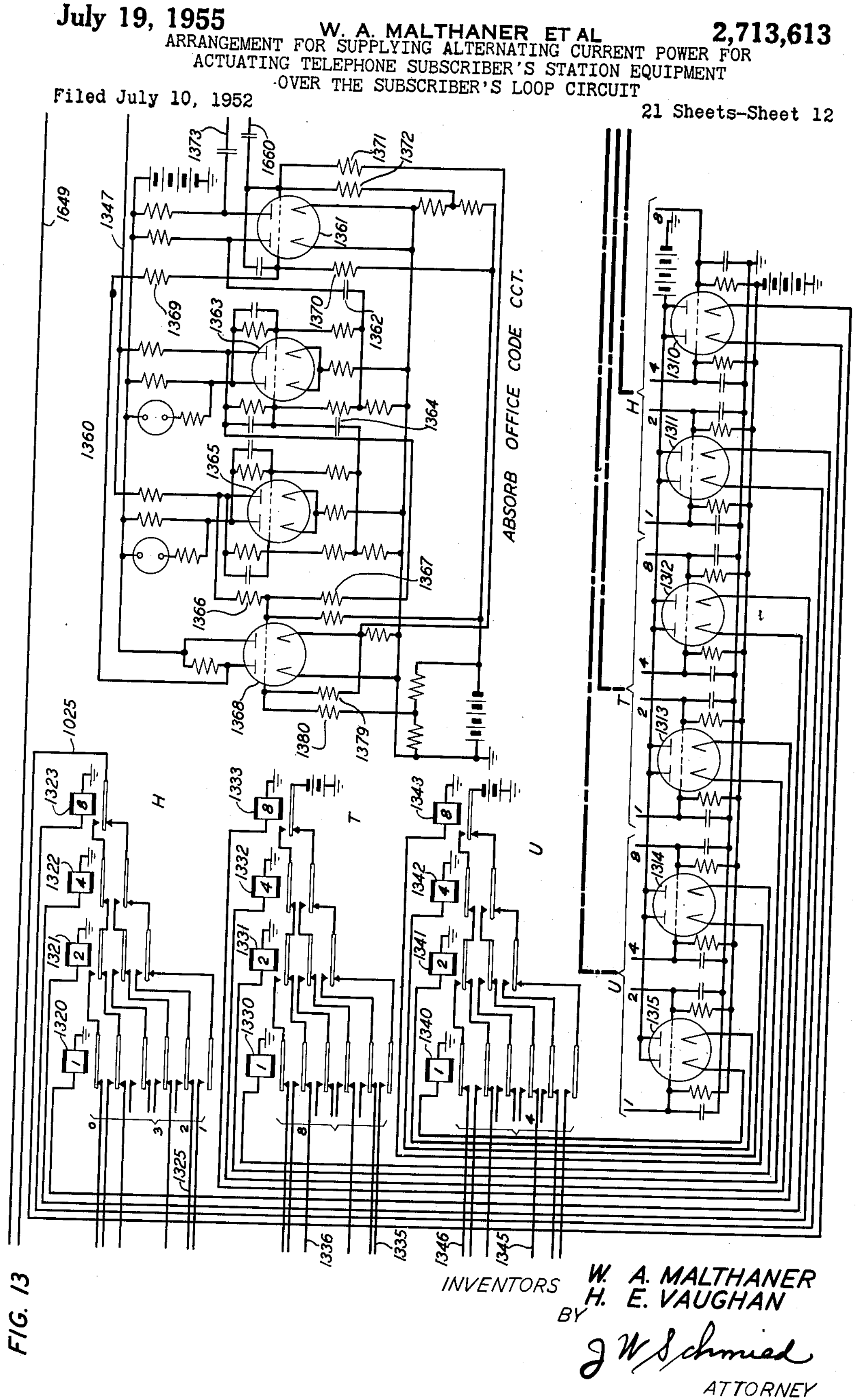
Figure 14:
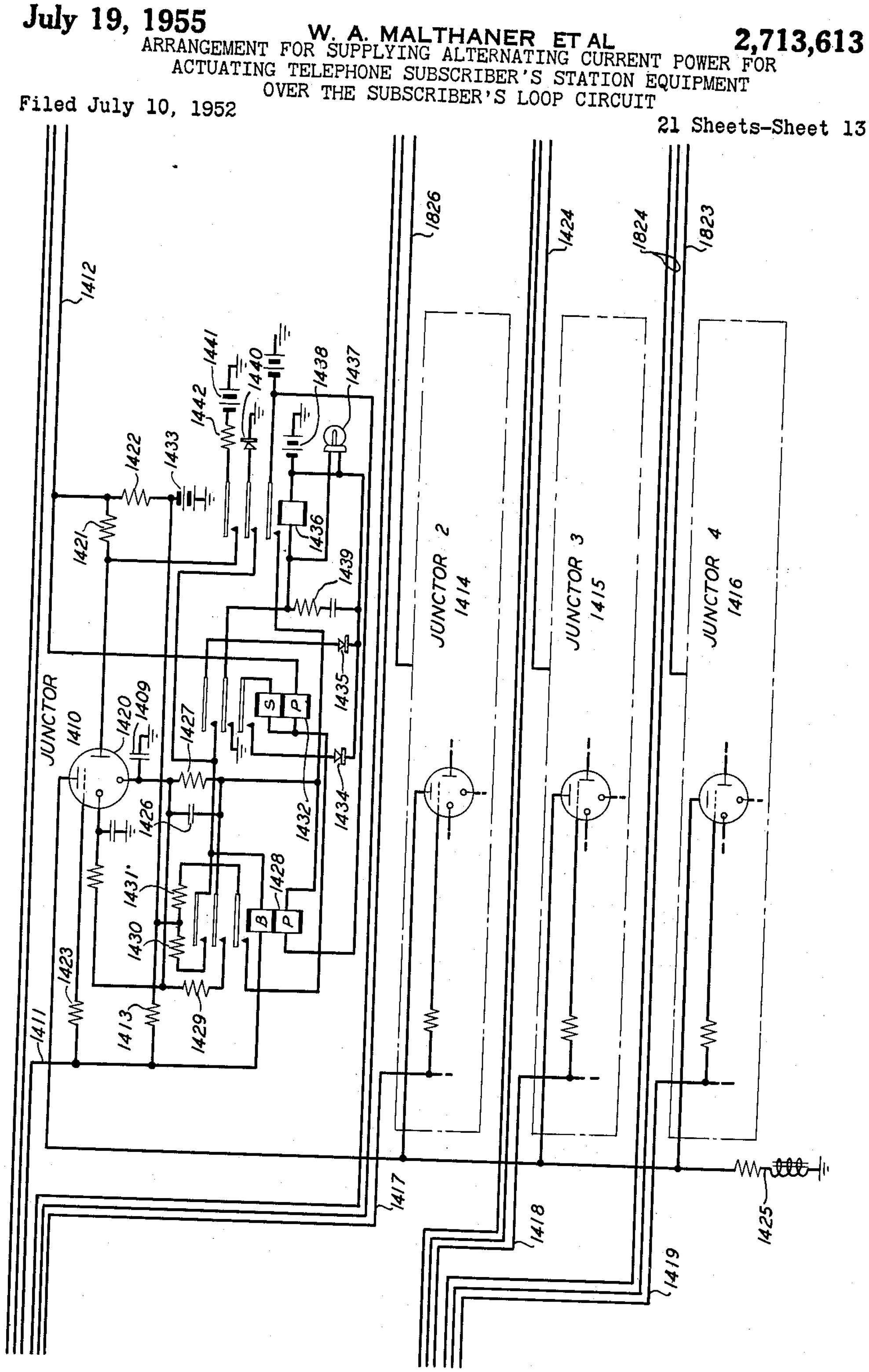
Figure 15:
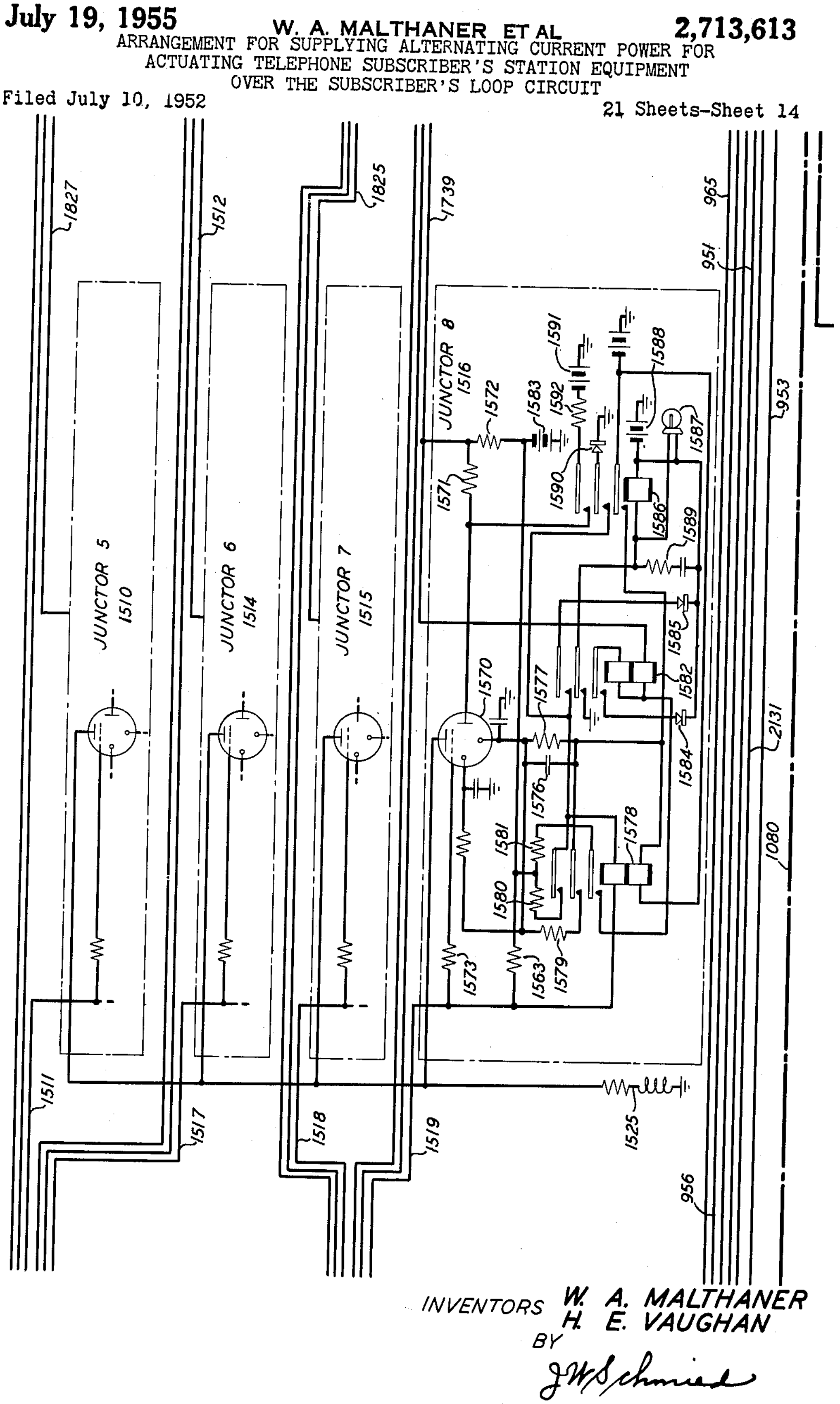

The setting of the counter tubes in each of the digit counters 1631, 1632 and 1633 controls the bias on cathode-follower tubes 1310 to 1315 inclusive which are associated with the individual stages of the counters so that the setting of these counters is transferred through these tubes 1310 through 1315 to a combination of relays in the corresponding three sets of translator relays shown in Fig. 13. The hundreds digit is then represented in binary code form by the operated combination of relays 1320 to 1323, the tens digit by the operated combination of relays 1330 to 1333 and the units or last digit of the called subscriber's directory number by the operated combination of relays 1340 to 1343. The contact springs on each of these digit groups of relays form a translator network for converting the binary digit registration into a decimal digit registration. This translation is accomplished, for example, by the network shown associated with relays 1320 to 1323 in that if voltage is applied to the armature of relay 1323 it will pass through various contacts of relays 1320 to 1323 appearing on one of the ten output leads shown associated with relay 1320 and bearing a decimal designation corresponding to the original decimal designation preset by the calling subscriber. In the case of the tens and units digits, this decimal translation results in the operation of decimal register relays shown in Fig. 10. If we assume, for example, that the directory number designated by the calling subscriber is 284, voltage applied to the output lead 1336 of the translator network for the tens digit operates relay 1034 and voltage applied to the translator output lead 1345 for the third digit operates relay 1054. This registration of the called line directory number designated by the calling subscriber is rapidly registered on the decimal relays of Fig. 10 and thus occurs before the operation of relay 1644.

Relay 1644 in operating in response to the reception of the proper number of pulses for a complete subscriber's designation operates relays 1645 and 1646. Relay 1645 resets the pulse counter 1634 and the square wave generator 1624 to their initial conditions and relay 1646 places a short circuit across the right side of receiver input repeating coil 1613 to prevent the reception of any further signaling pulses by this receiver. Relay 1644 in operating also removes battery from lead 1650 which releases relay 1955 thereby removing the voltage applied to the main anodes of the cold cathode gas tubes in the various line circuits so that any other line circuits which have originating calls awaiting on them are prevented from connecting to the receiver of Fig. 16 until this receiver has completely restored to normal. In addition relay 1644, in operating, connects battery to lead 1649 in order to connect this receiver to the subscriber's number group of Fig. 10 if the switching network is not at the moment being operated upon by any other combination of receiver and number group.

The voltage on lead 1649 connects to the main anode 1020 of cold cathode tube 1018 through a resistor and to the start anode 1019 of said gas tube through a potential dividing resistance network. The start cathode 1021 of this gas tube is permanently connected through varistor 1023 to the lock-out elements or network 924. This lock-out element also connects in a similar manner to the start cathode of gas tube 918 in the trunk number group circuit of Fig. 9 and in a similar manner to similar gas tubes associated with other receivers and to number group connectors not shown in detail. Since the connections through the switching network which these connector circuits in part establish must be performed on a one-at-a-time basis, as described above, lock-out is provided between the connector tubes 918 and 1018 by the lock-out elements, on a simultaneous basis by the inductance of element 924 and on a steady basis by the resistance thereof in order to prevent the operation of connector relays 925, 926 and 927 at a time when the connector relays 1010, 1011, 1012 and 1013 of the subscriber number group are operated and vice versa. The voltage applied to tube 1018 results in the firing of the tube between the start anode 1019 and the start cathode 1021 followed by transfer to the main anode 1020-start cathode 1021 path, and either of these operations may be prevented if tube 918 of the trunk number group is fully operated or simultaneously attempting to operate.

Assuming that tube 1018 is not locked out by this process, the discharge within it finally transfers to the main anode 1020-main cathode 1022 path, thereby operating connector relays 1010 to 1013, inclusive. Relay 1010 connects the ten test and control leads associated with the possible hundreds digits of called subscriber line number designations from the cold cathode gas tubes of the line circuits to the incoming register of Figs. 10 and 13. Relays 1011 and 1012 make similar connections for the test and control leads associated with the tens digits and with the units digits of possible line designations respectively. The operations over these leads will be hereinafter described.

Connector relay 1013 completes, in part, circuits for controlling the switching network, and connects ground to lead 1014 for interpreting the results of an idle-busy-vacant test to be performed on the designated called line and to cause the circuits of the originating office and the calling subscriber's subset to transfer from its signaling condition to a talking condition. This transfer to a talking condition is accomplished as follows. The ground applied to lead 1014 extends through contacts of operated receiver connector relay 1920 of the incoming trunk 1900 to operate relay 1925. Relay 1925 by means of its transfer contacts reverses the connections between the intraoffice loop conductors 2162 and the ground and battery supplied to these conductors through the windings of relay 1910 thus causing a reversal in the direction of direct-current flow over this intraoffice loop and through the winding of polar relay 2164 in the associated out-trunk 2108. Relay 2164 now operates, in turn, operating relay 2155.

The operation of relay 2155 applies ground through varistor 2154 to the left winding of relay 2152 to maintain a holding condition on relay 2152 and on the connection established through the switching network of this originating section of the office as previously described. Relay 2155, in operating also reconnects battery and ground through the windings of relay 2151 to the tip and ring conductors extending from this out-trunk through the switching network and over the calling subscriber's loop 614 to the calling subscriber's subset 600 in the reverse manner to that in which the connection of this relay to the subscriber's loop was originally made as described above. The reverse flow of direct current thus established through the windings of latch magnet 617 of the calling subcriber's subset causes this magnet to operate releasing the previously latched switchhook contact assembly 615, thus removing from the loop conductors 614 the signaling apparatus in the subset comprising digit selector 610, digit stepper 616, signaling pulse generator transformers such as 620 and 621 and the other signaling apparatus previously described, and in turn connecting to the loop conductors 614 the usual talking apparatus comprising a transmitter and receiver in the handset 611, condenser 622 and the induction coil or transformer 623.

Relay 2155 in operating also opens the path from common battery 2020 on which the actuator connector relay 2150 was being held permitting relay 2150 to release, thus opening the connections between out-trunk 2108 and outward actuator 2210, and thereby permitting another trunk circuit to seize this actuator 2210.

Relay 2155 also closes a circuit for maintaining the connection of the relay 2164 between the tip and ring conductors of intraoffice leads 2162 after the release of relay 2150. Relay 2155 connects the tip and ring conductors of the loop extending to the calling subscriber to the tip and ring conductors of intraoffice loop 2162 through series condensers 2180 and 2181 respectively thereby establishing a talking connection between the said subscriber's loop and the intraoffice loop conductors.

Relay 2151 operating on the direct current applied over the subscriber's loop circuit from the battery and ground connected through its windings supplies on additional holding ground through varistor 2154 to relay 2152 and the switching network connection through the originating section of the office and also completes a locking circuit for relay 2155. The relay 2151 thus places the maintenance of the connection established between the calling subscriber and this out-trunk circuit jointly under the control of switchhook contacts 612 of calling subscriber's subset which in turn control relay 2151 of out-trunk 2108 and relay 2164 of the out-trunk circuit 2108.

Meanwhile, relay 1013 supplies ground through condenser 1015 for momentarily operating relay 1016 in order to start the process of selection of the called subscriber's line and the making of the busy-idle-vacant test of this line. Assume that line circuit 803 is the desired called line circuit and corresponds to the line number 284 in the directory listing plan. Relay 1016, in operating, connects positive battery to lead 1025 which connects to the armature of relay 1323 and passes through the contacts of the relay contact network associated with the hundreds digit of the called subscriber's number, including a front contact of operated relay 1321 to lead 1325 as the designated hundreds digit is 2. Lead 1325 is in turn connected through operated contacts of relay 1010 to lead 1026 within the group of conductors 1027 and in turn through a resistor to start anode 890 of line tube 864 in the designated called line and through similar resistors to the start anode of similar gas tubes in other line circuits having the same first digit designation.

Ground is also connected by the operation of relay 1016 to conductor 1028 and in turn through the operated register relay associated with the tens designating digit of the called subscriber's line, such as relay 1034 if this second digit is 8, to conductor 1029 and in turn through an operated contact of relay 1011 to conductor 1032 of the group of conductors 1033. This ground connection is extended through a resistor to the start cathode 891 of gas tube 864 in the called subscriber's line circuit and through similar resistors to the start cathode of similar gas tubes in other line circuits having the same tens digit designation. These potentials, applied to the start cathode and start anode, result in the firing of this gap in all line gas tubes having this combination of hundreds and tens digits, a maximum of ten in a thousand line group.

Relay 1016 also connects positive battery to conductor 1035 and through the register relay associated with the units digit of the called subscriber's number, such as relay 1054 for the case in which this units digit is 4, and in turn to conductor 1036. This voltage on conductor 1036 is further extended through an operated contact of relay 1012 to the junction of a group of resistors and through one of these resistors to conductor 1037 within the group of conductors 1038 to anode 899 of the called line gas tube and to the corresponding anode of gas tubes in the other line circuits having the same units digit as this designated line. Thus, of the group of line gas tubes fired on the start cathode-start anode gap only the tube in the designated called line circuit will also have voltage applied to the second anode and thus will be the only tube able to transfer its discharge to the second anode-start cathode path.

Relay 1016 is operated only long enough for the above discharge paths to be established in the line circuit gas tube 864 after which time it releases, removing the original battery and ground circuits which it had closed to initiate the discharges thus extinguishing all the discharges in the line tubes except the discharge in the tube of the designated called line. The tube 864 of the called line remains fired however, since relay 1041 continues to supply ground through its winding to conductor 1028 which is connected, as described above, to the start cathode of the designated called line circuit 864 and relay 1042 continues to supply positive battery through its winding to conductor 1035 which is connected to the second anode of the called line gas tube, as previously described. The idle, vacant or busy condition of the called line is determined by the operation or non-operation of relays 1041 and 1042 in response to the current flow conditions which they find to have been established in the gas tube of the called line circuit.

Considering in a little more detail the line circuit 803 and its associated gas tube 864, assume as before that line circuit 803 is the desired called line circuit and corresponds to the line number 284 in the directory listing plan. The potentials applied by relay 1016 over the paths previously described to the control elements of the line gas tube associated with the digits 284 will have produced conduction on one of various paths within the gas tube 864 associated with this line. The discharge will have initially been caused between the start cathode and start anode, and will have transferred to the start cathode-secondary anode path, as previously described. In addition, however, if this line is in an idle condition the circuit from main cathode 868 is completed through a back contact of relay 860 and a back contact of relay 862 through resistor 892 to ground. The resistor 892 is also connected to the junction of the two windings of relay 872 and through the right winding of this relay to conductor 876 and to the appearance of this line on the switching network of Fig. 12. A path is also completed from the common point of the windings of relay 872 through the left-hand winding and series varistor 879 to ground. Under this idle line condition the discharge in gas tube 864 will transfer to the path between secondary anode 899 and main cathode 868. If the line is busy however, the main cathode 868 will be connected to ground only through a high valued resistor 893 in which case the discharge through the gas tube will remain across the gap between secondary anode 899 and start cathode 891. Furthermore, if there is no line in the office corresponding to the received designation 284 there will be no corresponding line gas tube and there will be no discharge through a line gas tube after the release of relay 1016.

Assuming that the called line is idle and that the discharge in the line gas tube has transferred to the secondary anode-main cathode path, as described above, the current in this discharge path causes the operation of relay 1042. Relay 1041 which is connected to the start cathode of the line tube remains unoperated because the discharge has transferred from the start cathode to the main cathode. If the called line is in a busy condition, the discharge through the line gas tube will not transfer to the main cathode. Instead it will continue to the start cathode and as a result will cause the operation of relay 1041 as well as relay 1042, and if the line is vacant of course neither of these relays will be operated.

Considering the case of an idle called line, the ground connected to conductor 1014 by the operation of relay 1013 will be extended through an operated make contact of relay 1042 and a series back contact of unoperated relay 1041 to the winding of relay 1043. At the same time ground will be removed by the operation of relay 1042 from conductor 1044 which is used in the trunk circuit in case the line is busy or vacant, as will be described hereinafter. Relay 1043, in operating, places a shunting ground around the winding of relay 1041 to insure that it does not operate subsequently and applies ground to conductor 1048 which passes through a contact of connector relay 1920 to the winding of relay 1928 thereby causing its operation. Relay 1928 opens the operating circuit of relay 1926 to prevent its subsequent operation. Relay 1928 also connects a source of ringing power through relay 1929 to the ring conductor and directly to the tip conductor of the outgoing talking leads of this trunk which will be extended through the switching network to the called subscriber's subset as hereinafter described. In addition, relay 1928 removes short circuits from the series resistor capacitor networks 1930 and 1931 in the tip and ring conductors of the incoming trunk so that a fraction of the ringing voltage is transmitted through these networks and through the tip and ring talking capacitors 1932 and 1933 to the tip and ring conductors which extend through trunk 2108 and through the switching network of the originating section of the office to the calling subscriber. This ringing tone informs the calling subscriber that a connection to the subscriber, he has designated by the setting of the signal generating apparatus in his subset, is being established.

Relay 1043, in operating as described above to indicate that the desired called subscriber's line is idle, applies a positive voltage from an operated contact of relay 1013 through conductor 1047, an operated contact of relay 1920 and a series closed back contact of relay 1921 to the common junction of the windings of relay 1927. The common junction of relay 1927 is connected through the left winding of this relay to the appearance of control lead 1936 of trunk 1900 on the switching network of Fig. 17. Positive voltage is also applied through another contact of operated relay 1043 and an operated series contact of relay 1013 to conductor 1046. The conductor 1046 is connected through a back contact of relay 862 normal to the main anode 867 of tube 864 of the called line circuit, and in a similar manner to the main anodes of the gas tubes in the other line circuits. The application of voltage over lead 1046 to the main anodes of the line tubes associated with idle lines produces no effect in any of these tubes except tube 864 as none of the other tubes have a discharge between any of their elements at this time and the voltage applied to lead 1046 is insufficient for the initiation of a discharge between the electrodes to which it is applied and any other element of the tubes. The application of voltage to main anode 867 causes a transfer of the discharge in gas tube 864 to the main cathode-main anode path thereby developing a positive voltage marking potential across resistor 892 in the main cathode circuit. The cathode circuit is extended over the path previously described to the control lead 876 of this line circuit and the voltage mark appears on the switching network of Fig. 12.

With voltage applied to the control lead 1936 at the trunk side of the switching network and to control lead 876 at the line side of the switching network, the various possible paths between those two points through the switching network are revealed by the ionization of the cold cathode gas diodes at the various crosspoints of the switching network in a manner similar to that described previously for this switching network in establishing the originating connection between calling line 600 and outtrunk 2108. Specifically, and assuming that the paths are all idle except those employed in establishing the connection for the call being described, the voltage applied to lead 1936 fires diodes associated with cross-point relays 1737 and 1738 in primary switch 1712 of trunk frame 1710 and thereby produces by the voltage drop in resistors 1727 and 1728 an altered voltage condition of leads 1723 and 1724 between the primary and secondary switches of trunk frame 1710. This altered voltage condition on primary-secondary link lead 1723 results in the firing of cold cathode gas diode 1729 in secondary switch 1714 producing in turn in a similar manner an altered voltage condition on lead 1512. Diode 1730 which is also connected to link lead 1723, however, does not fire since the voltage on lead 1412 is being maintained near ground potential by the busy junctor circuit 1410 which is in use on the originating section of the call. Lead 1512 connects to the start anode of a gas tube in junctor circuit 1514 similar to the tube shown in junctor 1410. In addition, the altered voltage condition on primary-secondary link lead 1724 similarly fires the cold cathode gas diodes in cross-points 1731 and 1732 of secondary switch 1715 of the trunk frame, in turn producing an altered voltage condition on lead 1739 to the start anode of gas tube 1570 in junctor 1516 and on control lead 1424 to the control anode of a similar gas tube in junctor 1415.

Considering specifically the voltage applied to lead 876 at the line side of the switching network, cold cathode gas tubes of cross-points 1210 and 1211 in primary switch 1201 of line frame 1200 fires thereby altering the voltage on primary-secondary link leads 1217 and 1213 respectively. The altered voltage condition on lead 1217 in turn fires the diodes of cross-points 1218 and 1219 in secondary switch 1202 of this line frame extending voltage marks on conductors 1511 and 1517 to the screen electrodes of the gas tubes in junctors 1510 and 1514, respectively. In a similar manner the altered voltage condition on the primary-secondary link lead 1213 fires the gas diodes in cross-points 1214 and 1215 of secondary switch 1203 of this line frame extending voltage marks on conductors 1518 and 1519 to the screen electrodes of the gas tubes in junctors 1515 and 1516 respectively.

Of the various junctors to which voltage marks have thus been extended, only junctors 1514 and 1516 are marked from both trunk and line sides of the switching network and are thus the only junctors associated with possible complete paths through the switching network. Junctor circuits 1415, 1514 and 1516 have voltage marks supplied to the start anodes of their gas tubes and these tubes will fire to a circuit provided to their start cathode. Junctors 1514 and 1516 will start a transfer to the conduction path extending from the start cathode to the main anode. However, junctors 1514 and 1516 have their main anode circuits connected to main anode lock-out network 1525 so that by the process of lock-out previously described only one of these two junctors will succeed in accomplishing this transfer.

Assuming that tube 1570 in junctor 1516, transfers to to the main anode-start cathode gap, the discharge then further transfers to the main anode-main cathode circuit operating relay 1578 on its lower winding. The operation of relay 1578 completes a shunting circuit through resistor 1580, an operated contact of said relay and the upper winding of the relay 1578, across resistor 1563 across which the marking voltage on lead 1519 was originally developed.

In a similar manner relay 1578 will complete a shunt through resistor 1581 and the lower winding of relay 1582 across resistor 1572 on which the marking voltage to lead 1739 was originally developed. These shunt paths permit additional current to flow from battery 1583 through the windings of relays 1582 and 1578 and through the various cross-point diodes in each direction from the junctor and their associated cross-point relay windings to the marking potentials supplied to the switching network at conductors 1936 and 876 causing the operation of the cross-point relay associated with this contact path.

The operation of the cross-point relays in the line frame places short circuits around the gas diodes of these various cross-points causing a further increase in the current flow in the control lead path between the junctor and the line circuit through the upper winding of relay 1578 which in turn operates relay 872 in the line circuit on its right winding. The operation of the cross-point relays in the trunk frame places short circuits around the gas diodes of these cross-points causing a similar further increase in the current flow in the control lead between the junctor and the trunk circuit which operates junctor relay 1582 on its lower winding and trunk relay 1927 on its left winding. The operation of relay 1582 prepares a holding path from negative battery 1588 through varistor 1584 and both windings of relay 1582, which path is completed through the cross-point relay windings, both windings of relay 1927, varistor 1937 and a contact of relay 1927 to ground. Relay 1582 also prepares a holding path from negative battery 1588 through varistor 1585 and the upper winding of relay 1578, which path is completed through the line frame cross-point relay windings, both windings of relay 872 and varistor 879 to ground. Relay 1582 operates relay 1586 and lights lamp 1587 as a visual indication of the operation. The winding of relay 1586 is shunted by resistor-capacitor network 1589 to make it slow release. Operation of relay 1586 connects a release transient damping varistor 1590 through the upper winding of relay 1578 to lead 1519; connects a negative extinguishing potential 1591 through resistor 1592 to the start anodes of tube 1570; and shorts out the lower winding of relay 1578.

The operation of relay 872 in line circuit 803 on the increased current in the control lead path through the switching network, as described above, operates relay 860 through resistor 881. Relay 860, in operating, removes relay 862 and ground from the tip and ring conductors of the line. Tube 864 is extinguished and a busy indication for subsequent tests by the subscribers' number group circuit established at this tube by the open contacts of relay 860. Relays 872 and 1578 are held in their operated condition on the circuit extending from ground through varistor 879 through both windings of relay 872 to control lead 876 and then through the switching network, the upper winding of relay 1578, and resistor 1580 to negative battery 1583. Varistor 1585 is so poled that negligible current flows from this holding circuit to battery 1588. The current flow in this holding path is a lower value of current than that established by the marking voltage at the line end and permits the release of junctor relay 1578. The release of relay 1578 effectively removes battery 1583 from the control lead paths, thus permitting holding current for these paths to now flow from negative battery 1588 through varistors 1584 and 1585.

Relay 1927, in operating, extends ground from an operated contact of relay 1910 to the junction of the two varistors 1937 and 1938 associated with the right winding of relay 1927 thus preparing a holding condition for the path established through the switching network between this trunk and junctor circuit 1516. Relay 1927 also connects ground through a back contact of relay 1929 for locking relay 1928 in an operated condition to maintain the connection of ringing power to the called subscriber's line after terminating receiver connecting relay 1920 has released. Relay 1927 also operates relay 1921 which in turn opens the marking voltage path to the common point of the winding of relay 1927, extinguishes gas tube 1911, and releases relay 1920. The release of relay 1920 opens the connection between this incoming trunk circuit and the terminating receiver of Fig. 16 causing the release of relays 1610 and 1612 and the reoperation of relay 1611 in this receiver circuit.

The release of relay 1920 also causes the release of trunk relay 1925. The release of trunk relay 1925 restores the direct-current flow over intraoffice conductors 2162 to its original condition, thereby releasing relay 2164 in the out-trunk.

Relay 1610 in releasing releases call counting device 1614 and opens the path between signal input transformer 1613 and band pass filter 1617. Relay 1611, in operating, connects ground to automatic volume control circuit 1618 restoring this circuit to its maximum gain condition, and applies a resistance termination across the right winding of input transformer 1613. Relay 1611 in operating also reoperates relay 1615, which disables the code detector 1620. Relay 1611 in operating also reoperates relay 1616 which opens the short across inductance 1640, which passed through a back contact of relay 1638 and a series closed contact on relay 1645. Removal of the short causes a negative pulse on lead 1648 which resets counter reader 1635, lock circuit 1642 and the binary counter circuits 1631, 1632 and 1633. Reset of lock circuit 1642 releases relay 1644 which removes battery from lead 1649, thereby releasing the number group circuit. Release of relay 1644 also releases relays 1645 and 1646 and applies battery to lead 1650 which in turn causes the operation of relay 1955 which applies battery for use in operating gas tubes in other incoming trunk circuits as required.

With the connection established as described above from in-trunk 1900 through the switching network, the line circuit 803 and local subscriber loop conductors 664 to subset 603, the ringing power supplied from in-trunk 1900 operates ringer 663 through condenser 659 and the closed contacts of switchhook assembly 662 to summon the called subscriber.

When the called subscriber answers the call by removing handset 661 from its switchhook cradle, switchhook assembly 662 operates removing ringer 663 from the line conductors 664 and connecting these line loop conductors through closed contacts of latched switchhook assembly 665 to the winding of latch magnet 667. The impedance of the direct-current path completed through the latch magnet winding 667 causes the operation of the trip ringing relay 1929 in the in-trunk on the ringing power and/or the superimposed direct current provided therewith. Relay 1929, in operating, opens the locking path to relay 1928 which releases, in turn removing ringing power from the conductors extending to the called subscriber and causing the release of relay 1929. Relay 1929, in releasing, also places short circuits around networks 1930 and 1931 through which ringing tone was supplied to the calling subscriber's subset, and thereby completes a direct-current path from ground and battery through the windings of relay 1939 to the conductors extending to the called subscriber's subset and through the winding of latch magnet 667. Relay 1939 now operates and the direction of current flow through latch magnet 667 from the battery and ground at the windings of relay 1939 causes the operation of this latch magnet releasing switchhook assembly 665. Relay 1939, in operating, supplies an additional locking ground to relay 1927 and reoperates relay 1925. The reoperation of relay 1925 reverses the direction of direct-current flow over intraoffice conductors 2162 causing the reoperation of polar relay 2164 in the out-trunk. This reoperation of relay 2164 may be used, by means not shown but well known in existing telephone systems, to operate a registering device for use in charging the call to the calling subscriber's account.

The release of switchhook assembly 665 in the called subscriber's subset 603 removes latch magnet 667 and the signaling apparatus comprising a digit selector, signal generating device, digit stopper and the phase-splitting networks from the loop conductors 664. These elements used for signaling are similar to those shown in the detailed drawing of subset 600. The release of the switchhook assembly 665 also completes the talking circuit from these loop conductors through the usual talking apparatus comprising a receiver and transmitter in handset 661 and the usual condenser 672 and transformer or induction coil 673.

The calling subscriber at subset 600 may now converse with the called subscriber at subset 603 with transmitter bias current provided for these subsets through the windings of relay 2151 in out-trunk 2108 and the windings of relay 1939 in incoming trunk 1900, respectively.

The talking connection through the originating office is maintained at this time under the direct control of out-trunk relay 2151 which is, in turn, held by the direct-current flow in the calling subscriber's talking loop. The talking connection is also maintained indirectly in a joint manner by in-trunk relay 1939 which is, in turn, held by the direct-current flow in the called subscriber's talking loop. For the trunk frame section of the originating office, ground is provided from relays 2151 and 2155 in the out-trunk through the windings of relay 2152, the windings of the associated operated cross-point relays of line frame 1110 and the windings of relay 822 in the calling line circuit 800 to ground.

In a similar manner, the talking connection through the trunk frame for the terminating connection is maintained at this time under the direct control of in-trunk relay 1939, which is, in turn, held by the direct-current flow in the called subscriber's talking loop, and is maintained indirectly in a joint manner by out-trunk relay 2151, which, in turn, is held by the direct-current flow in the calling subscriber's talking loop. Ground is provided from relays 1939 and 1910 in the in-trunk through the windings of relay 1927, the windings of the associated operated cross-point relays of trunk frame 1710 and the windings of relay 1582 in junctor 1516 to negative battery 1588, and for the line frame section of the terminating connection battery 1588 is connected through contacts of held relay 1582 in junctor 1516 through the upper winding of relay 1578, the windings of the associated operated cross-point relays of line frame 1200 and the windings of relay 872 in the called line circuit 803 to ground.

As described above, the talking connection for both the originating and terminating sections of the call is held under the joint control of both the calling and called subscribers. If the calling subscriber restores his handset first at the end of conversation, the operation of switchhook assembly 612 opens the current path to out-trunk relay 2151 which releases and thereby opens its locking ground path to out-trunk relay 2155. Relay 2155, however, is held operated by the operated relay 2164 so that holding ground is maintained to relay 2152 and the switching network.

When the called subscriber then hangs up, the operation of switchhook assembly 662 opens the current path to in-trunk relay 1939 which releases and in turn releasing relay 1925. With relay 1925 normal, the reversal of the direction of direct-current flow in the intraoffice loop conductors 2162 releases polar relay 2164 in the out-trunk in turn releasing relay 2155. The release of relay 2155 opens the holding ground to relay 2152, and this relay together with the series operated cross-point relays in trunk frame 1710 and junctor relay 1432 releases. The release of junctor relay 1432 in turn opens the circuit from battery 1438 through the upper winding of relay 1428 and the series windings of the operated cross-points in line frame 1110 and the windings of relay 822 in the calling line circuit, permitting the release of the relays along this current path. The release of junctor relay 1432 also releases relay 1436 restoring the junctor to its normal condition and the release of line circuit relay 822 releases relay 810 restoring the calling line circuit to its normal condition.

The release of relay 2155 in the out-trunk also opens the bridging connection through the winding of relay 2164 established between the talking conductors of intraoffice loop 2162 thus causing the release of in-trunk relay 1910. The release of relay 1910 opens the holding ground to relay 1927 and this relay together with the series operated cross-point relays in trunk frame 1710 and the junctor relay 1582 releases. The release of junctor relay 1582 in turn opens the circuit from battery 1588 through the upper winding of relay 1578 thus releasing the series operated cross-points relays of the line frame and relay 872 in the line circuit. The release of relay 1582 also releases relay 1586 restoring the junctor to its normal condition and the release of relay 872 releases relay 860 restoring the called line circuit to its normal condition.

If the called subscriber restores first, the operation of switchhook assembly 662 opens the current path to in-trunk relay 1939 which releases, in turn, releasing relay 1925. With relay 1925 normal, the reversal of the direction of direct-current flow in the intraoffice loop conductors 2162 releases polar relay 2164 in the out-trunk. The connection, however, for the originating section of the call is still held under the control of relay 2151, and relay 1910 in the in-trunk remains operated over the intraoffice loop to hold the connection for the terminating section of the call. When the calling subscriber then restores, the operation of switchhook assembly 612 opens the current path to out-trunk relay 2151 which releases, in turn, releasing relay 2155. The release of relay 2155 then causes the release and return to normal of out-trunk 2108, in-trunk 1900, line circuits 600 and 603 and the junctors and cross-point relays used in the connection as described above when both subscribers have hung up.

The specific embodiment of the invention shown and described is but illustrative as various modifications may be made therein without departing from the scope and spirit of the invention as defined in the appended claims.

What is claimed is:

1. A closed metallic path telephone switching system comprising a plurality of subscribers' stations; a central station; and a plurality of subscribers' lines connecting said subscribers' stations to said central station, said central station having a direct-current power source, an alternating-current power source, a circuit connector, and a calling signal receiver, each of said subscribers' stations having a control winding and calling apparatus, said calling apparatus comprising a plurality of impulse devices each having primary and secondary windings for the selective production of call signals by said secondary windings in response to alternating-current power applied to said primary windings, means for connecting said direct-current power source to said control winding upon the operation of said calling apparatus in one of said subscribers' stations, said circuit connector connecting said calling receiver in parallel with said alternating and said direct-current power sources to the line of said calling station whereby the current from said alternating-current source flows through the primary windings of said calling apparatus at said station, back through said subscriber's line to said direct-current power source, said connector also providing a path for the signals produced by said secondary windings of said calling apparatus through said subscriber's line and said calling signal receiver over a closed metallic path.

2. In a communication system in combination, a plurality of central switching stations, trunk circuits interconnecting said switching stations, closed path subscribers' stations individual to each of said switching stations, subscribers' lines connecting each of said subscribers' stations to one of said switching stations, direct-current and alternating-current sources located at said central stations; signaling apparatus located at said subscribers' stations, apparatus located at said switching stations for connecting said alternating current sources to said subscribers' lines for actuating said signaling apparatus at said subscribers' stations, apparatus including said direct-current source at said central stations for maintaining the connections of said alternating current source, and apparatus at said central stations responsive to the cessation of the operation of said signalling apparatus for reversing said direct current and maintaining the established transmission paths through said switching stations.

3. In a telephone switching system in combination, a first and second plurality of subscribers' stations, a first and second central station, a first plurality of subscribers' lines respectively connecting said first plurality of subscribers' stations with said first central station, a second plurality of subscribers' lines respectively connecting said second plurality of subscribers' stations with said second central station, trunks extending from said first central station to said second central station, said first and second plurality of subscribers' stations each having calling apparatus connected respectively across said first and second plurality of subscribers' lines, said first and second central stations each having a direct-current and an alternating-current power source, means for connecting said direct-current sources to one of said lines responsive to the operation of said calling apparatus connected across said line and for connecting said alternating current causing the further operation of said calling apparatus.

4. A telephone switching system comprising a subscriber's station having calling apparatus, a central station and subscriber's line connecting said subscriber's station with said central station, said central station having a direct-current source connected to said subscriber's line, an alternating-current source and apparatus for applying said source of alternating current to said subscriber's line thereby to cause the operation of said calling apparatus, said direct-current source being connected to said calling apparatus throughout the operation thereof.

5. A telephone switching system comprising a plurality of subscribers' stations each having calling apparatus; a central station; and a plurality of subscribers' lines connecting said subscribers' stations with said central station, said central station having a direct-current source, an alternating-current source and apparatus for applying said source of alternating current to said subscribers' lines thereby to cause the operation of said calling apparatus for connecting said direct-current source to said calling apparatus throughout the operation of said calling apparatus, said calling apparatus having a closed metallic path for the current from said alternating-current source.

6. In combination in a telephone switching system, a central station, a line having two conductors from said central station, said central station comprising apparatus for normally applying a substantially unvarying electrical voltage to said line, call signal receiving equipment apparatus connected to said conductors responsive to the flow of a substantially unvarying current in excess of a predetermined magnitude over said conductors of said line for establishing a path from said line to said receiving equipment, apparatus operative incident to the establishment of said path from said line to said receiving equipment for maintaining said substantially unvarying voltage applied to said line and for applying an alternating-current voltage to said conductors of said line, and means for maintaining said path through said conductors of said line under control of continued flow of direct current through said line.

7. In a telephone switching system a subscriber's line, a central station, apparatus for normally applying a substantially unvarying voltage of one polarity to said line, apparatus operative incident to the initiation of a call over said line for maintaining said substantially unvarying potential and for applying an alternating current to said line, apparatus for maintaining said alternating current during signaling over said line, apparatus for maintaining said substantially unvarying potential during signaling over said line, apparatus responsive to the cessation of signaling for interrupting said supply of alternating current and applying a substantially unvarying voltage of reversed polarity to said line, and apparatus responsive to the continued flow of said substantially unvarying current of reversed polarity for maintaining connections established from said line, all of said apparatus except said last-mentioned apparatus operating solely over metallic paths.

8. In an automatic telephone connection system, a closed path signaling system comprising a plurality of subscribers' lines and a plurality of subsets, each of said subsets having a plurality of impulse devices provided with primary and secondary windings for generating pulses in response to a sinusoidal current wave applied to said primary windings; means for connecting said primary windings across said subscriber's line and for selectively interconnecting said secondary windings across said subscriber's line comprising a manually operable selector switch and a plurality of relays; a filter network connected to said subscriber's line for allowing only relatively low frequency currents through said primary windings and only relatively high frequency currents through said secondary windings; and a magnetic control device; a direct-current power source controlling with said device the operation of said interconnecting means; a relatively low frequency current power source; a calling receiver; apparatus operative incident to the initiation of a call for connecting said direct-current power source, said relatively low frequency power source and said calling receiver to said subscriber's line, said calling receiver being connected in parallel with said primary and secondary windings and with the series connection of said direct and relatively low frequency power sources.

9. In combination in a telephone switching system, a central station, a line from said central station, said central station comprising apparatus for normally applying a substantially unvarying voltage to said line, call signal receiving equipment responsive to a substantially unvarying current in excess of a predetermined magnitude over said line for establishing a path from said line to said receiving equipment, a plurality of groups of trunks, means for selectively establishing a path from said line through said central office over one of said trunks and for limiting the selection of said trunk to only one of said groups of trunks, apparatus operative incident to the establishment of said path from said line to said receiving equipment for maintaining said substantially unvarying voltage applied to said line and for applying an alternating-current voltage to said line, and means for maintaining said path from said line under control of continued flow of direct current through said line.

10. In combination in a telephone switching system, a call-initiating means at said subscriber station having call-initiating means, a central switching station, a subscriber line extending between said call-initiating means at said subscriber station and said central switching station, responsive means at said central switching station connected to said subscriber line and responsive to the operation of said call-initiating means at said subscriber station to apply alternating-current power to said subscriber line, supervisory apparatus at said central station connected in parallel with said call-initiating means across said line and operable by the flow of said alternating current over said line, and means whereby the operation of said supervisory apparatus maintains said flow of current to said subscriber line.

No references cited.